United States Patent
Bellaish et al.

(10) Patent No.: US 11,481,853 B2
(45) Date of Patent: Oct. 25, 2022

(54) SELECTIVE REPORTING OF CONSTRUCTION ERRORS

(71) Applicant: Ron Zass, Kiryat Tivon (IL)

(72) Inventors: Shalom Bellaish, Tel Mond (IL); Ron Zass, Kiryat Tivon (IL); Itay Cohen, Tel Aviv-Jaffa (IL); Tomer Yosef Fuchs, Herzliya (IL)

(73) Assignee: CONSTRU LTD, Tel Aviv (IL)

( * ) Notice: Subject to any disclaimer, the term of this patent is extended or adjusted under 35 U.S.C. 154(b) by 124 days.

(21) Appl. No.: 16/741,048

(22) Filed: Jan. 13, 2020

(65) Prior Publication Data

US 2020/0151833 A1 May 14, 2020

Related U.S. Application Data

(63) Continuation-in-part of application No. 16/543,557, filed on Aug. 18, 2019, now Pat. No. 10,963,976,
(Continued)

(51) Int. Cl.
*G06F 16/23* (2019.01)
*G06F 16/583* (2019.01)
(Continued)

(52) U.S. Cl.
CPC ......... *G06Q 50/08* (2013.01); *G06F 16/2379* (2019.01); *G06F 16/583* (2019.01); *G06K 9/623* (2013.01); *G06K 9/6215* (2013.01); *G06K 9/6256* (2013.01); *G06N 20/00* (2019.01); *G06Q 10/06311* (2013.01); *G06Q 40/025* (2013.01); *G06Q 40/08* (2013.01); *G06Q 40/12* (2013.12);
(Continued)

(58) Field of Classification Search
None
See application file for complete search history.

(56) References Cited

U.S. PATENT DOCUMENTS 7,015,808 B1 * 3/2006 Sattler ............... H04N 1/32662
340/531
9,070,216 B2 * 6/2015 Golparvar-Fard .... G06T 19/006
(Continued)

OTHER PUBLICATIONS

Stubbs et al. ("Nondestructive Construction Error Detection in Large Space Structures," AIAA Journal, vol. 28, No. 1, Jan. 1990 (Year: 1990).*

*Primary Examiner* — Soo Shin

(57) ABSTRACT

Systems and methods for selective reporting of construction errors are provided. For example, image data captured from a construction site using at least one image sensor may be obtained. The image data may be analyzed to identify a construction error. The image data may be analyzed to identify a degree of the construction error. The identified degree of the construction error may be compared with a threshold selected based on an analysis of a construction plan associated with the construction site. In response to a first result of the comparison, a first severity may be assigned to the construction error, and in response to a second result of the comparison, a second severity may be assigned to the construction error, the second severity differs from the first severity. Further, information related to the construction error may be provided based on the severity assigned to the construction error.

17 Claims, 19 Drawing Sheets

1700

Related U.S. Application Data which is a continuation of application No. 16/276,906, filed on Feb. 15, 2019, now Pat. No. 10,460,173.

(60) Provisional application No. 62/631,757, filed on Feb. 17, 2018, provisional application No. 62/666,152, filed on May 3, 2018, provisional application No. 62/791,841, filed on Jan. 13, 2019.

(51) Int. Cl.

| | |
|---|---|
| *G06K 9/62* | (2022.01) |
| *G06N 20/00* | (2019.01) |
| *G06N 3/08* | (2006.01) |
| *G06Q 10/06* | (2012.01) |
| *G06Q 40/00* | (2012.01) |
| *G06Q 40/02* | (2012.01) |
| *G06Q 40/08* | (2012.01) |
| *G06Q 50/08* | (2012.01) |
| *G06T 7/00* | (2017.01) |
| *G06T 7/70* | (2017.01) |
| *G06V 10/10* | (2022.01) |
| *G06V 20/00* | (2022.01) |
| *G06V 20/20* | (2022.01) |
| *G06V 20/10* | (2022.01) |

(52) U.S. Cl.
CPC ............ *G06T 7/001* (2013.01); *G06T 7/0004* (2013.01); *G06T 7/70* (2017.01); *G06V 10/10* (2022.01); *G06V 20/00* (2022.01); *G06V 20/176* (2022.01); *G06V 20/20* (2022.01); *G06T 2200/24* (2013.01); *G06T 2207/20092* (2013.01); *G06T 2207/30132* (2013.01); *G06T 2207/30242* (2013.01)

(56) References Cited

U.S. PATENT DOCUMENTS

| | | | |
|---|---|---|---|
| 9,389,084 B1* | 7/2016 | Chen | G01C 11/06 |
| 2013/0155058 A1* | 6/2013 | Golparvar-Fard | G06Q 10/06311 |
| | | | 345/419 |
| 2013/0282345 A1* | 10/2013 | McCulloch | G06G 7/48 |
| | | | 703/6 |
| 2014/0019148 A1* | 1/2014 | Buzz | G06Q 50/08 |
| | | | 705/1.1 |
| 2016/0335731 A1* | 11/2016 | Hall | G06Q 10/06 |
| 2017/0116669 A1* | 4/2017 | Wickstrom | G06Q 40/025 |
| 2018/0012125 A1* | 1/2018 | Ladha | G06N 3/0445 |
| 2020/0151833 A1* | 5/2020 | Bellaish | G06Q 50/08 |

* cited by examiner

1050

1800

```
1810  Receive at least part of an
image captured from a construction
site using an image sensor
            ↓
1820  Receive an indication of a
construction error associated with
the construction site
            ↓
1830  Receive an indication of a type
of the construction error
            ↓
1840  Present the at least part of the
image captured from the construction
site with an overlay over the at least
part of the image, wherein the
overlay includes a visual indication of
the construction error, and the visual
indication is based on the type of the
construction error
```

FIG. 18

SELECTIVE REPORTING OF CONSTRUCTION ERRORS

CROSS REFERENCES TO RELATED APPLICATIONS

This application claims the benefit of priority of U.S. Provisional Patent Application No. 62/791,841, filed on Jan. 13, 2019. This application is also a continuation in part of U.S. patent application Ser. No. 16/543,557, filed on Aug. 18, 2019, which is a continuation of U.S. patent application Ser. No. 16/276,906, filed on Feb. 15, 2019, which claims the benefit of priority of U.S. Provisional Patent Application No. 62/631,757, filed on Feb. 17, 2018, and U.S. Provisional Patent Application No. 62/666,152, filed on May 3, 2018, and U.S. Provisional Patent Application No. 62/791,841, filed on Jan. 13, 2019.

The entire contents of all of the above-identified applications are herein incorporated by reference.

BACKGROUND

Technological Field

The disclosed embodiments generally relate to systems and methods for processing images. More particularly, the disclosed embodiments relate to systems and methods for processing images of construction site images.

Background Information

Image sensors are now part of numerous devices, from security systems to mobile phones, and the availability of images and videos produced by those devices is increasing.

The construction industry deals with building of new structures, additions and modifications to existing structures, maintenance of existing structures, repair of existing structures, improvements of existing structures, and so forth. While construction is widespread, the construction process still needs improvements. Manual monitoring, analysis, inspection, and management of the construction process prove to be difficult, expensive, and inefficient. As a result, many construction projects suffer from cost and schedule overruns, and in many times the quality of the constructed structures is lacking.

SUMMARY

In some embodiments, systems comprising at least one processor are provided. In some examples, the systems may further comprise at least one of an image sensor, a display device, a communication device, a memory unit, and so forth.

In some embodiments, systems and methods for providing information on construction errors based on construction site images are provided.

In some embodiments, image data captured from a construction site using at least one image sensor may be obtained. The image data may be analyzed to identify at least one construction error. Further, the image data may be analyzed to identify a type of the at least one construction error. In response to a first identified type of the at least one construction error, first information may be provided, and in response to a second identified type of the at least one construction error, providing the first information may be forgone.

In some embodiments, systems and methods for determining the quality of concrete from construction site images are provided.

In some embodiments, image data captured from a construction site using at least one image sensor may be obtained. The image data may be analyzed to identify a region of the image data depicting at least part of an object, wherein the object is of an object type and made, at least partly, of concrete. The image data may be further analyzed to determine a quality indication associated with the concrete. The object type of the object may be used to select a threshold. The quality indication may be compared with the selected threshold. An indication to a user may be provided to a user based on a result of the comparison of the quality indication with the selected threshold.

In some embodiments, systems and methods for providing information based on construction site images are provided.

In some embodiments, image data captured from a construction site using at least one image sensor may be obtained. Further, at least one electronic record associated with the construction site may be obtained. The image data may be analyzed to identify at least one discrepancy between the at least one electronic record and the construction site. Further, information based on the identified at least one discrepancy may be provided to a user.

In some embodiments, systems and methods for updating records based on construction site images are provided.

In some embodiments, image data captured from a construction site using at least one image sensor may be obtained. The image data may be analyzed to detect at least one object in the construction site. Further, at least one electronic record associated with the construction site may be updated based on the detected at least one object. In some examples, the at least one electronic record may comprise a searchable database, and updating the at least one electronic record may comprise indexing the at least one object in the searchable database. For example, the searchable database may be searched for a record related to the at least one object. In response to a determination that the searchable database includes a record related to the at least one object, the record related to the at least one object may be updated. In response to a determination that the searchable database do not include a record related to the at least one object, a record related to the at least one object may be added to the searchable database.

In some embodiments, systems and methods for generating financial assessments based on construction site images are provided.

In some embodiments, image data captured from a construction site using at least one image sensor may be obtained. Further, at least one electronic record associated with the construction site may be obtained. The image data and the at least one electronic record may be analyzed to generate at least one financial assessment related to the construction site. For example, the image data may be analyzed to identify at least one discrepancy between the at least one electronic record and the construction site, and the identified at least one discrepancy may be used in the generation of the at least one financial assessment.

In some embodiments, systems and methods for hybrid processing of construction site images are provided.

In some embodiments, image data captured from a construction site using at least one image sensor may be obtained. The image data may be analyzed to attempt to recognize at least one object depicted in the image data. In response to a failure to successfully recognize the at least one object, at least part of the image data may be presented to a user, and a feedback related to the at least one object may be received from the user. For example, the attempt to recognize the at least one object may be based on a construction plan associated with the construction site, and the failure to successfully recognize the at least one object may be identified based on a mismatch between the suggested object type from the attempt to recognize the at least one object and one or more types of one or more objects selected from the construction plan based on the location of the at least one object in the image data.

In some embodiments, systems and methods for ranking entities using construction site images are provided.

In some embodiments, image data captured from a construction site using at least one image sensor may be obtained. The image data may be analyzed to detect at least one element depicted in the image data and associated with an entity. The image data may be further analyzed to determine at least one property indicative of quality and associated with the at least one element. The at least one property may be used to generate a ranking of the entity. For example, the at least one element may include an element built by the entity, installed by the entity, affected by a task performed by the entity, supplied by the entity, manufactured by the entity, and so forth. In some examples, the at least one property may be based on a discrepancy between a construction plan associated with the construction site and the construction site, between a project schedule associated with the construction site and the construction site, between a financial record associated with the construction site and the construction site, between a progress record associated with the construction site and the construction site, and so forth.

In some embodiments, systems and methods for annotation of construction site images are provided.

In some embodiments, image data captured from a construction site using at least one image sensor may be obtained. Further, at least one construction plan associated with the construction site and including information related to an object may be obtained. The at least one construction plan may be analyzed to identify a first region of the image data corresponding to the object. The at least one display device may be used to present at least part of the image data to a user with an indication of the identified first region of the image data corresponding to the object. Further, the at least one display device may be used to present to the user a query related to the object. A response to the query may be received from the user. The response may be used to update information associated with the object in at least one electronic record associated with the construction site.

In some embodiments, systems and methods for visual presentation of construction errors are provided.

In some embodiments, at least part of an image captured from a construction site using an image sensor may be received. Further, in some examples, an indication of a construction error associated with the construction site may be received. Further, in some examples, an indication of a type of the construction error may be received. Further, in some examples, the at least part of the image captured from the construction site may be presented with an overlay over the at least part of the image, wherein the overlay may include a visual indication of the construction error, and the visual indication may be based on the type of the construction error.

In some embodiments, systems and methods for selective reporting of construction errors are provided.

In some embodiments, image data captured from a construction site using at least one image sensor may be obtained. Further, in some examples, the image data may be analyzed to identify a construction error. Further, in some examples, the image data may be analyzed to identify a degree of the construction error. Further, in some examples, the identified degree of the construction error may be compared with a threshold selected based on an analysis of a construction plan associated with the construction site. Further, in some examples, in response to a first result of the comparison, a first severity may be assigned to the construction error, and in response to a second result of the comparison, a second severity may be assigned to the construction error, the second severity differs from the first severity. Further, in some examples, information related to the construction error may be provided, for example based on the severity assigned to the construction error.

Consistent with other disclosed embodiments, non-transitory computer-readable storage media may store data and/or computer implementable instructions for carrying out any of the methods described herein.

The foregoing general description and the following detailed description are exemplary and explanatory only and are not restrictive of the claims.

BRIEF DESCRIPTION OF THE DRAWINGS

FIG. 18 illustrates an example of a method for visual presentation of construction errors.

DESCRIPTION

Figure 1A:
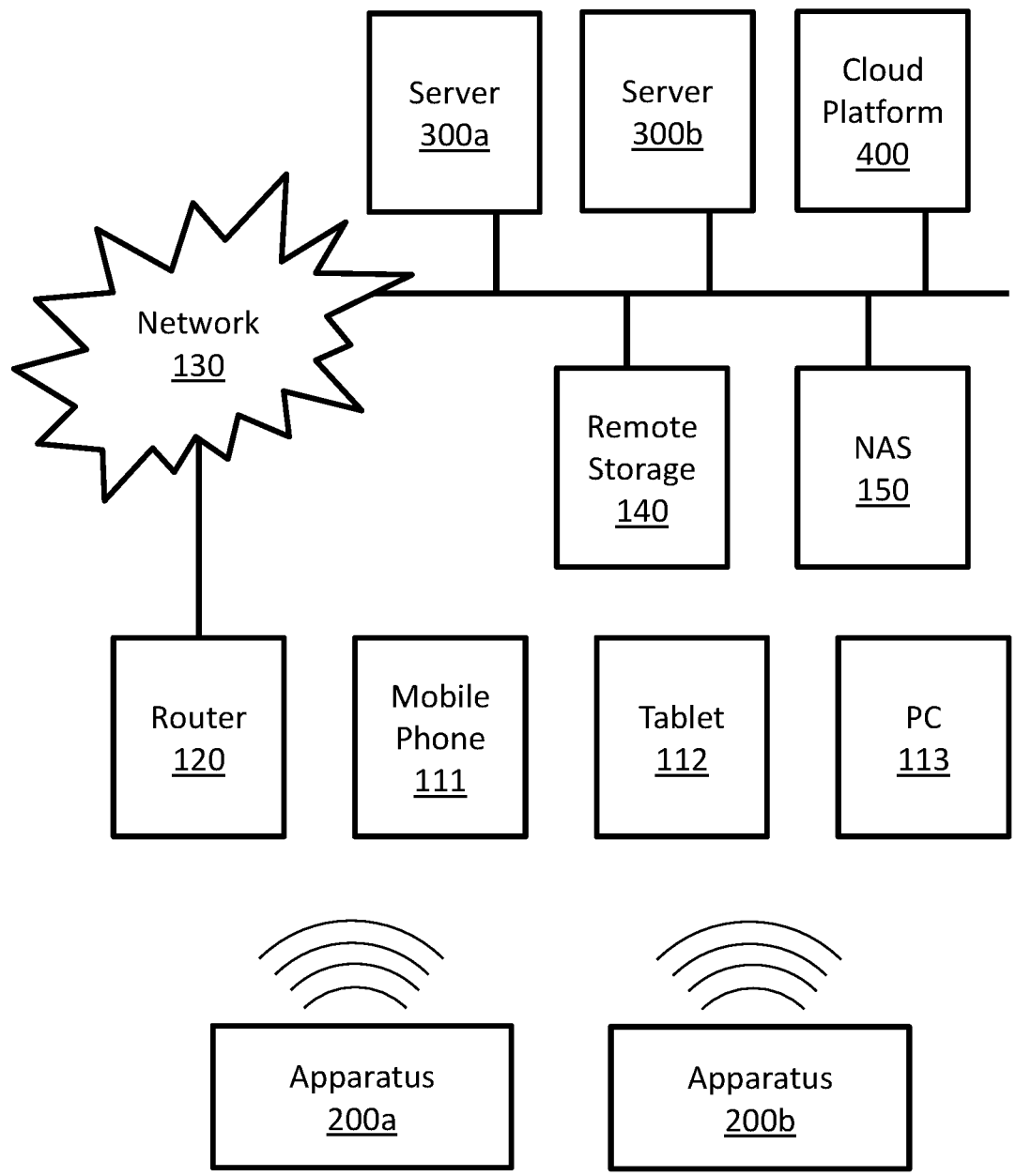
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor, such as, a digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "compressive strength test" is recognized by those skilled in the art and refers to a test that mechanically measure the maximal amount of compressive load a material, such as a body or a cube of concrete, can bear before fracturing.

The term "water permeability test" is recognized by those skilled in the art and refers to a test of a body or a cube of concrete that measures the depth of penetration of water maintained at predetermined pressures for a predetermined time intervals.

The term "rapid chloride ion penetration test" is recognized by those skilled in the art and refers to a test that measures the ability of concrete to resist chloride ion penetration.

The term "water absorption test" is recognized by those skilled in the art and refers to a test of concrete specimens that, after drying the specimens, emerges the specimens in water at predetermined temperature and/or pressure for predetermined time intervals, and measures the weight of water absorbed by the specimens.

The term "initial surface absorption test" is recognized by those skilled in the art and refers to a test that measures the flow of water per concrete surface area when subjected to a constant water head.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3.

Figure 4A:
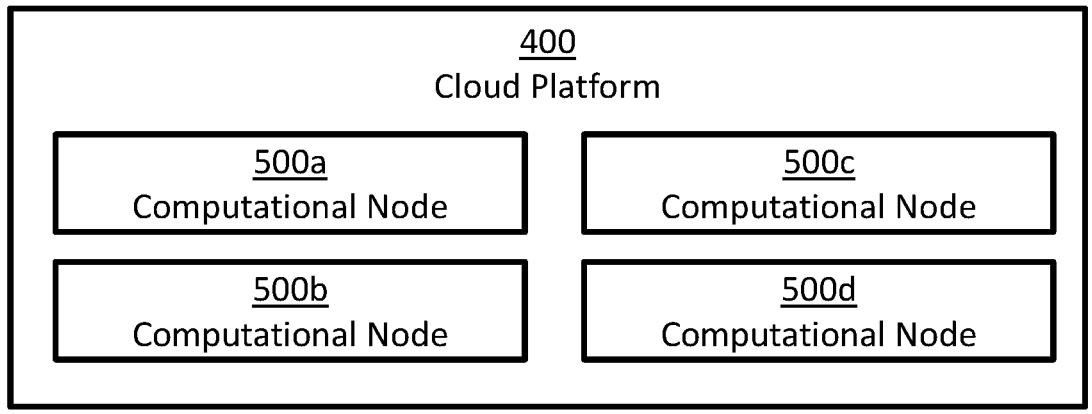
FIGS. 4A and 4B are block diagrams illustrating some possible implementations of a cloud platform.
Figure 4B:
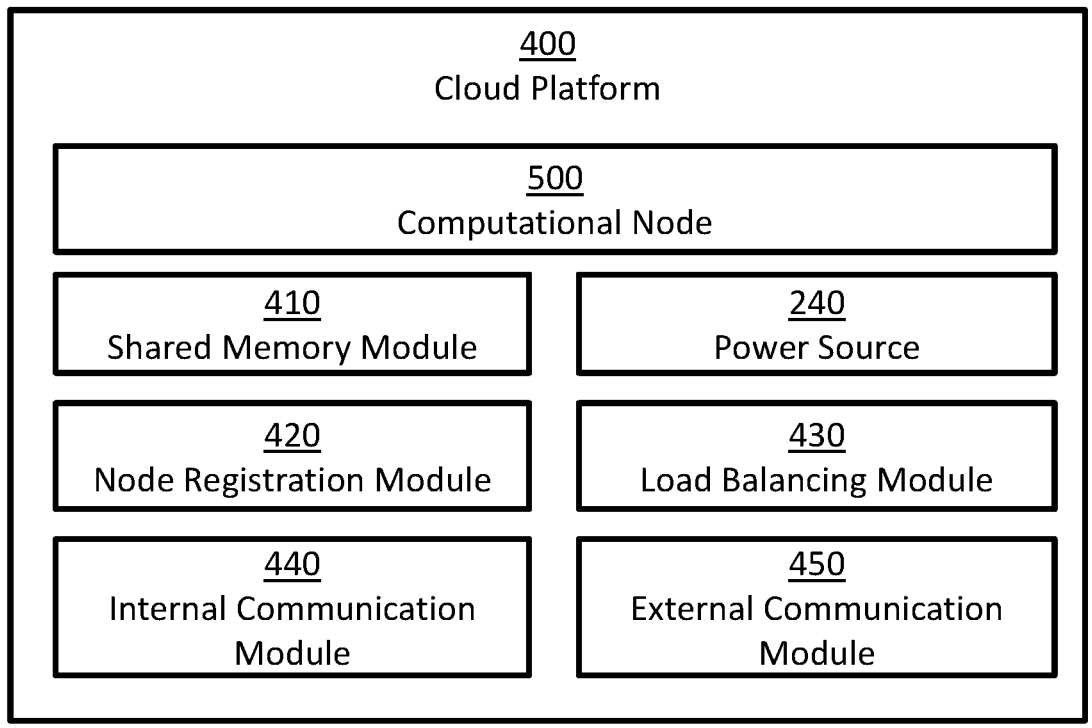
Figure 5:
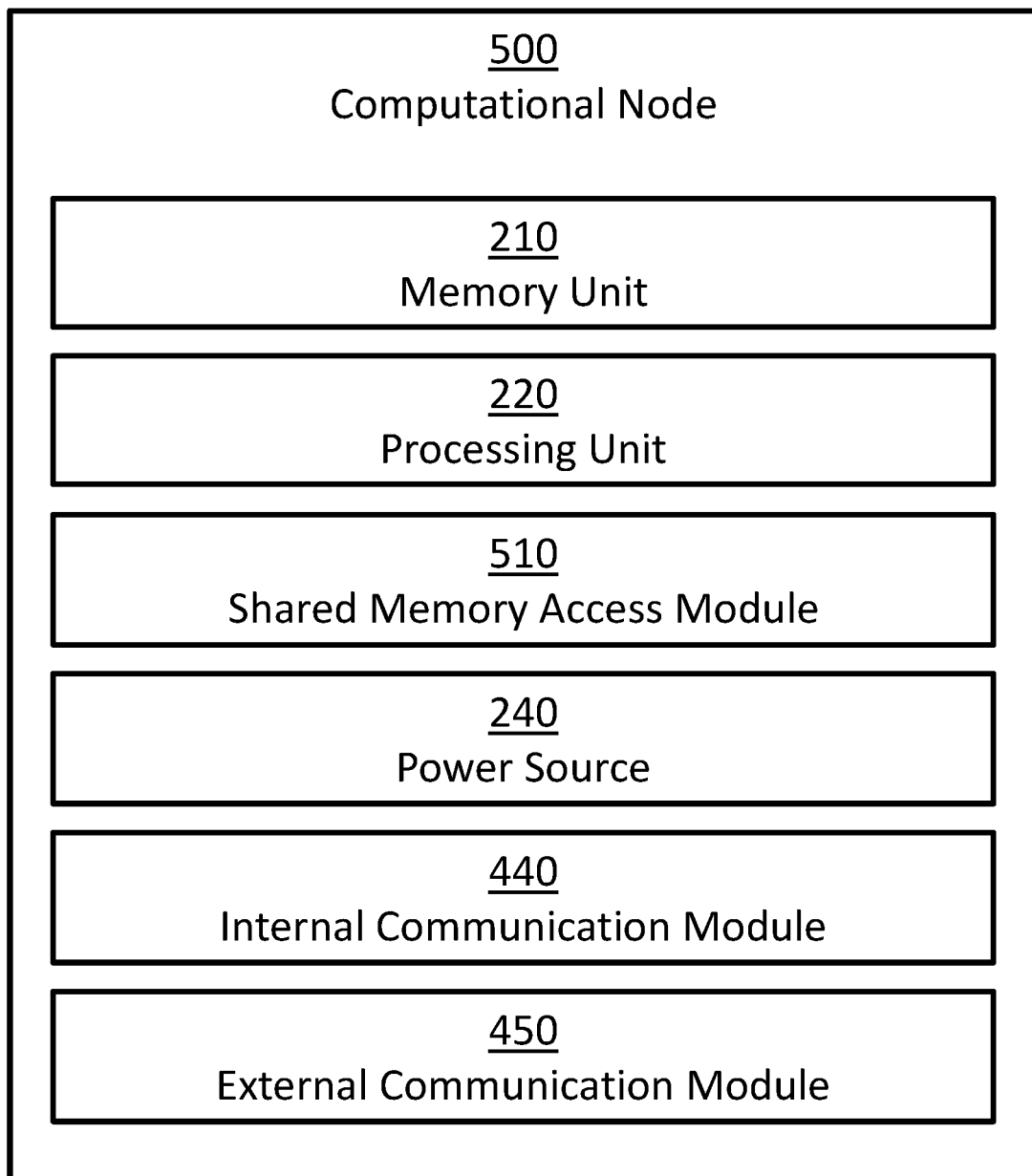
FIG. 5 is a block diagram illustrating a possible implementation of a computational node.

Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200a and 200b may connect to communication network 130 through local router 120 and/or directly. Apparatuses 200a and 200b may communicate with other devices, such as servers 300a, server 300b, cloud platform 400, remote storage 140 and network attached storage (NAS) 150, through communication network 130 and/or directly.

Figure 1B:
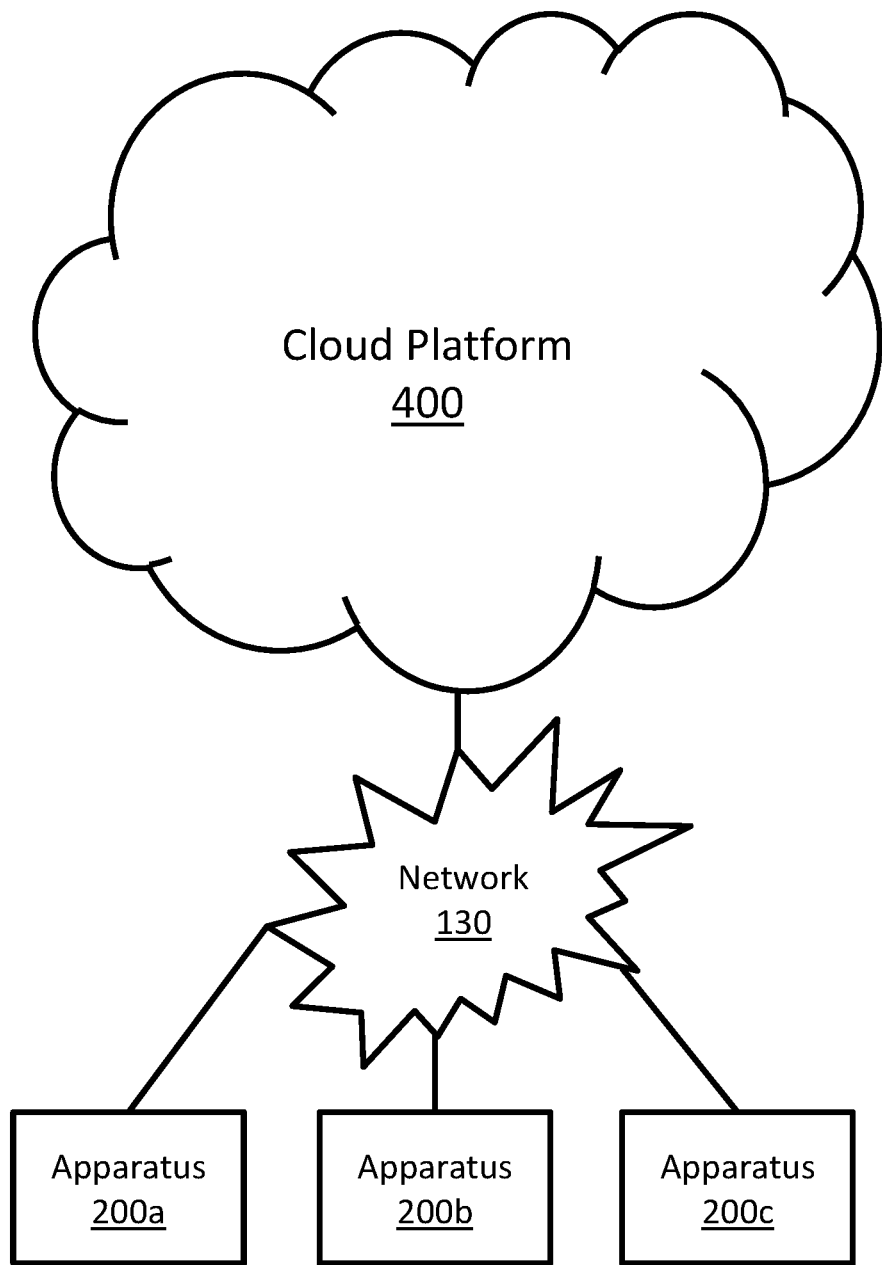

FIG. 1B is a block diagram illustrating a possible implementation of a communicating system. In this example, apparatuses 200a, 200b and 200c may communicate with cloud platform 400 and/or with each other through communication network 130. Possible implementations of apparatuses 200a, 200b and 200c may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
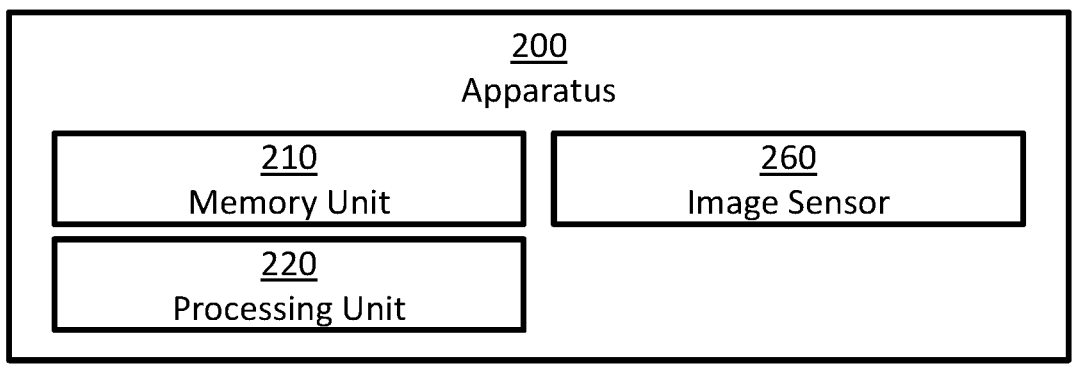
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more image sensors 260. In some implementations, apparatus 200 may comprise additional components, while some components listed above may be excluded.

Figure 2B:
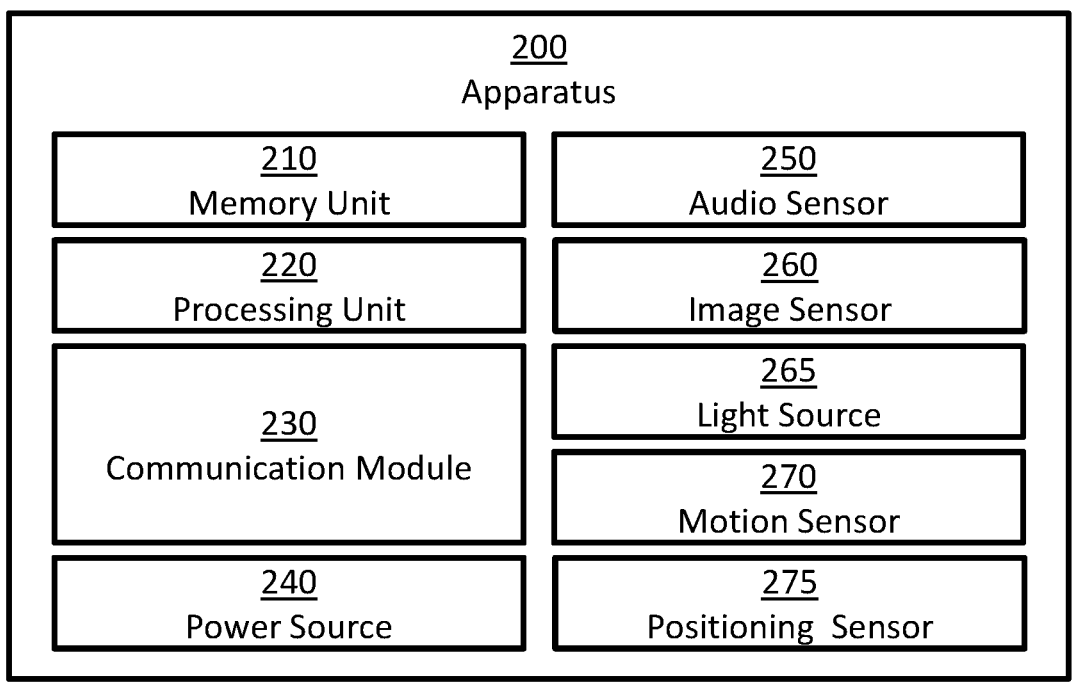

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, and one or more positioning sensors 275. In some implementations, apparatus 200 may comprise additional components, while some components listed above may be excluded. For example, in some implementations apparatus 200 may also comprise at least one of the following: one or more barometers; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, and positioning sensors 275.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors; temperature sensors; barometers; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; 3D images; sequence of 3D images; 3D videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum. In some examples, image sensors 260 may capture light emitted by light sources 265, for example in order to capture 3D images and/or 3D videos using active stereo method.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors may be stored in memory units 210, may be processed by processing units 220, may be transmitted and/or received using communication modules 230, and so forth.

In some embodiments, the one or more temperature sensors may be configured to detect changes in the temperature of the environment of apparatus 200 and/or to measure the temperature of the environment of apparatus 200. In some examples, information captured using temperature sensors may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
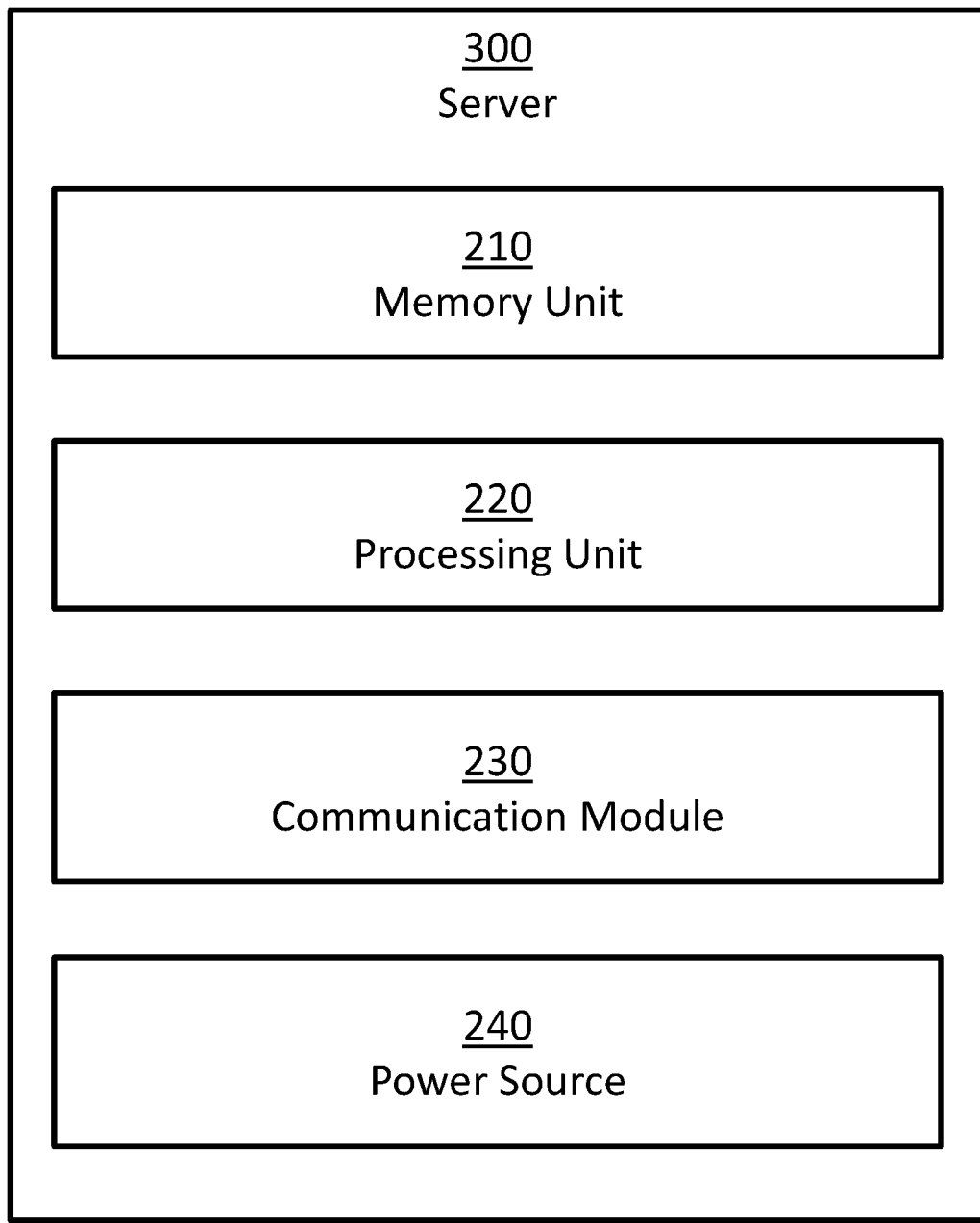
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors; temperature sensors; barometers; and so forth.

Figure 6:
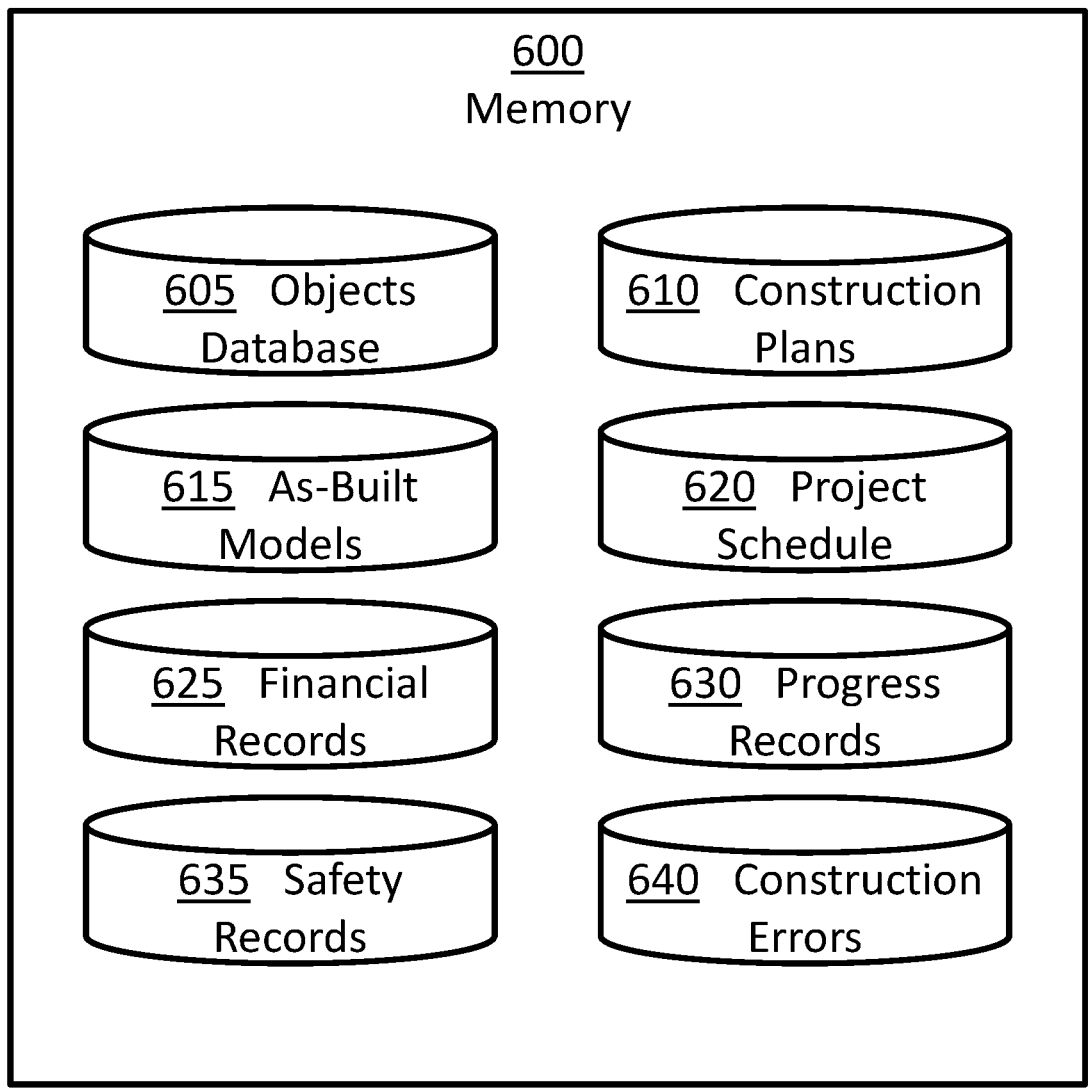
FIG. 6 illustrates an exemplary embodiment of a memory storing a plurality of modules.

FIG. 6 illustrates an exemplary embodiment of memory 600 storing a plurality of modules. In some examples, memory 600 may be separate from and/or integrated with memory units 210, separate from and/or integrated with memory units 410, and so forth. In some examples, memory 600 may be included in a single device, for example in apparatus 200, in server 300, in cloud platform 400, in computational node 500, and so forth. In some examples, memory 600 may be distributed across several devices. Memory 600 may store more or fewer modules than those shown in FIG. 6. In this example, memory 600 may comprise: objects database 605, construction plans 610, as-built models 615, project schedules 620, financial records 625, progress records 630, safety records 635, and construction errors 640.

In some embodiments, objects database 605 may comprise information related to objects associated with one or more construction sites. For example, the objects may include objects planned to be used in a construction site, objects ordered for a construction site, objects arrived at a construction site and awaiting to be used and/or installed, objects used in a construction site, objects installed in a construction site, and so forth. In some examples, the information related to an object in database 605 may include properties of the object, type, brand, configuration, dimensions, weight, price, supplier, manufacturer, identifier of related construction site, location (for example, within the construction site), time of planned arrival, time of actual arrival, time of usage, time of installation, actions need to be taken that involves the object, actions performed using and/or on the object, people associated with the actions (such as persons that need to perform an action, persons that performed an action, persons that monitor the action, persons that approve the action, etc.), tools associated with the actions (such as tools required to perform an action, tools used to perform the action, etc.), quality, quality of installation, other objects used in conjunction with the object, and so forth. In some examples, elements in objects database 605 may be indexed and/or searchable, for example using a database, using an indexing data structure, and so forth.

In some embodiments, construction plans 610 may comprise documents, drawings, models, representations, specifications, measurements, bill of materials, architectural plans, architectural drawings, floor plans, 2D architectural plans, 3D architectural plans, construction drawings, feasibility plans, demolition plans, permit plans, mechanical plans, electrical plans, space plans, elevations, sections, renderings, computer-aided design data, Building Information Modeling (BIM) models, and so forth, indicating design intention for one or more construction sites and/or one or more portions of one or more construction sites. Construction plans 610 may be digitally stored in memory 600, as described above.

In some embodiments, as-built models 615 may comprise documents, drawings, models, representations, specifications, measurements, list of materials, architectural drawings, floor plans, 2D drawings, 3D drawings, elevations, sections, renderings, computer-aided design data, Building Information Modeling (BIM) models, and so forth, representing one or more buildings or spaces as they were actually constructed. As-built models 615 may be digitally stored in memory 600, as described above.

In some embodiments, project schedules 620 may comprise details of planned tasks, milestones, activities, deliverables, expected task start time, expected task duration, expected task completion date, resource allocation to tasks, linkages of dependencies between tasks, and so forth, related to one or more construction sites. Project schedules 620 may be digitally stored in memory 600, as described above.

In some embodiments, financial records 625 may comprise information, records and documents related to financial transactions, invoices, payment receipts, bank records, work orders, supply orders, delivery receipts, rental information, salaries information, financial forecasts, financing details, loans, insurance policies, and so forth, associated with one or more construction sites. Financial records 625 may be digitally stored in memory 600, as described above.

In some embodiments, progress records 630 may comprise information, records and documents related to tasks performed in one or more construction sites, such as actual task start time, actual task duration, actual task completion date, items used, item affected, resources used, results, and so forth. Progress records 630 may be digitally stored in memory 600, as described above.

In some embodiments, safety records 635 may include information, records and documents related to safety issues (such as hazards, accidents, near accidents, safety related events, etc.) associated with one or more construction sites. Safety records 635 may be digitally stored in memory 600, as described above.

In some embodiments, construction errors 640 may include information, records and documents related to construction errors (such as execution errors, divergence from construction plans, improper alignment of items, improper placement or items, improper installation of items, concrete of low quality, missing item, excess item, and so forth) associated with one or more construction sites. Construction errors 640 may be digitally stored in memory 600, as described above.

In some embodiments, a method, such as methods 700, 900, 1100, 1200, 1300, 1500, 1600, 1800 and 1900, may comprise of one or more steps. In some examples, these methods, as well as all individual steps therein, may be performed by various aspects of apparatus 200, server 300, cloud platform 400, computational node 500, and so forth. For example, a system comprising of at least one processor, such as processing units 220, may perform any of these methods as well as all individual steps therein, for example by processing units 220 executing software instructions stored within memory units 210 and/or within shared memory modules 410. In some examples, these methods, as well as all individual steps therein, may be performed by a dedicated hardware. In some examples, computer readable medium, such as a non-transitory computer readable medium, may store data and/or computer implementable instructions for carrying out any of these methods as well as all individual steps therein. Some examples of possible execution manners of a method may include continuous execution (for example, returning to the beginning of the method once the method normal execution ends), periodically execution, executing the method at selected times, execution upon the detection of a trigger (some examples of such trigger may include a trigger from a user, a trigger from another process, a trigger from an external device, etc.), and so forth.

Figure 7:
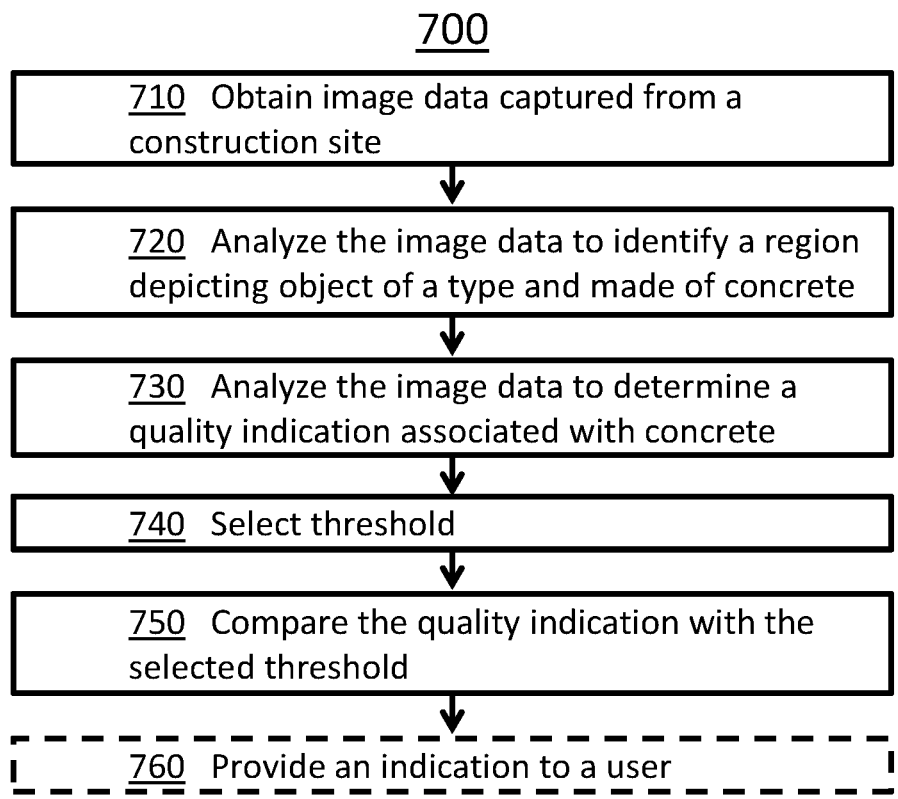
FIG. 7 illustrates an example of a method for processing images of concrete.

FIG. 7 illustrates an example of a method 700 for determining the quality of concrete from construction site images. In this example, method 700 may comprise: obtaining image data captured from a construction site (Step 710); analyzing the image data to identify a region depicting an object of an object type and made of concrete (Step 720); analyzing the image data to determine a quality indication associated with concrete (Step 730); selecting a threshold (Step 740); and comparing the quality indication with the selected threshold (Step 750). Based, at least in part, on the result of the comparison, process 700 may provide an indication to a user (Step 760). In some implementations, method 700 may comprise one or more additional steps, while some of the steps listed above may be modified or excluded. For example, Step 720 and/or Step 740 and/or Step 750 and/or Step 760 may be excluded from method 700. In some implementations, one or more steps illustrated in FIG. 7 may be executed in a different order and/or one or more groups of steps may be executed simultaneously and vice versa. For example, Step 720 may be executed after and/or simultaneously with Step 710, Step 730 may be executed after and/or simultaneously with Step 710, Step 730 may be executed before, after and/or simultaneously with Step 720, Step 740 may be executed at any stage before Step 750, and so forth.

In some embodiments, obtaining image data captured from a construction site (Step 710) may comprise obtaining image data captured from a construction site using at least one image sensor, such as image sensors 260. In some examples, obtaining the images may comprise capturing the image data from the construction site. Some examples of image data may include: one or more images; one or more portions of one or more images; sequence of images; one or more video clips; one or more portions of one or more video clips; one or more video streams; one or more portions of one or more video streams; one or more 3D images; one or more portions of one or more 3D images; sequence of 3D images; one or more 3D video clips; one or more portions of one or more 3D video clips; one or more 3D video streams; one or more portions of one or more 3D video streams; one or more 360 images; one or more portions of one or more 360 images; sequence of 360 images; one or more 360 video clips; one or more portions of one or more 360 video clips; one or more 360 video streams; one or more portions of one or more 360 video streams; information based, at least in part, on any of the above; any combination of the above; and so forth.

In some examples, Step 710 may comprise obtaining image data captured from a construction site (and/or capturing the image data from the construction site) using at least one wearable image sensor, such as wearable version of apparatus 200 and/or wearable version of image sensor 260. For example, the wearable image sensors may be configured to be worn by construction workers and/or other persons in the construction site. For example, the wearable image sensor may be physically connected and/or integral to a garment, physically connected and/or integral to a belt, physically connected and/or integral to a wrist strap, physically connected and/or integral to a necklace, physically connected and/or integral to a helmet, and so forth.

In some examples, Step 710 may comprise obtaining image data captured from a construction site (and/or capturing the image data from the construction site) using at least one stationary image sensor, such as stationary version of apparatus 200 and/or stationary version of image sensor 260. For example, the stationary image sensors may be configured to be mounted to ceilings, to walls, to doorways, to floors, and so forth. For example, a stationary image sensor may be configured to be mounted to a ceiling, for example substantially at the center of the ceiling (for example, less than two meters from the center of the ceiling, less than one meter from the center of the ceiling, less than half a meter from the center of the ceiling, and so forth), adjunct to an electrical box in the ceiling, at a position in the ceiling corresponding to a planned connection of a light fixture to the ceiling, and so forth. In another example, two or more stationary image sensors may be mounted to a ceiling in a way that ensures that the fields of view of the two cameras include all walls of the room.

In some examples, Step 710 may comprise obtaining image data captured from a construction site (and/or capturing the image data from the construction site) using at least one mobile image sensor, such as mobile version of apparatus 200 and/or mobile version of image sensor 260. For example, mobile image sensors may be operated by construction workers and/or other persons in the construction site to capture image data of the construction site. In another example, mobile image sensors may be part of a robot configured to move through the construction site and capture image data of the construction site. In yet another example, mobile image sensors may be part of a drone configured to fly through the construction site and capture image data of the construction site.

In some examples, Step 710 may comprise, in addition or alternatively to obtaining image data and/or other input data, obtaining motion information captured using one or more motion sensors, for example using motion sensors 270. Examples of such motion information may include: indications related to motion of objects; measurements related to the velocity of objects; measurements related to the acceleration of objects; indications related to motion of motion sensor 270; measurements related to the velocity of motion sensor 270; measurements related to the acceleration of motion sensor 270; information based, at least in part, on any of the above; any combination of the above; and so forth.

In some examples, Step 710 may comprise, in addition or alternatively to obtaining image data and/or other input data, obtaining position information captured using one or more positioning sensors, for example using positioning sensors 275. Examples of such position information may include: indications related to the position of positioning sensors 275; indications related to changes in the position of positioning sensors 275; measurements related to the position of positioning sensors 275; indications related to the orientation of positioning sensors 275; indications related to changes in the orientation of positioning sensors 275; measurements related to the orientation of positioning sensors 275; measurements related to changes in the orientation of positioning sensors 275; information based, at least in part, on any of the above; any combination of the above; and so forth.

In some embodiments, Step 710 may comprise receiving input data using one or more communication devices, such as communication modules 230, internal communication modules 440, external communication modules 450, and so forth. Examples of such input data may include: input data captured using one or more sensors; image data captured using image sensors, for example using image sensors 260; motion information captured using motion sensors, for example using motion sensors 270; position information captured using positioning sensors, for example using positioning sensors 275; and so forth.

In some embodiments, Step 710 may comprise reading input data from memory units, such as memory units 210, shared memory modules 410, and so forth. Examples of such input data may include: input data captured using one or more sensors; image data captured using image sensors, for example using image sensors 260; motion information captured using motion sensors, for example using motion sensors 270; position information captured using positioning sensors, for example using positioning sensors 275; and so forth.

In some embodiments, analyzing image data, for example by Step 720, Step 730, Step 930, Step 1120, Step 1320, Step 1520, Step 1530, etc., may comprise analyzing the image data to obtain a preprocessed image data, and subsequently analyzing the image data and/or the preprocessed image data to obtain the desired outcome. One of ordinary skill in the art will recognize that the followings are examples, and that the image data may be preprocessed using other kinds of preprocessing methods. In some examples, the image data may be preprocessed by transforming the image data using a transformation function to obtain a transformed image data, and the preprocessed image data may comprise the transformed image data. For example, the transformed image data may comprise one or more convolutions of the image data. For example, the transformation function may comprise one or more image filters, such as low-pass filters, high-pass filters, band-pass filters, all-pass filters, and so forth. In some examples, the transformation function may comprise a nonlinear function. In some examples, the image data may be preprocessed by smoothing the image data, for example using Gaussian convolution, using a median filter, and so forth. In some examples, the image data may be preprocessed to obtain a different representation of the image data. For example, the preprocessed image data may comprise: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy representation of at least part of the image data; a lossless representation of at least part of the image data; a time ordered series of any of the above; any combination of the above; and so forth. In some examples, the image data may be preprocessed to extract edges, and the preprocessed image data may comprise information based on and/or related to the extracted edges. In some examples, the image data may be preprocessed to extract image features from the image data. Some examples of such image features may comprise information based on and/or related to: edges; corners; blobs; ridges; Scale Invariant Feature Transform (SIFT) features; temporal features; and so forth.

In some embodiments, analyzing image data, for example by Step 720, Step 730, Step 930, Step 1120, Step 1320, Step 1520, Step 1530, etc., may comprise analyzing the image data and/or the preprocessed image data using one or more rules, functions, procedures, artificial neural networks, object detection algorithms, face detection algorithms, visual event detection algorithms, action detection algorithms, motion detection algorithms, background subtraction algorithms, inference models, and so forth. Some examples of such inference models may include: an inference model preprogrammed manually; a classification model; a regression model; a result of training algorithms, such as machine learning algorithms and/or deep learning algorithms, on training examples, where the training examples may include examples of data instances, and in some cases, a data instance may be labeled with a corresponding desired label and/or result; and so forth.

In some embodiments, analyzing the image data to identify a region depicting an object of an object type and made of concrete (Step 720) may comprise analyzing image data (such as image data captured from a construction site using at least one image sensor and obtained by Step 710) and/or preprocessed image data to identify a region of the image data depicting at least part of an object, wherein the object is of an object type and made, at least partly, of concrete. In one example, multiple regions may be identified, depicting multiple such objects of a single object type and made, at least partly, of concrete. In another example, multiple regions may be identified, depicting multiple such objects of a plurality of object types and made, at least partly, of concrete. In some examples, an identified region of the image data may comprise rectangular region of the image data containing a depiction of at least part of the object, map of pixels of the image data containing a depiction of at least part of the object, a single pixel of the image data within a depiction of at least part of the object, a continuous segment of the image data including a depiction of at least part of the object, a non-continuous segment of the image data including a depiction of at least part of the object, and so forth.

In some examples, the image data may be preprocessed to identify colors and/or textures within the image data, and a rule for detecting concrete based, at least in part, on the identified colors and/or texture may be used. For example, local histograms of colors and/or textures may be assembled, and concrete may be detected when the assembled histograms meet predefined criterions. In some examples, the image data may be processed with an inference model to detect regions of concrete. For example, the inference model may be a result of a machine learning and/or deep learning algorithm trained on training examples. A training example may comprise example images together with markings of regions depicting concrete in the images. The machine learning and/or deep learning algorithms may be trained using the training examples to identify images depicting concrete, to identify the regions within the images that depict concrete, and so forth.

In some examples, the image data may be processed using object detection algorithms to identify objects made of concrete, for example to identify objects made of concrete of a selected object type. Some examples of such object detection algorithms may include: appearance based object detection algorithms, gradient based object detection algorithms, gray scale object detection algorithms, color based object detection algorithms, histogram based object detection algorithms, feature based object detection algorithms, machine learning based object detection algorithms, artificial neural networks based object detection algorithms, 2D object detection algorithms, 3D object detection algorithms, still image based object detection algorithms, video based object detection algorithms, and so forth.

In some examples, Step 720 may further comprise analyzing the image data to determine at least one property related to the detected concrete, such as a size of the surface made of concrete, a color of the concrete surface, a position of the concrete surface (for example based, at least in part, on the position information and/or motion information obtained by Step 710), a type of the concrete surface, and so forth. For example, a histogram of the pixel colors and/or gray scale values of the identified regions of concrete may be generated. In another example, the size in pixels of the identified regions of concrete may be calculated. In yet another example, the image data may be analyzed to identify a type of the concrete surface, such as an object type (for example, a wall, a ceiling, a floor, a stair, and so forth). For example, the image data and/or the identified region of the image data may be analyzed using an inference model configured to determine the type of surface (such as an object type). The inference model may be a result of a machine learning and/or deep learning algorithm trained on training examples. A training example may comprise example images and/or image regions together with a label describing the type of concrete surface (such as an object type). The inference model may be applied to new images and/or image regions to determine the type of the surface (such as an object type).

In some examples, Step 720 may comprise analyzing a construction plan 610 associated with the construction site to determine the object type of the object. For example, the construction plan may be analyzed to identify an object type specified for an object in the construction plan, for example based on a position of the object in the construction site.

In some examples, Step 720 may comprise analyzing an as-build model 615 associated with the construction site to determine the object type of the object. For example, the as-build model may be analyzed to identify an object type specified for an object in the as-build model, for example based on a position of the object in the construction site.

In some examples, Step 720 may comprise analyzing a project schedule 620 associated with the construction site to determine the object type of the object. For example, the project schedule may be analyzed to identify objects of what object types should be in the construction site (or in parts of the construction site) at a certain time (for example, the capturing time of the image data) according to the project schedule.

In some examples, Step 720 may comprise analyzing financial records 625 associated with the construction site to determine the object type of the object. For example, the financial records may be analyzed to identify objects of what object types should be in the construction site (or in parts of the construction site) at a certain time (for example, the capturing time of the image data) according to the delivery receipts, invoices, purchase orders, and so forth.

In some examples, Step 720 may comprise analyzing progress records 630 associated with the construction site to determine the object type of the object. For example, the progress records may be analyzed to identify objects of what object types should be in the construction site (or in parts of the construction site) at a certain time (for example, the capturing time of the image data) according to the progress records.

In some examples, the image data may be analyzed to determine the object type of the object of Step 720. For example, the image data may be analyzed using a machine learning model trained using training examples to determine object type of an object from one or more images depicting the object (and/or any other input described above). In another example, the image data may be analyzed by an artificial neural network configured to determine object type of an object from one or more images depicting the object (and/or any other input described above).

In some embodiments, Step 730 may comprise analyzing image data (such as image data captured from a construction site using at least one image sensor and obtained by Step 710) and/or preprocessed image data to determine one or more quality indications associated with the concrete (for example, with concrete depicted in image data captured using Step 710, with concrete depicted in regions identified using Step 720, with the concrete that the object of Step 720 is made of, and so forth). In some examples, the quality indications may comprise a discrete grade, a continuous grade, a pass/no pass grade, a degree, a measure, a comparison, and so forth. For example, the quality indication may comprise an indication of a durability of the concrete. In another example, the quality indication may comprise an indication of strength of the concrete. In yet another example, the quality indication may comprise an estimate of a result of a compressive strength test conducted after a selected curing time (such as 28 days, 30 days, 56 days, 60 days, one month, two months, and so forth). In another example, the quality indication may comprise an estimate of a result of a water permeability test. In yet another example, the quality indication may comprise an estimate of a result of a rapid chloride ion penetration test. In another example, the quality indication may comprise an estimate of a result of a water absorption test. In yet another example, the quality indication may comprise an estimate of a result of an initial surface absorption test. In some example, the image data may be analyzed to identify a condition of the concrete, for example where the condition of the concrete may comprise at least one of segregation of the concrete, discoloration of the concrete, scaling of the concrete, crazing of the concrete, cracking of the concrete, and curling of the concrete. Further, the determination of the quality indication may be based, at least in part, on the identified condition of the concrete.

In some embodiments, Step 730 may analyze the image data using an inference model to determine quality indications associated with concrete. For example, the inference model may be a result of a machine learning and/or deep learning algorithm trained on training examples. A training example may comprise example images and/or image regions depicting concrete together with desired quality indications. The machine learning and/or deep learning algorithms may be trained using the training examples to generate an inference model that automatically produced quality indications from images of concrete. In some examples, the training examples may comprise images of concrete together with a measure of the durability of the concrete and/or a measure of the strength of the concrete (for example as determined by a test conducted on the concrete after the image was captured, as determined by a test conducted on a sample of the concrete, as determined by an expert, etc.), and the machine learning and/or deep learning algorithms may be trained using the training examples to generate an inference model that automatically produce a measure of the durability of the concrete and/or a measure of the strength of the concrete from images of concrete. In some examples, the training examples may comprise images of concrete together with a result of a test conducted on the concrete after the image was captured or on a sample of the concrete (such as compressive strength test, water permeability test, rapid chloride ion penetration test, water absorption test, initial surface absorption test, etc.), and the machine learning and/or deep learning algorithms may be trained using the training examples to generate an inference model that automatically estimate the result of the test from images of concrete. The above tests may be performed after a selected curing time of the concrete, such as a day, 36 hours, a week, 28 days, a month, 60 days, less than 30 days, less than 60 days, less than 90 days, more than 28 days, more than 56 days, more than 84 days, any combinations of the above, and so forth. In some examples, the training examples may comprise images of concrete together with a label indicating a condition of the concrete (such as ordinary condition, segregation of the concrete, discoloration of the concrete, scaling of the concrete, crazing of the concrete, cracking of the concrete, curling of the concrete, etc.), the machine learning and/or deep learning algorithms may be trained using the training examples to generate an inference model that automatically identify the condition of concrete from images of concrete, and the quality indications may comprise the automatically identified condition of the concrete and/or information based (at least in part) on the automatically identified condition of the concrete.

In some embodiments, Step 730 may analyze the image data using heuristic rules to determine quality indications associate with concrete. In some examples, histograms based, at least in part, on the image data and/or regions of the image data may be generated. For example, such histograms may comprise histograms of pixel colors, of gray scale values, of image gradients, of image edges, of image corners, of low level image features, and so forth. Further, heuristic rules may be used to analyze the histograms and determine quality indications associate with concrete. For example, a heuristic rule may specify thresholds for different bins of the histogram, and the heuristic rule may determine the quality indications associate with concrete based, at least in part, on a comparison of the histogram bin values with the corresponding thresholds, for example by counting the number of bin values that exceed the corresponding threshold. In some examples, the above thresholds may be selected based, at least in part, on the type of concrete surface (for example as determined by Step 720), for example using one set of threshold values for walls, a second set of threshold values for ceilings, a third set of threshold values for stairs, and so forth.

In some embodiments, selecting a threshold (Step 740) may comprise using the object type of an object (for example, the object of Step 720) to select a threshold. For example, in response to a first object type, a first threshold value may be selected, and in response to a second object type, a second threshold value different from the first threshold value may be selected. For example, a lookup table (for example in a database) may be used to select a threshold according to an object type. In another example, a regression model configured to take as input properties of the object type and calculate a threshold value using the properties of the object type may be used to select a threshold according to an object type.

In some examples, the selection of the threshold by Step 740 may be based, at least in part, on quality indications associated with other objects. For example, the threshold may be selected to be a function of the quality indications associated with the other objects, such as mean, median, mode, minimum, maximum, value that cut the quality indications associated with the other objects to two groups of selected sizes, and so forth. In another example, a distribution of the quality indications associated with other objects may be estimated (for example, using a regression model, using density estimation algorithms, and so forth), and the threshold may be selected to be a function of the estimated distribution, such as mean, median, standard deviation, variance, coefficient of variation, coefficient of dispersion, a parameter of the beta-binomial distribution, a property of the distribution (such as a moment of the distribution), any function of the above, and so forth. For example, the distribution may be estimated to as a beta-binomial distribution, a Wallenius' noncentral hypergeometric distribution, and so forth.

In some examples, the selection of the threshold by Step 740 may be based, at least in part, on a construction plan associated with the construction site. For example, the construction plan may be analyzed to identify minimal quality indication requirements for one or more objects made of concrete, and the threshold may be selected accordingly. In one example, the minimal quality indication requirement may be specified in the construction plan, may be a requirement (such as a legal requirement, an ordinance requirement, a regulative requirement, an industry standard requirement, etc.) due to a specific object or configuration in the construction plan, and so forth.

In some examples, the object may be within a floor, and the selection of the threshold by Step 740 may be based, at least in part, on the floor. For example, the selection of the threshold may be based, at least in part, on the floor number, the floor height, properties of the floor, and so forth. For example, for an object positioned in a specified floor, a first threshold may be selected, while for an identical or similar object positioned in a different specified floor, a second threshold different from the first threshold may be selected. Further, the object may be within a building with a number of floors, and the selection of the threshold by Step 740 may be based, at least in part, on the number of floors, on the build height, on properties of the building, and so forth. For example, for an object positioned in a specified building, a first threshold may be selected, while for an identical or similar object positioned in a different specified building, a second threshold different from the first threshold may be selected. For example, a lookup table (for example in a database) may be used to select a threshold according to properties associated with the floor and/or the building. In another example, a regression model configured to take as input properties of the floor and/or the building and calculate a threshold value using the properties of the floor and/or the building type may be used to select a threshold according to the floor and/or the building.

In some examples, the selection of the threshold by Step 740 may be based, at least in part, on a beam span. For example, for an object associated with a first beam span, a first threshold may be selected, while for an identical or similar object associated with a second beam span, a second threshold different from the first threshold may be selected. For example, the beam span may be compared with a selected length, and the selection of the threshold may be based, at least in part, on a result of the comparison. In another example, a regression model configured to take as input beam span and calculate a threshold value using the beam span may be used to select a threshold according to the beam span.

In some examples, when the object is a wall of a stairway, the threshold may be selected by Step 740 to be a first value, and when the object is a wall not in a stairway, the threshold may be selected by Step 740 to be a value different than the first value. In some examples, when the object is part of a lift shaft, the threshold may be selected by Step 740 to be a first value, and when the object is not part of a lift shaft, the threshold may be selected by Step 740 to be a value different than the first value.

In some examples, the selection of the threshold by Step 740 may be based, at least in part, on multiple factors. For example, a baseline threshold may be selected according to an object type as described above. Further, in some examples the threshold may be increased or decreased (for example, by adding or subtracting a selected value, by multiplying by a selected factor, and so forth) according to at least one of quality indications associated with other objects in the construction site, a construction plan associated with the construction site, the floor (for example, properties of the floor as described above), the building (for example, properties of the building as described above), and so forth.

In some embodiments, Step 750 may comprise comparing the quality indication with the selected threshold. For example, a difference between a value of the quality indication and the selected threshold may be calculated. In another example, it may be determined whether the quality indication is higher than the selected threshold or not. In some examples, an action may be performed based on a result of the comparison of the quality indication with the selected threshold. For example, in response to a first result of the comparison, an action may be performed, and in response to a second result of the comparison, the performance of the action may be forgone. In another example, in response to a first result of the comparison, a first action may be performed, and in response to a second result of the comparison, a second action (different from the first action) may be performed. Some examples of such actions may include providing an indication to a user (as described below in relation to Step 760), updating an electronic record (for example as described below in relation to Step 1130), and so forth.

In some embodiments, Step 760 may comprise providing an indication to a user, for example based, at least in part, on the quality indication (from Step 730) and/or the selected threshold (from Step 740) and/or the result of the comparison of the quality indication with the selected threshold (from Step 750). For example, in response to a first result of the comparison, an indication may be provided to the user, and in response to a second result of the comparison, the providence of the indication may be forgone. In another example, in response to a first result of the comparison, a first indication may be provided to the user, and in response to a second result of the comparison, a second indication (different from the first indication) may be provided to the user. In some examples, the provided indication may comprise a presentation of at least part of the image data with an overlay presenting information based, at least in part, on the quality indication (for example, using a display screen, an augmented reality display system, a printer, and so forth). In some examples, indications may be provided to the user when a quality indication fails to meet some selected criterions, when a quality indication do meet some selected criterions, and so forth. In some examples, the nature and/or content of the indication provided to the user may depend on the quality indication and/or the region of the image corresponding to the quality indications and/or the objects corresponding to the quality indications and/or properties of the objects (such as position, size, color, object type, and so forth) corresponding to the quality indications. In some examples, the indications provided to the user may be provided as a: visual output, audio output, tactile output, any combination of the above, and so forth. In some examples, the amount of indications provided to the user, the events triggering the indications provided to the user, the content of the indications provided to the user, the nature of the indications provided to the user, etc., may be configurable. The indications provided to the user may be provided: by the apparatus detecting the events, through another apparatus (such as a mobile device associated with the user, mobile phone 111, tablet 112, and personal computer 113, etc.), and so forth.

In some embodiments, Step 720 may identify a plurality of regions depicting concrete in the image data obtained by Step 710. For each identified region, Step 730 may determine quality indications for the concrete depicted in the region. The quality indications of the different regions may be compared, and information may be presented to a user based, at least in part, on the result of the comparison, for example as described below. For example, Step 710 may obtain an image of a staircase made of concrete, Step 720 may identify a region for each stair, Step 730 may assign quality measure for the concrete of each stair, the stair corresponding to the lowest quality measure may be identified, and the identified lowest quality measure may be presented to the user, for example as an overlay next to the region of the stair in the image. In another example, Step 710 may obtain a 360 degrees image of a room made of concrete, Step 720 may identify a region for each wall, Step 730 may assign quality measure for the concrete of each wall, the wall corresponding to the lowest quality measure may be identified, and the identified lowest quality measure may be presented to the user, for example as an overlay on the region of the wall in the image. In yet another example, Step 710 may obtain video depicting concrete pillars, Step 720 may identify a frame and/or a region for each pillar, Step 730 may assign quality measure for the concrete of each pillar, a selected number of pillars corresponding to the highest quality measures may be identified, and the identified highest quality measures and/or corresponding pillars may be presented to the user.

In some embodiments, Step 720 may identify a region depicting concrete in the image data obtained by Step 710, and Step 730 may determine quality indications for the concrete depicted in the region. The quality indications may be compared with selected thresholds, and information may be presented to a user based, at least in part, on the result of the comparison, for example as described below. In some examples, the above thresholds may be selected based, at least in part, on the type of concrete surface (such as an object type, for example as determined by Step 720), for example using one thresholds for wall, a second threshold for ceilings, a third threshold for stairs, and so forth. For example, a quality indication may comprise a measure of the durability of the concrete and/or a measure of the strength of the concrete, the quality indication may be compared with a threshold corresponding to a minimal durability requirement and/or a minimal strength requirement, and an indication may be provided to the user when the measure of durability and/or the measure of strength does not meet the minimal requirement. In another example, a quality indication may comprise an estimated result of a test (such as compressive strength test, water permeability test, rapid chloride ion penetration test, water absorption test, initial surface absorption test, etc.), the quality indication may be compared with a threshold corresponding to minimal requirement (for example according to a standard or regulation), and an indication may be provided to the user when the estimated result of the test does not meet the minimal requirement.

Figure 8:
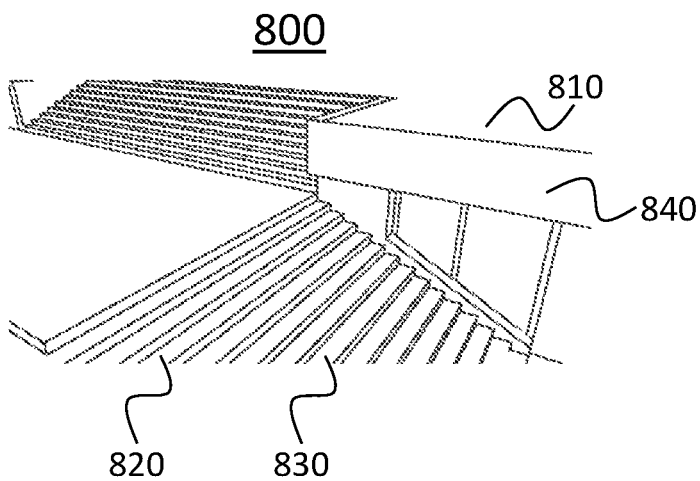
FIG. 8 is a schematic illustration of an example image captured by an apparatus consistent with an embodiment of the present disclosure.

FIG. 8 is a schematic illustration of example image 800 captured by an apparatus, such as apparatus 200. Image 800 may depict some objects made of concrete, such as surface 810, stair 820, stair 830, and wall 840. Method 700 may obtain image 800 using Step 710. As described above, Step 720 may identify regions of image 800 depicting objects made of concrete, such as concrete surface 810, concrete stair 820, concrete stair 830, and concrete wall 840. As described above, Step 730 may determine quality indications associated with concrete surface 810, concrete stair 820, concrete stair 830, and concrete wall 840. Information may be provided to a user based, at least in part, on the identified regions and/or determined quality indications. For example, image 800 may be presented to a user with an overlay specifying the identified regions and/or determined quality indications. Further, the determined quality indications may be compared with selected thresholds, and based on the results of the comparisons, some information may be omitted from the presentation, some information may be presented using first presentation settings (such as font type, font color, font size, background color, emphasis, contrast, transparency, etc.) while other information may be presented using other presentation settings, and so forth. In addition or alternatively to the presentation of image 800, a textual report specifying the identified regions and/or determined quality indications may be provided to the user.

Figure 9:
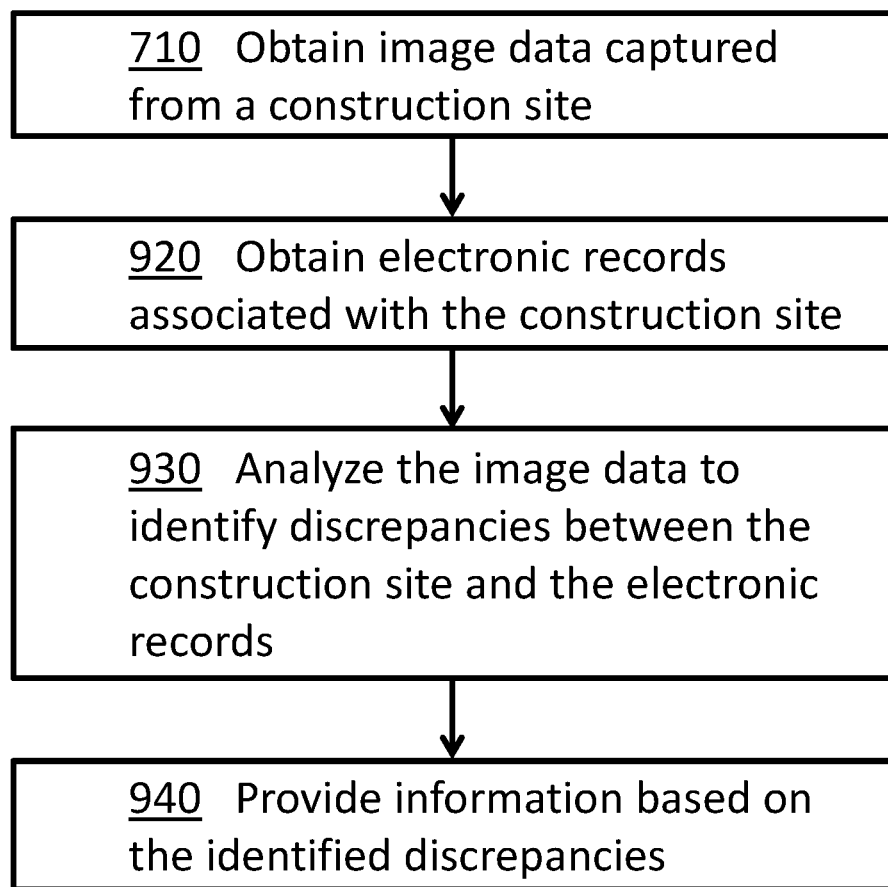
FIG. 9 illustrates an example of a method for providing information based on construction site images.

FIG. 9 illustrates an example of a method 900 for providing information based on construction site images. In this example, method 900 may comprise: obtaining image data captured from a construction site (Step 710), obtaining electronic records associated with the construction site (Step 920), analyzing the image data to identify discrepancies between the construction site and the electronic records (Step 930), and providing information based on the identified discrepancies (Step 940). In some implementations, method 900 may comprise one or more additional steps, while some of the steps listed above may be modified or excluded. For example, Step 940 may be excluded from method 900. In some implementations, one or more steps illustrated in FIG. 9 may be executed in a different order and/or one or more groups of steps may be executed simultaneously and vice versa. For example, Step 920 may be executed before and/or after and/or simultaneously with Step 710, Step 930 may be executed after and/or simultaneously with Step 710 and/or Step 920, Step 940 may be executed after and/or simultaneously with Step 930, and so forth.

In some embodiments, in Step 920 at least one electronic record associated with a construction site may be obtained. For example, the at least one electronic record obtained by Step 920 may comprise information related to objects associated with the construction site, such as objects database 605. In some examples, Step 920 may comprise obtaining at least one electronic construction plan associated with the construction site, for example from construction plans 610. In some examples, Step 920 may comprise obtaining at least one electronic as-built model associated with the construction site, for example from as-built models 615. In some examples, Step 920 may comprise obtaining at least one electronic project schedule associated with the construction site, for example from project schedules 620. In some examples, Step 920 may comprise obtaining at least one electronic financial record associated with the construction site, for example from financial records 625. In some examples, Step 920 may comprise obtaining at least one electronic progress record associated with the construction site, for example from progress records 630. In some examples, Step 920 may comprise obtaining information related to at least one safety issue associated with the construction site, for example from safety records 635. In some examples, Step 920 may comprise obtaining information related to at least one construction error associated with the construction site, for example from construction errors 640.

In some examples, Step 920 may comprise receiving the at least one electronic record associated with a construction site using one or more communication devices, such as communication modules 230, internal communication modules 440, external communication modules 450, and so forth. In some examples, Step 920 may comprise reading the at least one electronic record associated with a construction site from memory units, such as memory units 210, shared memory modules 410, and so forth. In some examples, Step 920 may comprise obtaining information related to at least one object associated with the construction site, for example from objects database 605, by analyzing image data depicting the object in the construction site (for example using Step 1120 as described below), by analyzing electronic records comprising information about the object as described below, and so forth. In some examples, Step 920 may comprise creating the at least one electronic record associated with a construction site, for example by using any the methods described herein. For example, electronic records comprising information related to objects in the construction site and made of concrete may be obtained by using method 700. In another example, electronic records comprising information related to discrepancies between the construction site and other electronic records may be obtained by using method 900. In yet another example, electronic records comprising information related to objects in the construction site may be obtained by using method 1100 and/or method 1300 and/or method 1600. In another example, electronic records comprising information related to financial assessments associated with the construction site may be obtained by using method 1200. In yet another example, electronic records comprising information related to entities associated with the construction site may be obtained by using method 1500.

In some embodiments, Step 930 may analyze image data captured from a construction site (such as image data captured from the construction site using at least one image sensor and obtained by Step 710) to identify at least one discrepancy between at least one electronic record associated with the construction site (such as the at least one electronic record obtained by Step 920) and the construction site. In some examples, Step 930 may analyze the at least one electronic record and/or the image data using a machine learning model trained using training examples to identify discrepancies between the at least one electronic record and the construction site. For example, a training example may comprise an electronic record and image data with a corresponding label detailing discrepancies between the electronic record and the construction site. In some examples, Step 930 may analyze the at least one electronic record and the image data using an artificial neural network configured to identify discrepancies between the at least one electronic record and the construction site.

In some examples, when the at least one electronic record comprises a construction plan associated with the construction site (such as construction plan 610, construction plan obtained by Step 920, etc.), Step 930 may identify at least one discrepancy between the construction plan and the construction site. For example, Step 930 may analyze the construction plan and/or the image data to identify an object in the construction plan that does not exist in the construction site, to identify an object in the construction site that does not exist in the construction plan, to identify an object that has a specified location according to the construction plan and is located at a different location in the construction site (for example, to identify an object for which the discrepancy between the location according to the construction plan and the location in the construction site is above a selected threshold), to identify an object that should have a specified property according to the construction plan but has a different property in the construction site (some examples of such property may include type of the object, location of the object, shape of the object, dimensions of the object, color of the object, manufacturer of the object, type of elements in the object, setting of the object, technique of installation of the object, orientation of the object, time of object installment, etc.), to identify an object that should be associated with a specified quantity according to the construction plan but is associated with a different quantity in the construction site (some examples of such quantities may include size of the object, dimensions of the object, number of elements in the object, etc.), and so forth. For example, the image data may be analyzed to detect objects and/or to determine properties of the detected objects (for example, using Step 1120 as described below), the detected objects may be searched in the construction plan (for example using the determined properties), and Step 930 may identify objects detect in the image data that are not found in the construction plan as a discrepancies. In another example, the construction plan may be analyzed to identify objects and/or properties of the identified objects, the identified objects may be searched in the image data (for example, as described above, using the identified properties, etc.), and Step 930 may identify objects identified in the construction plan that are not found in the image data as discrepancies. In yet another example, objects found both in the image data (for example, as described above) and in the construction plan (for example, as described above) may be identified, and Step 930 may compare properties of the identified objects in the image data (for example, determined as described above) with properties of the identified objects in the construction plan to identify discrepancies. Some examples of such properties may include location of the object, quantity associated with the object (as described above), type of the object, shape of the object, dimensions of the object, color of the object, manufacturer of the object, type of elements in the object, setting of the object, technique of installation of the object, orientation of the object, time of object installment, and so forth.

In some examples, when the at least one electronic record comprises a project schedule associated with the construction site (such as project schedule 620, project schedule obtained by Step 920, etc.), Step 930 may identify at least one discrepancy between the project schedule and the construction site. For example, the image data may be associated with time (for example, the capturing time of the image data, the receiving time of the image data, the time of processing of the image data, etc.), and Step 930 may identify at least one discrepancy between a desired state of the construction site at the associated time according to the project schedule and the state of the actual construction site at the associated time as depicted in the image data. For example, the project schedule and/or the image data may be analyzed to identify an object in the construction site at a certain time that should not be in the construction site at the certain time according to the project schedule, to identify an object that should be in the construction site at a certain time according to the project schedule that is not in the construction site at the certain time, to identify an object in the construction site that is in a first state at a certain time that should be in a second state at the certain time according to the project schedule (where the first state may differ from the second state, where the difference between the first state and the second state is at least a select threshold, etc.), and so forth. In some examples, the analysis of the construction plan and/or the image data to identify discrepancy between the construction plan and the construction site (for example, as described above) may use information from the project schedule to determine which discrepancies between the construction plan and the construction site are of importance at a selected time according to the project schedule, to determine which discrepancies between the construction plan and the construction site are expected (and therefore should be, for example, ignored, treated differently, etc.) at a selected time according to the project schedule, to determine which discrepancies between the construction plan and the construction site are unexpected at a selected time according to the project schedule, and so forth.

In some examples, when the at least one electronic record comprises a financial record associated with the construction site (such as financial records 625, financial records obtained by Step 920, etc.), Step 930 may identify at least one discrepancy between the financial record and the construction site. For example, the financial records and/or the image data may be analyzed to identify an object in the construction site that should not be in the construction site according to the financial record (for example, an object that was not paid for, was not ordered, that it's rental have not yet begun or have already ended, that is associated with an entity that should not be in the construction site according to the financial records, etc.), to identify an object that should be in the construction site according to the financial records that is not in the construction site (for example, an object that according to the financial records was paid for, was ordered, was delivered, was invoiced, was installed, is associated with an entity that should be in the construction site according to the financial records, etc.), to identify an object in the construction site that is in a first state at a certain time that should be in a second state at the certain time according to the financial records (for example, where the first state may differ from the second state, where the difference between the first state and the second state is at least a select threshold, etc., for example, where the work for changing the state of the object to the second state was ordered, was billed, was paid for, etc.), and so forth. In some examples, the analysis of the construction plan and/or the image data to identify discrepancy between the construction plan and the construction site (for example, as described above) may use information from the financial records to determine which discrepancies between the construction plan and the construction site are of importance at a selected time according to the financial records (for example, have financial impact that is beyond a selected threshold), to determine which discrepancies between the construction plan and the construction site are not accurately reflected in the financial records, and so forth. In some examples, the analysis of the progress record and/or the image data to identify discrepancy between the progress record and the construction site (for example, as described below) may use information from the financial records to determine which discrepancies between the progress record and the construction site are of importance at a selected time according to the financial records (for example, have financial impact that is beyond a selected threshold), to determine which discrepancies between the progress record and the construction site are not accurately reflected in the financial records, and so forth.

In some examples, when the at least one electronic record comprises a progress record associated with the construction site (such as progress records 630, progress records obtained by Step 920, etc.), Step 930 may identify at least one discrepancy between the progress record and the construction site. For example, the progress records and/or the image data may be analyzed to identify an object in the construction site that should not be in the construction site according to the progress record, to identify an object that should be in the construction site according to the progress records that is not in the construction site, to identify an object in the construction site that is in a first state that should be in a second state according to the progress records (for example, where the first state may differ from the second state, where the difference between the first state and the second state is at least a select threshold, etc.), to identify an action that is not reflected in the image data but that is reported as completed in the progress record, to identify an action that is reflected in the image data but is not reported as completed in the progress record, and so forth. In some examples, the analysis of the construction plan and/or the image data to identify discrepancy between the construction plan and the construction site (for example, as described above) may use information from the progress records to determine which discrepancies between the construction plan and the construction site are in contradiction to the information in the progress records, to determine which discrepancies between the construction plan and the construction site are correctly reflected at a selected time in the progress records, and so forth.

In some examples, when the at least one electronic record comprises an as-built model associated with the construction site (such as as-built model 615, as-built model obtained by Step 920, etc.), Step 930 may identify at least one discrepancy between the as-built model and the construction site. For example, Step 930 may analyze the as-built model and/or the image data to identify an object in the as-built model that does not exist in the construction site, to identify an object in the construction site that does not exist in the as-built model, to identify an object that has a specified location according to the as-built model and is located at a different location in the construction site (for example, to identify an object for which the discrepancy between the location according to the as-built model and the location in the construction site is above a selected threshold), to identify an object that should have a specified property according to the as-built model but has a different property in the construction site (some examples of such property may include type of the object, location of the object, shape of the object, dimensions of object, color of the object, manufacturer of the object, type of elements in the object, setting of the object, technique of installation of the object, orientation of the object, time of object installment, etc.), to identify an object that should be associated with a specified quantity according to the as-built model but is associated with a different quantity in the construction site (some examples of such quantities may include size of the object, length of the object, number of elements in the object, etc.), and so forth.

In some embodiments, Step 940 may provide information (for example, to a user, to another process, to an external device, etc.) based, at least in part, on the at least one discrepancy identified by Step 930. For example, in response to a first identified discrepancy, Step 940 may provide information (for example, to a user, to another process, to an external device, etc.), and in response to a second identified discrepancy, the providence of the information by Step 940 may be forgone. In another example, in response to a first identified discrepancy, Step 940 may provide first information, and in response to a second identified discrepancy, Step 940 may provide second information, different from the first information, for example, to a user, to another process, to an external device, and so forth. In some examples, Step 940 may provide information to a user as a visual output, audio output, tactile output, any combination of the above, and so forth. For example, Step 940 may provide the information to the user: by the apparatus analyzing the information (for example, an apparatus performing at least part of Step 930), through another apparatus (such as a mobile device associated with the user, mobile phone 111, tablet 112, and personal computer 113, etc.), and so forth. For example, the amount of information provided by Step 940, the events triggering the providence of information by Step 940, the content of the information provided by Step 940, and the nature of the information provided by Step 940 may be configurable.

In some examples, Step 940 may present a presentation of at least part of the image data with an overlay presenting information based, at least in part, on the at least one discrepancy identified by Step 930 (for example, using a display screen, an augmented reality display system, a printer, and so forth). For example, objects corresponding to the identified discrepancies may be marked by an overlay. In another example, information related to properties of the identified discrepancies may be presented in conjunction with the depiction of the objects corresponding to the identified discrepancies in the image data. For example, an overlay presenting desired dimensions of an object (such as a room, a wall, a doorway, a window, a tile, an electrical box, etc.) may be presented over a depiction of the object, for example as textual information specifying the desired dimensions and/or the actual dimensions, as a line or a shape demonstrating the desired dimensions, and so forth. In another example, an overlay presenting desired location of an object (such as a doorway, an electrical box, a pipe, etc.) may be presented in conjunction with a depiction of the object, for example as an arrow pointing from the depiction of the object to the correct location, as a marker marking the correct location, as textual information detailing the offset in object location, and so forth. In yet another example, an overlay presenting a desired object missing from the construction site may be presented over the image data, for example in or next to the desired location for the object, with an indication of the type and/or properties of the desired object, and so forth. In another example, an overlay marking an object in the construction site that should not be in the construction site may be presented over or next to the depiction of the object, for example including an X or a similar mark over the object, including textual information explaining the error, and so forth. In yet another example, an overlay marking an object in the construction site that has properties different from some desired properties may be presented over or next to the depiction of the object, for example including a marking of the object, including textual information detailing the discrepancies in properties, and so forth.

In some examples, Step 940 may present a visual presentation of at least part of a construction plan with markings visually presenting information based, at least in part, on the at least one discrepancy identified by Step 930 (for example, using a display screen, an augmented reality display system, a printer, and so forth). For example, objects corresponding to the identified discrepancies may be marked in the displayed construction plan. In another example, information related to properties of the identified discrepancies may be presented in conjunction with the depiction of the objects corresponding to the identified discrepancies in the construction plan. In yet another example, information may be presented as an overlay over the presentation of the construction plan, for example in similar ways to the overlay over the image data described above.

In some examples, Step 940 may present a visual presentation of at least part of a project schedule with markings visually presenting information based, at least in part, on the at least one discrepancy identified by Step 930 (for example, using a display screen, an augmented reality display system, a printer, and so forth). For example, tasks in the project schedules corresponding to the identified discrepancies may be marked in the displayed project schedule. Moreover, information about the identified discrepancies may be displayed in conjunction with the marked tasks. For example, the information about the identified discrepancies may be displayed in conjunction to the marked task and may include an amount of actual delay, an amount of predicted future delay, an amount of advance, construction errors associated with the task, and so forth.

In some examples, Step 940 may present a visual presentation of at least part of a financial record with markings visually presenting information based, at least in part, on the at least one discrepancy identified by Step 930 (for example, using a display screen, an augmented reality display system, a printer, and so forth). For example, items in the financial records (such as payments, orders, bills, deliveries, invoices, purchase orders, etc.) corresponding to the identified discrepancies may be marked in the displayed financial record. Moreover, information about the identified discrepancies may be displayed in conjunction with the marked items. For example, the information about the identified discrepancies may be displayed in conjunction to the marked item and may include an amount of budget overrun, an amount of predicted future budget overrun, a financial saving, an inconsistency in dates associated with the item, and so forth.

In some examples, Step 940 may present a visual presentation of at least part of a progress record with markings visually presenting information based, at least in part, on the at least one discrepancy identified by Step 930 (for example, using a display screen, an augmented reality display system, a printer, and so forth). For example, items in the progress record corresponding to the identified discrepancies may be marked in the displayed progress record. Some examples of such items may include an action that is not reflected in the image data but that is reported as completed in the progress record, an action that is reflected in the image data but is not reported as completed in the progress record, and so forth. Moreover, information about the identified discrepancies may be displayed in conjunction with the marked items.

In some examples, Step 940 may present a visual presentation of at least part of an as-built model with markings visually presenting information based, at least in part, on the at least one discrepancy identified by Step 930 (for example, using a display screen, an augmented reality display system, a printer, and so forth). For example, objects corresponding to the identified discrepancies may be marked in the displayed as-built model. In another example, information related to properties of the identified discrepancies may be presented in conjunction with the depiction of the objects corresponding to the identified discrepancies in the as-built model. In yet another example, information may be presented as an overlay over the presentation of the as-built model, for example in similar ways to the overlay over the image data described above.

In some examples, the information provided by Step 940 may comprise safety data. For example, the at least one electronic record associated with a construction site obtained by Step 920 may comprise safety requirements associated with the construction site. Further, Step 930 may analyze image data captured from a construction site (such as image data captured from the construction site using at least one image sensor and obtained by Step 710) to identify at least one discrepancy between the safety requirements associated with the construction site and the construction site. Further, Step 940 may provide information based, at least in part, on the at least one discrepancy between the safety requirements and the construction site identified by Step 930. For example, a type of scaffolds to be used (for example, at a specified location at the construction site) may be detailed in the safety requirements, while a different type of scaffolds (for example, less safe, incompatible, etc.) may be used in the construction site, as depicted in the image data and identified by Step 930. Further, in response to the identification of the usage of the different type of scaffolds by Step 930, Step 940 may provide information about the usage of a type of scaffolds incompatible with the safety requirements, may visually indicate the location of the incompatible scaffolds (for example, in the image data, in a construction plan, in an as-built model, etc.), and so forth.

In some examples, Step 930 may analyze image data (such as image data captured from the construction site using at least one image sensor and obtained by Step 710) and/or electronic records (such as the at least one electronic record associated with a construction site obtained by Step 920) to compute a measure of the at least one discrepancy identified by Step 930. For example, Step 930 may analyze the image data and/or the electronic records using an artificial neural network configured to compute measures of the discrepancies from image data and/or electronic records. In another example, Step 930 may analyze the image data and/or the electronic records using a machine learning model trained using training examples to compute measures of the discrepancies from image data and/or electronic records. Further, the computed measure of a discrepancy may be compared with a selected threshold, and based on a result of the comparison, providing the information related to the discrepancy by Step 940 may be withheld. For example, in response to a first result of the comparison, Step 940 may provide the information, while in response to a second result of the comparison, providing the information may be delayed and/or forgone. For example, the at least one discrepancy identified by Step 930 may comprise a discrepancy in a position of an object between a construction plan and the construction site, the measure may include a length between the position according to the construction plan and the position in the construction site, and the threshold may be selected according to a legal and/or a contractual obligation associated with the construction site. In another example, the at least one discrepancy identified by Step 930 may comprise a discrepancy in a quantity associated with an object (some examples of such quantity may include size of the object, length of the object, dimensions of a room, number of elements in the object, etc.) between a construction plan and the construction site, the measure may include a difference between the quantity according to the construction plan and the quantity in the construction site, and the threshold may be selected according to a regulatory and/or a contractual obligation associated with the construction site. In yet another example, the at least one discrepancy identified by Step 930 may comprise a discrepancy in a time that an object is installed between a planned time of installation according to a project schedule and the actual time of installation in construction site according to the image data, the measure may include a length of the time difference, and the threshold may be selected according to at least one float (the amount of time that a task in a project schedule can be delayed without causing a delay) associated with the task comprising the installation of the object in the project schedule. In another example, the at least one discrepancy identified by Step 930 may comprise a discrepancy between a status of a task according to progress records and the status of the task in the construction site, and the measure may include a difference in the amount of units handled in the task (area covered in plaster, area covered with tiles, number of electrical boxes installed, etc.) between the amount according to progress records and the amount in the construction site according to the image data.

Consistent with the present disclosure, image data (such as image data captured from the construction site using at least one image sensor and obtained by Step 710) may be analyzed to detect at least one object in the construction site, for example as described below in relation with Step 1120. Further, the image data may be analyzed to identify at least one property of the at least one object (such as position, size, color, object type, etc.), for example as described below in relation with Step 1120. In some examples, Step 940 may further provide information based on the at least one property. For example, providing the information may be further based on at least one position associated with the at least one object (such as, an actual position of the object in the construction site, a position of a depiction of the object in the image data, a planned position for the object according to a construction plan, etc.), for example by providing to the user an indicator of the position, for example, as a set of coordinates, as an indicator on a map, as an indicator on a construction plan, as an indicator in an overlay over a presentation of the image data, and so forth. In another example, providing the information may be further based on a property of the object (such as size, color, object type, quality, manufacturer, volume, weight, etc.), for example by presenting the value of the property as measured from the image data, by presenting the planned and/or required value (or range of values) for the property according to the electronic records (for example, construction plan, financial records showing the manufacturer, as-built model, etc.), by presenting the difference between the two, and so forth.

In some examples, the image data (such as image data captured from the construction site using at least one image sensor and obtained by Step 710) may comprise one or more indoor images of the construction site, the at least one object detected by Step 1120 may comprise a plurality of tiles paving an indoor floor, the at least one property determined by Step 1120 may comprise a number of tiles in the construction site according to the image data, the discrepancy identified by Step 930 may comprise a discrepancy between the number of tiles in the construction site according to the image data and the planned number of tiles according to the electronic records, and the information provided by Step 940 may comprise an indication about the discrepancy between the number of tiles in the construction site and the at least one electronic record. For example, the electronic record may comprise financial records comprising a number of tiles that were billed for, a number of tiles that were paid for, a number of tiles that were ordered, and so forth. In another example, the electronic record may comprise a construction plan comprising a planned number of tiles. In yet another example, the electronic record may comprise a progress record comprising the number of tiles that were reported as installed in the construction site.

Consistent with the present disclosure, image data (such as image data captured from the construction site using at least one image sensor and obtained by Step 710) may be analyzed to identify at least one construction error, for example using Step 1120 as described below. Further, Step 940 may provide an indication of the at least one construction error, for example as described above. For example, an image depicting the construction error may be presented to a user, for example with a visual indicator of the construction error. In another example, the location of the construction error may be indicated on a map, on a construction plan, on an as-build model, and so forth. In yet another example, textual information describing the construction error may be presented to the user. In some examples, the image data and/or the electronic records may be further analyzed to identify a type of the at least one construction error. For example, the image data may be analyzed using a machine learning model trained using training examples to determine type of construction errors from images and/or electronic records. In another example, the image data may be analyzed using an artificial neural network configured to determine a type of construction errors from images and/or electronic records. Further, based, at least in part, on the identified type of the at least one construction error, Step 940 may forgo and/or withhold providing at least part of the information. For example, in response to a first identified type of the at least one construction error, information may be provided to the user, and in response to a second identified type of the at least one construction error, Step 940 may forgo providing the information. In another example, in response to a first identified type of the at least one construction error, Step 940 may provide first information to the user, and in response to a second identified type of the at least one construction error, Step 940 may provide second information different from the first information to the user. In some examples, the image data may be further analyzed to determine a severity associated with the at least one construction error. For example, the image data and/or the electronic records may be analyzed using a machine learning model trained using training examples to determine severity of construction errors from images and/or electronic records. In another example, the image data may be analyzed using an artificial neural network configured to determine a severity of construction errors from images and/or electronic records. Further, based, at least in part, on the determined severity, Step 940 may forgo and/or withhold providing at least part of the information. For example, in response to a first determined severity, Step 940 may provide information to the user, and in response to a second determined severity, Step 940 may forgo providing the information. In another example, in response to a first determined severity, Step 940 may provide first information to the user, and in response to a second determined severity, Step 940 may provide second information different from the first information to the user.

Consistent with the present disclosure, position data associated with at least part of the image data may be obtained, for example as described above with relation to Step 710. Further, Step 940 may provide information based, at least in part, on the obtained position data. For example, a portion of a construction plan and/or as-build model corresponding to the position data may be selected and presented to the user (for example, the position data may specify a room and the construction plan and/or as-build model for the room may be presented, the position data may specify coordinates and a portion of the construction plan and/or as-build model comprising a location corresponding to the specified coordinates may be presented, and so forth). In another example, objects associated with the position data (for example, according to a construction plan) may be selected, and Step 940 may present information related to the selected objects (for example, from objects database 605, construction plans 610, as-built models 615, project schedules 620, financial records 625, progress records 630, safety records 635, and construction errors 640, etc.) to the user.

Consistent with the present disclosure, time associated with at least part of the image data (such as capturing time, processing time, etc.) may be obtained. Further, Step 940 may provide information based, at least in part, on the obtained time. For example, Step 940 may present portions of a project schedule and/or progress records related to the obtained time. In another example, a project schedule and/or progress records may be analyzed to select objects related to the obtained time (for example, objects related to tasks that occur or should occur at or in proximity to the obtained time), and information related to the selected objects (for example, from objects database 605, construction plans 610, as-built models 615, project schedules 620, financial records 625, progress records 630, safety records 635, and construction errors 640, etc.) may be presented to the user.

Consistent with the present disclosure, the image data obtained by Step 710 may comprise at least a first image corresponding to a first point in time and a second image corresponding to a second point in time, and the elapsed time between the first point in time and the second point in time may be at least a selected duration (for example, at least an hour, at least one day, at least two days, at least one week, etc.). Further, Step 930 may analyze the image data for the identification of the at least one discrepancy by comparing the first image with the second image. For example, differences between the images may be identified with relation to a first object while no differences between the images may be identified with relation to a second object, and Step 930 may identify a discrepancy when a progress record does not specify any modification of the first object and/or when a progress record specifies modification of the second object. In another example, an identified difference may indicate that a new object was installed between the first point in time and the second point in time, and Step 930 may identify a discrepancy when a project schedule do not specify such installation in the corresponding time interval.

Consistent with the present disclosure, data based on image data captured from at least one additional construction site may be obtained. Further, Step 940 may provide information based, at least in part, on the obtained data, for example as described above. For example, information about the plurality of construction sites may be aggregated, as described below, statistics from the plurality of construction sites may be generated, and Step 940 may provide information based, at least in part, on the generated statistics to the user. In another example, information from one construction site may be compared with information from other construction sites, and Step 940 may provide information based, at least in part, on that comparison.

Figure 10A:
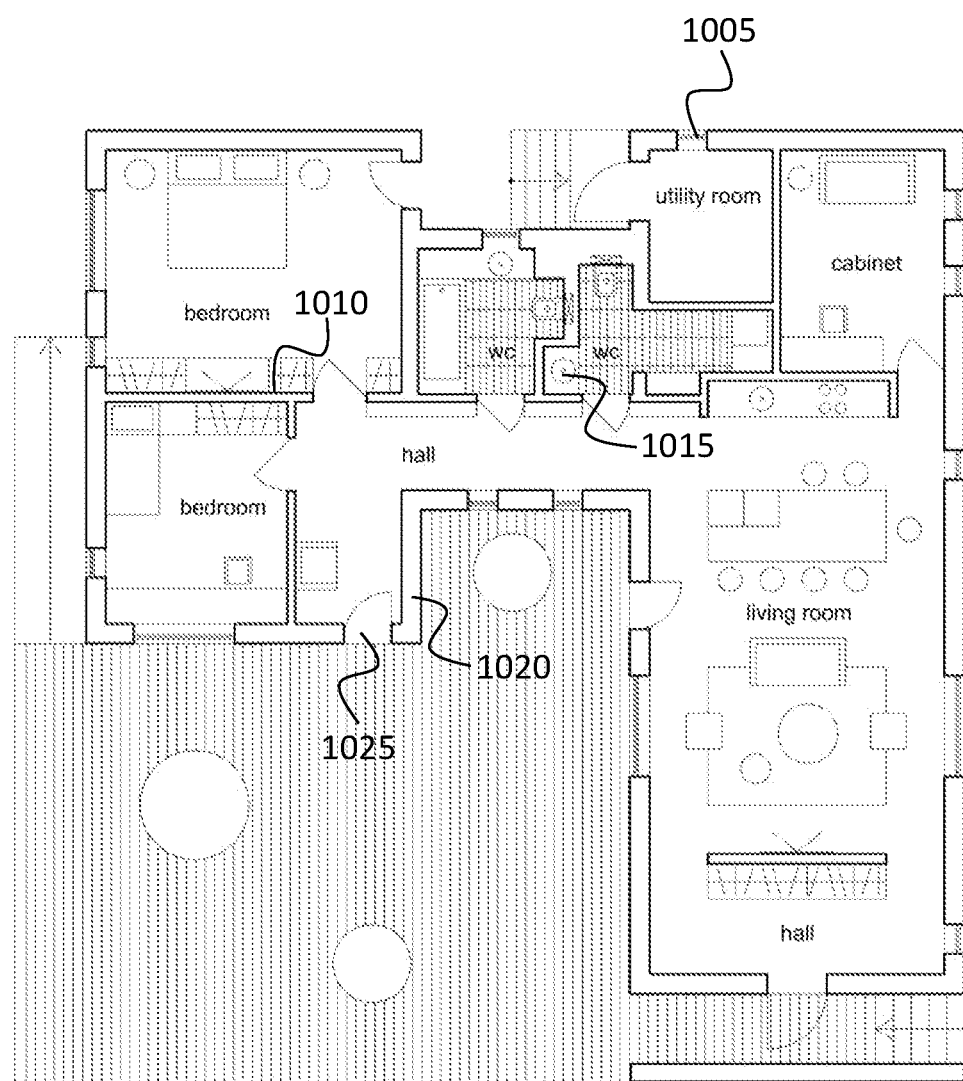
FIG. 10A is a schematic illustration of an example construction plan consistent with an embodiment of the present disclosure.

FIG. 10A is a schematic illustration of an example construction plan 1000 consistent with an embodiment of the present disclosure. For example, construction plan 1000 may be stored in construction plans 610. Construction plan 1000 may include plans of objects, such as window 1005, interior wall 1010, sink 1015, exterior wall 1020, and door 1025. As described above, Step 930 may identify discrepancies between the construction site and the construction plan.

In some examples, Step 930 may identify that window 1005 in the construction site is not according to construction plan 1000. For example, the position of window 1005 in the construction site may be not according to construction plan 1000. Further, the deviation in the position of window 1005 may be calculated. In another example, the size (such as height, width, etc.) of window 1005 in the construction site may be not according to construction plan 1000. Further, the deviation in the size of window 1005 may be calculated. In yet another example, materials and/or parts of window 1005 in the construction site may be not according to construction plan 1000. In another example, window 1005 may be missing altogether from the construction site, for example having a wall instead. In yet another example, window 1005 may exist in the construction site but be missing altogether from construction plan 1000. In some examples, the calculated deviation may be compared with a selected deviation threshold. In some examples, information may be provided to a user, for example using Step 940, based on the discrepancies between window 1005 in the construction site and construction plan 1000, based on the calculated deviation, based on a result of the comparison of the calculated deviation with the selected deviation threshold, and so forth.

In some examples, Step 930 may identify that interior wall 1010 in the construction site is not according to construction plan 1000. For example, the position of interior wall 1010 in the construction site may be not according to construction plan 1000 (and as a result, an adjacent room may be too small or too large). Further, the deviation in the position of interior wall 1010 and/or in the size of the adjacent rooms may be calculated. In another example, the size (such as height, width, thickness, etc.) of interior wall 1010 in the construction site may be not according to construction plan 1000. Further, the deviation in the size of interior wall 1010 may be calculated. In yet another example, materials and/or parts of interior wall 1010 in the construction site may be not according to construction plan 1000. In another example, interior wall 1010 may be missing altogether from the construction site, for example having two adjacent rooms connected. In yet another example, interior wall 1010 may exist in the construction site but be missing altogether from construction plan 1000, for example having a room split into two. In some examples, the calculated deviation may be compared with a selected deviation threshold. In some examples, information may be provided to a user, for example using Step 940, based on the discrepancies between interior wall 1010 in the construction site and construction plan 1000, based on the calculated deviation, based on a result of the comparison of the calculated deviation with the selected deviation threshold, and so forth.

In some examples, Step 930 may identify that sink 1015 in the construction site is not according to construction plan 1000. For example, the position of sink 1015 in the construction site may be not according to construction plan 1000. Further, the deviation in the position of sink 1015 may be calculated. In another example, the size of sink 1015 in the construction site may be not according to construction plan 1000. Further, the deviation in the size of sink 1015 may be calculated. In yet another example, materials and/or parts of sink 1015 in the construction site may be not according to construction plan 1000. In another example, sink 1015 may be missing altogether from the construction site. In yet another example, sink 1015 may exist in the construction site but be missing altogether from construction plan 1000. In some examples, the calculated deviation may be compared with a selected deviation threshold. In some examples, information may be provided to a user, for example using Step 940, based on the discrepancies between sink 1015 in the construction site and construction plan 1000, based on the calculated deviation, based on a result of the comparison of the calculated deviation with the selected deviation threshold, and so forth.

In some examples, Step 930 may identify that a pipe required for sink 1015 is implemented incorrectly in the construction site. For example, an end of the pipe may be in an incorrect position in the construction site according to the position of sink 1015 in construction plan 1000 Further, the deviation in the position of the end of the pipe may be calculated. In another example, the pipe in the construction site may be connected to a wrong water source according to construction plan 1000. In yet another example, the pipe may be missing altogether from the construction site. In yet another example, the pipe may exist in the construction site but be missing altogether from construction plan 1000. In some examples, the calculated deviation may be compared with a selected deviation threshold. In some examples, information may be provided to a user, for example using Step 940, based on the discrepancies between the pipe in the construction site and construction plan 1000, based on the calculated deviation, based on a result of the comparison of the calculated deviation with the selected deviation threshold, and so forth.

In some examples, Step 930 may identify that exterior wall 1020 in the construction site is not according to construction plan 1000. For example, the position of exterior wall 1020 in the construction site may be not according to construction plan 1000 (and as a result, an adjacent room may be too small or too large, connected wall may be too narrow or too wide, for example too narrow for door 1025, and so forth). Further, the deviation in the position of exterior wall 1020 and/or in the size of the adjacent room and/or in the size of connected walls may be calculated. In another example, the size (such as height, width, thickness, etc.) of exterior wall 1020 in the construction site may be not according to construction plan 1000. Further, the deviation in the size of exterior wall 1020 may be calculated. In yet another example, materials and/or parts of exterior wall 1020 in the construction site may be not according to construction plan 1000. In another example, exterior wall 1020 may be missing altogether from the construction site, for example having a room connected to the yard. In yet another example, exterior wall 1020 may exist in the construction site but be missing altogether from construction plan 1000, for example creating an additional room. In some examples, the calculated deviation may be compared with a selected deviation threshold. In some examples, information may be provided to a user, for example using Step 940, based on the discrepancies between exterior wall 1020 in the construction site and construction plan 1000, based on the calculated deviation, based on a result of the comparison of the calculated deviation with the selected deviation threshold, and so forth.

In some examples, Step 930 may identify that door 1025 in the construction site is not according to construction plan 1000. For example, the position of door 1025 in the construction site may be not according to construction plan 1000. Further, the deviation in the position of door 1025 may be calculated. In another example, the size (such as height, width, etc.) of door 1025 in the construction site may be not according to construction plan 1000. Further, the deviation in the size of door 1025 may be calculated. In yet another example, materials and/or parts of door 1025 in the construction site may be not according to construction plan 1000. In another example, door 1025 may be missing altogether from the construction site, for example having a wall instead. In yet another example, door 1025 may exist in the construction site but be missing altogether from construction plan 1000. In some examples, the calculated deviation may be compared with a selected deviation threshold. In some examples, information may be provided to a user, for example using Step 940, based on the discrepancies between door 1025 in the construction site and construction plan 1000, based on the calculated deviation, based on a result of the comparison of the calculated deviation with the selected deviation threshold, and so forth.

Figure 10B:
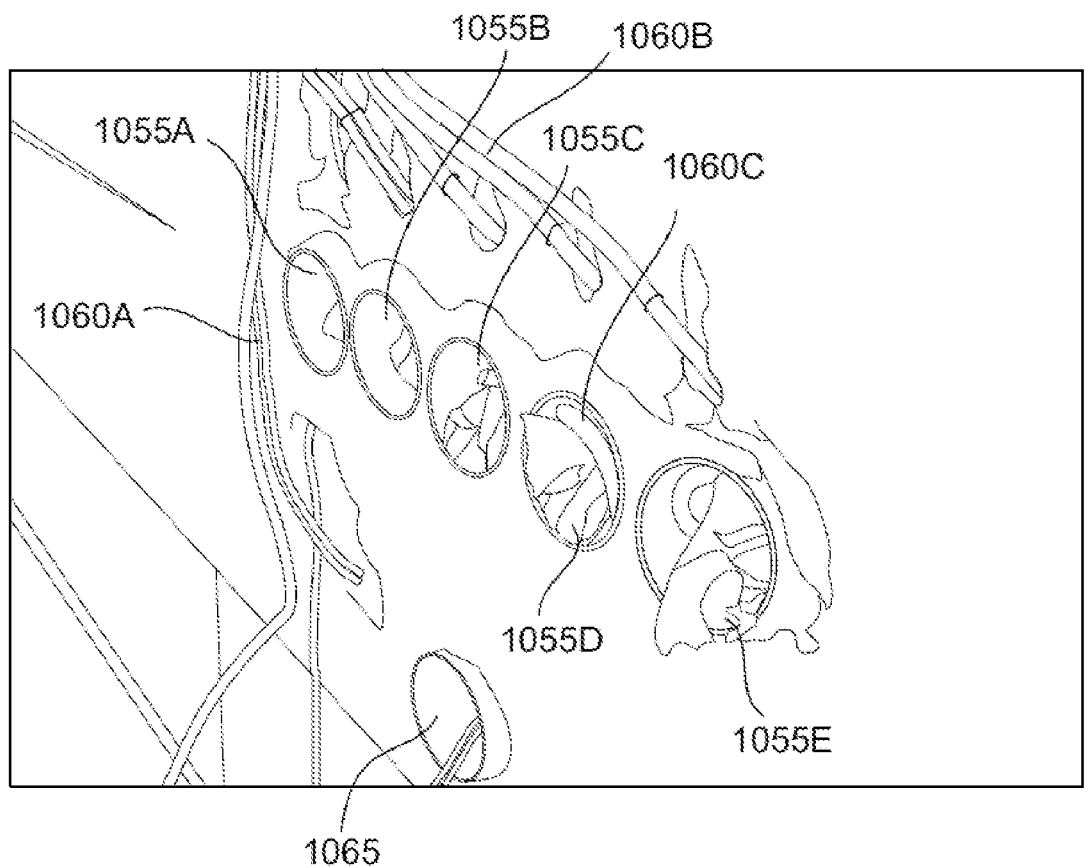
FIG. 10B is a schematic illustration of an example image captured by an apparatus consistent with an embodiment of the present disclosure.

FIG. 10B is a schematic illustration of an example image 1050 captured by an apparatus consistent with an embodiment of the present disclosure. For example, image 1050 may depicts objects in a construction site, such as electrical boxes 1055A, 1055B, 1055C, 1055D and 1055E, electrical wires 1060A, 1060B, and 1060C, and an unidentified box 1065. As described above, Step 930 may identify discrepancies between the construction site as depicted in image 1050 and construction plan associated with the construction site.

In some examples, Step 930 may identify that electrical boxes 1055A, 1055B, 1055C, 1055D and 1055E in the construction site are not according to a construction plan associated with the construction site. For example, the position of electrical boxes 1055A, 1055B, 1055C, 1055D and 1055E in the construction site may be not according to a construction plan associated with the construction site. Further, the deviation in the position of electrical boxes 1055A, 1055B, 1055C, 1055D and 1055E may be calculated. In another example, the size (such as radius, depth, etc.) of electrical boxes 1055A, 1055B, 1055C, 1055D and 1055E in the construction site may be not according to a construction plan associated with the construction site. Further, the deviation in the size of electrical boxes 1055A, 10558, 1055C, 1055D and 1055E may be calculated. In yet another example, materials and/or parts and/or type of electrical boxes 1055A, 10558, 1055C, 1055D and 1055E in the construction site may be not according to a construction plan associated with the construction site. In another example, at least one of additional electrical box included in the construction plan may be missing altogether from the construction site. In yet another example, at least one of electrical boxes 1055A, 1055B, 1055C, 1055D and 1055E may exist in the construction site but be missing altogether from a construction plan associated with the construction site. In some examples, the calculated deviation may be compared with a selected deviation threshold. In some examples, information may be provided to a user, for example using Step 940, based on the discrepancies between electrical boxes 1055A, 1055B, 1055C, 1055D and 1055E in the construction site and a construction plan associated with the construction site, based on the calculated deviation, based on a result of the comparison of the calculated deviation with the selected deviation threshold, and so forth.

In some examples, Step 930 may identify that electrical wires 1060A, 10606, and 1060C in the construction site are not according to a construction plan associated with the construction site. For example, the position of electrical wires 1060A, 10606, and 1060C (or of an end point of electrical wires 1060A, 1060B, and 1060C) in the construction site may be not according to a construction plan associated with the construction site. Further, the deviation in the position of electrical wires 1060A, 10606, and 1060C may be calculated. In another example, the size (such as length, diameter, etc.) of electrical wires 1060A, 1060B, and 1060C in the construction site may be not according to a construction plan associated with the construction site. Further, the deviation in the size of electrical wires 1060A, 1060B, and 1060C may be calculated. In yet another example, materials and/or parts and/or type of electrical wires 1060A, 1060B, and 1060C in the construction site may be not according to a construction plan associated with the construction site. In another example, at least one of additional electrical wire included in the construction plan may be missing altogether from the construction site. In yet another example, at least one of electrical wires 1060A, 1060B, and 1060C may exist in the construction site but be missing altogether from a construction plan associated with the construction site. In some examples, the calculated deviation may be compared with a selected deviation threshold. In some examples, information may be provided to a user, for example using Step 940, based on the discrepancies between electrical boxes 1055A, 1055B, 1055C, 1055D and 1055E in the construction site and a construction plan associated with the construction site, based on the calculated deviation, based on a result of the comparison of the calculated deviation with the selected deviation threshold, and so forth.

Figure 11:
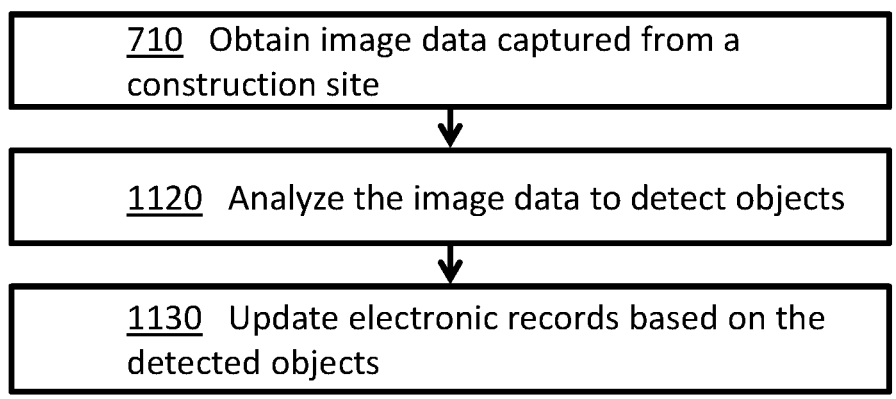
FIG. 11 illustrates an example of a method for updating records based on construction site images.

FIG. 11 illustrates an example of a method 1100 for updating records based on construction site images. In this example, method 1100 may comprise: obtaining image data captured from a construction site (Step 710), analyzing the image data to detect objects (Step 1120), and updating electronic records based on the detected objects (Step 1130). In some implementations, method 1100 may comprise one or more additional steps, while some of the steps listed above may be modified or excluded. For example, Step 1130 may be excluded from method 1100. In some implementations, one or more steps illustrated in FIG. 11 may be executed in a different order and/or one or more groups of steps may be executed simultaneously and vice versa. For example, Step 1120 may be executed after and/or simultaneously with Step 710, Step 1130 may be executed after and/or simultaneously with Step 1120, and so forth.

Additionally or alternatively, Step 930 may identify a discrepancy between electronic records and the construction site as depicted in the image data, for example as described above, and in response Step 1130 may update the electronic records according to the identified discrepancy.

In some embodiments, Step 1120 may analyze image data (such as image data captured from the construction site using at least one image sensor and obtained by Step 710) to detect at least one object in the construction site and/or to determine properties of objects. Some examples of such properties of objects may include type of object, position of object in the image data, position of the object in the construction site, size of the object, dimensions of the object, weight of the object, shape of the object, colors of the object, orientation of the object, state of the object, and so forth. In some examples, Step 1120 may analyze the image data using a machine learning model trained using training examples to detect objects and/or to determine properties of objects from images. For example, some training examples may include an image depicting an object together with label detailing information about the depicted object such as the type of the object, position of the object in the image, properties of the object, and so forth. Other training examples may include images that do not depict objects for detection, together with labels indicating that the images do not depict objects for detection. In some examples, Step 1120 may analyze the image data using an artificial neural network configured to detect objects and/or to determine properties of objects from images.

In some embodiments, Step 1130 may update at least one electronic record associated with the construction site based, at least in part, on the at least one object detected by Step 1120 and/or properties of the at least one object determined by Step 1120.

In some examples, Step 1120 may analyze the image data to identify at least one position related to the at least one object detected by Step 1120, and the update to the at least one electronic record may be further based on the identified at least one position. In some examples, items and/or portions of the at least one electronic record associated with the identified at least one position may be selected, and the selected items and/or portions may be updated in the at least one electronic record, for example based on the at least one object detected by Step 1120 and/or properties of the at least one object determined by Step 1120. For example, objects in database 605 may be selected according to the identified at least one position, and the selected objects may be updated. In another example, portions of as-built model 615 and/or construction plan 610 may be selected according to the identified at least one position, and the selected portions may be updated. In some examples, a record of a position associated with the at least one object detected by Step 1120 may be updated in the at least one electronic record according to the identified at least one position, for example a position of an object may be registered in an as-built model 615, in database 605, and so forth. In some examples, the identified at least one position related to the at least one object may be compared with a position associated with the object in the at least one electronic record (for example, with a position of the object in construction plan 610), and construction errors 640 may be updated based on a result of the comparison (for example, registering a construction error in construction errors 640 when the difference in the position is above a selected threshold, and forgoing registration of a construction error when the difference is below the selected threshold).

In some examples, Step 1120 may analyze the image data to identify at least one property of the at least one object (such as position, size, color, object type, and so forth), and Step 1130 may update the at least one electronic record based, at least in part, on the at least one property. In some examples, records of the at least one electronic record associated with the identified at least one property may be selected, and Step 1130 may update the selected records in the at least one electronic record, for example based on the at least one object detected by Step 1120 and/or properties of the at least one object determined by Step 1120. For example, the selected record may be associated with a specific object type (such as tile, electrical box, etc.), and the selected records may be updated (for example to account for the tiles or the electrical boxes detected in the image data). In some examples, Step 1130 may update a record of a property associated with the at least one object detected by Step 1120 in the at least one electronic record according to the identified at least one property. In some examples, the identified at least one property related to the at least one object may be compared with a property associated with the object in the at least one electronic record (for example, with a property of the object in construction plan 610), and Step 1130 may update construction errors 640 based on a result of the comparison (for example, registering a construction error in construction errors 640 when the difference in the property is above a selected threshold, and forgoing registration of a construction error when the difference is below the selected threshold).

In some examples, the at least one electronic record associated with the construction site may comprise a searchable database, and Step 1130 may update the at least one electronic record by indexing the at least one object in the searchable database. For example, the searchable database may be searched for a record related to the at least one object, in response to a determination that the searchable database includes a record related to the at least one object, the record related to the at least one object may be updated, and in response to a determination that the searchable database do not include a record related to the at least one object, a record related to the at least one object may be added to the searchable database. In some examples, such searchable database may be indexed according to type of the objects, to properties of objects, to position of objects, to status of objects, to time the object was identified, to dimensions of the object, and so forth.

In some examples, when the image data comprises at least a first image corresponding to a first point in time and a second image corresponding to a second point in time (the elapsed time between the first point in time and the second point in time may be at least a selected duration, for example, at least an hour, at least one day, at least two days, at least one week, etc.), Step 1130 may update the at least one electronic record based, at least in part, on a comparison of the first image and the second image. For example, differences between the images may be identified with relation to a first object while no differences between the images may be identified with relation to a second object, and as a result update to the at least one electronic record may be made with relation to the first object, while updates related to the second object may be forgone. In another example, an identified difference may indicate that a new object was installed between the first point in time and the second point in time, and as result the installation of the new object may be recorded in progress records 630 (for example with a time stamp associated with the first point in time and/or the second point in time), project schedule 620 may be updated to reflect the installation of the new object (for example, before the second point in time and/or after the first point in time), as-build model 615 may be updated to reflect the installed new object, and so forth.

In some examples, the image data may comprise one or more indoor images of the construction site, the at least one object detected by Step 1120 may comprise a plurality of tiles paving an indoor floor, the at least one property determined by Step 1120 may comprise a number of tiles, and Step 1130 may update the at least one electronic record based, at least in part, on the number of tiles. For example, Step 1130 may update financial records 625 to reflect the number of tiles in the construction site, Step 1130 may update as-built model 615 with the number of tiles at selected locations in the construction site (room, balcony, selected area of a floor, selected unit, etc.), and so forth.

In some examples, the at least one electronic record may comprise at least one as-built model associated with the construction site (such as as-built model 615), and Step 1130 may update to the at least one electronic record by modifying the at least one the as-built model. For example, an as-built model may be updated to include objects detected by Step 1120 (for example by analyzing images of the construction site), to record a state and/or properties of objects in the as-built model according to the state and/or properties of the objects in the construction site as determined by Step 1120 (for example by analyzing images of the construction site), to position an object in the as-build model according to the position of the object in the construction site as determined by Step 1120 (for example by analyzing images of the construction site, according to the position of the image sensor the captured the images, etc.), and so forth.

In some examples, the at least one electronic record may comprise at least one project schedule associated with the construction site (such as project schedule 620), and Step 1130 may update the at least one electronic record by updating the at least one project schedule, for example by updating at least one projected date in the at least one project schedule. For example, Step 1120 may analyze image data captured at different points in time to determine a pace of progression, and Step 1130 may update at least one projected finish date in the at least one project schedule based on the amount of remaining work in the task and the determined pace of progression. For example, an analysis may show that a first number of units were handled within a selected elapsed time, and a pace of progression may be calculated by dividing the first number of units by the selected elapsed time. Moreover, a remaining number of units to be handled in the task may be obtained, for example from project schedule 620 and/or progress records 630. Further, the remaining number of units may be divided by the calculated pace of progression to estimate a remaining time for the task, and the projected finish date of the task may be updated accordingly. In another example, Step 1120 may analyze image data captured at a selected time to determine that a task that should have started according to project schedule 620 haven't yet started in the construction site. In response, Step 1130 may update projected dates associated with the task (such as projected starting date, projected finish date, projected intermediate dates, and so forth). In yet another example, Step 1130 may update projected date in project schedule 620 (for example as described above), and may further update other dates in project schedule 620 that depend on the updated dates. For example, a first task may start only after a second task is completed, and Step 1130 may update projected dates of the first task (such as the projected starting date, projected finish time, etc.) after the projected finish date of the second task is updated.

In some examples, the at least one electronic record may comprise at least one financial record associated with the construction site (such as financial record 625), and Step 1130 may update the at least one electronic record by updating the at least one financial record, for example by updating at least one amount in the at least one financial record. For example, Step 1120 may analyze image data captured at different points in time to determine a pace of progression, for example as described above, and Step 1130 may update at least one projected future expense (for example, updating a projected date of the projected future expense, updating a projected amount of the projected future expense, etc.) based on the determined pace of progression. In another example, Step 1120 may analyze image data to determine that a task was progressed or completed, and in response to the determination, a payment associated with the task may be approved, placed for approval, executed, etc., and the financial records may be updated by Step 1130 accordingly. In yet another example, Step 1120 may analyze image data to determine that a task was not progressed or completed as specified in an electronic record (for example not progressed or completed as planned according to project schedule 620, not progressed or completed as reported according to progress records 630, etc.), and in response to the determination a payment associated with the task may be reduced, withheld, delayed, etc., and the financial records may be updated by Step 1130 accordingly. In another example, financial assessments may be generated by analyzing image data depicting the construction site and/or electronic records associated with the construction site (for example, using Step 1230 as described below), and Step 1130 may update financial records according to the generated financial assessments, for example by recording the generated financial assessments in the financial records, by updating a financial assessment recorded in the financial records according to the generated financial assessments, in any other way described below, and so forth.

In some examples, the at least one electronic record may comprise at least one progress record associated with the construction site (such as progress record 630), and Step 1130 may update the at least one electronic record by updating the at least one progress record, for example by updating at least one progress status corresponding to at least one task in the at least one progress record. For example, Step 1120 may analyze image data to determine that a task was completed or a current percent of completion of the task, and Step 1130 may update at least one progress status corresponding to the task in the at least one progress record according to the determination. In another example, Step 1120 may analyze image data to determine that a task was not progressed or completed as specified in an electronic record (for example not progressed or completed as planned according to project schedule 620, not progressed or completed as reported according to progress records 630, etc.), and in response Step 1130 may record a delay in the at least one progress record according to the determination.

In some examples, the at least one electronic record (for example, the at least one electronic record updated by Step 1130, the at least one electronic record obtained by Step 920, etc.) may comprise information related to safety information. For example, image data (such as image data captured from the construction site using at least one image sensor and obtained by Step 710) may be analyzed to identify at least one safety issue related to the at least one object detected by Step 1120, and Step 1130 may record information related to the at least one safety issue in the at least one electronic record. For example, Step 1120 may analyze the image data to identify a type of scaffolds used in the construction site, the identified type of scaffolds may be compared with safety requirements, and in response to a determination that the type of scaffolds is incompatible with the safety requirements, and Step 1130 may record a corresponding safety issue in safety records 635. In another example, Step 1120 may analyze the image data to detect a hanged object loosely connected to the ceiling, and Step 1130 may record a corresponding safety issue in safety records 635.

In some examples, the at least one electronic record (for example, the at least one electronic record updated by Step 1130, the at least one electronic record obtained by Step 920, etc.) may comprise information related to at least one construction error. For example, image data (such as image data captured from the construction site using at least one image sensor and obtained by Step 710) may be analyzed to identify at least one construction error related to the at least one object detected by Step 1120, and Step 1130 may record information related to the at least one construction error in the at least one electronic record. For example, Step 1120 may analyze the image data to identify an object installed incorrectly, and in response Step 1130 may record the incorrect installation of the object as a construction error in construction errors 640. In another example, Step 930 may identify a discrepancy between electronic records (such as construction plan 610) and the construction site as depicted in the image data, for example as described above, Step 1120 may identify a construction error based on the identified discrepancy, for example as described above, and Step 1130 may record the construction error identified by Step 930 in construction errors 640.

In some examples, Step 1130 may update the at least one electronic record associated with the construction site based, at least in part, on a time associated with the image data. For example, the image data may comprise at least a first image corresponding to a first point in time and a second image corresponding to a second point in time, Step 1130 may update the at least one electronic record based, at least in part, on a comparison of the first image and the second image, as described above. In another example, Step 1120 may detect an object in the image data and/or determine properties of an object in an image data captured at a particular time (such as a particular minute, a particular hour, a particular date, etc.), and Step 1130 may record the detected object and/or the determined properties of the object together with the particular time in objects database 605. Other examples where the update is based on a time associated with the image data are described above.

In some examples, Step 1130 may update the at least one electronic record associated with the construction site based, at least in part, on a position associated with the image data. For example, Step 1120 may detect an object in the image data and/or determine properties of an object in an image data captured at a particular location (such as a particular unit, a particular room, from a particular position within the room, from a particular angle, at a particular set of coordinates specifying a location, etc.), and Step 1130 may record the detected object and/or the determined properties of the object together with the particular location in objects database 605. Other examples where the update is based on a position associated with the image data and/or on a position of objects depicted in the image data are described above.

Consistent with the present disclosure, image data (such as image data captured from the construction site using at least one image sensor and obtained by Step 710) may be analyzed to detect at least one object in the construction site, for example as described above in relation with Step 1120. Further, the image data may be analyzed to identify at least one property of the at least one object (such as position, size, color, object type, and so forth), for example as described above in relation with Step 1120. The identified at least one property may be used to select at least one electronic record of a plurality of alternative electronic records associated with the construction site. Step 1130 may update the selected at least one electronic record, for example based on the detected at least one object and/or the identified at least one property. For example, the plurality of alternative electronic records may be associated with different types of objects, and the type of the object detected by Step 1120 may be used to select an electronic record associated with the type of the detected object of the plurality of alternative electronic records. In another example, the plurality of alternative electronic records may be associated with different regions of the construction site (for example, different rooms, different units, different buildings, etc.), and the position of the object detected by Step 1120 may be used to select an electronic record associated with a region corresponding to the position of the detected object of the plurality of alternative electronic records.

In some examples, the at least one electronic record (for example, the at least one electronic record updated by Step 1130, the at least one electronic record obtained by Step 920, etc.) may comprise information based on at least one image captured from at least one additional construction site. For example, the at least one electronic record may comprise information derived from image data captured from a plurality of construction sites. Moreover, the information about the plurality of construction sites may be aggregated, and statistics from the plurality of construction sites may be generated. Further, information from one construction site may be compared with information from other construction sites. In some examples, such statistics and/or comparisons may be provided to the user. In some examples, pace of progression at different construction sites may be measured from image data as described above, the measured pace of progression at the different construction sites may be aggregated in an electronic record (for example, in a database), statistics about the pace of progression may be generated and/or provided to a user, a pace of progression in one construction site may be compared to pace of progression in other construction sites, and so forth. In some examples, statistical model tying properties of the construction sites to the pace of progression may be determined (for example, using regression models, using statistical tools, using machine learning tools, etc.) based on the aggregated measured pace of progression at the different construction sites. Further, the statistical model may be used to predict a pace of progression for other construction sites from properties of the other construction sites. Additionally or alternatively, the statistical model may be used to suggest modification to a construction site in order to increase the pace of progression in that construction site. In some examples, construction errors at different construction sites may be identified from image data as described above, the identified construction errors at the different construction sites may be aggregated in an electronic record (for example, in a database), statistics about the construction errors may be generated and/or provided to a user, construction errors in one construction site may be compared to construction errors in other construction sites, and so forth. In some examples, statistical model tying properties of the construction sites to construction errors may be determined (for example, using regression models, using statistical tools, using machine learning tools, etc.) based on the aggregated construction errors from the different construction sites. Further, the statistical model may be used to predict construction errors likely to occur at other construction sites from properties of the other construction sites (for example, together with a predict amount of construction errors). Additionally or alternatively, the statistical model may be used to suggest modification to a construction site in order to avoid or decrease construction errors in that construction site.

Figure 12:
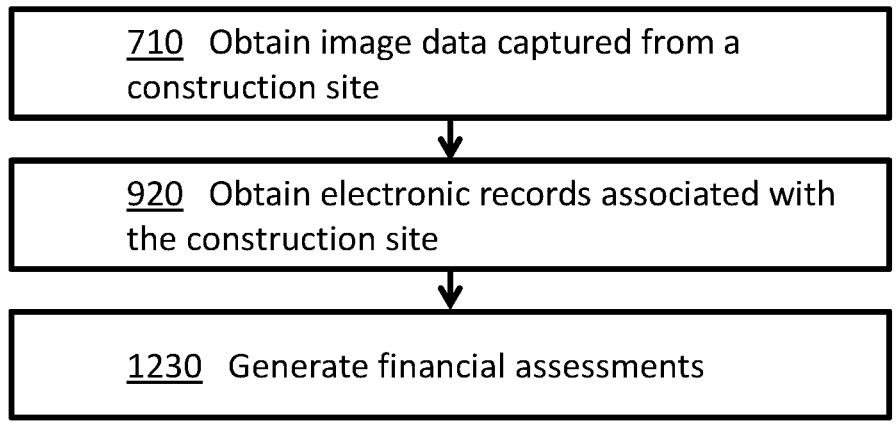
FIG. 12 illustrates an example of a method for generating financial assessments based on construction site images.

FIG. 12 illustrates an example of a method for generating financial assessments based on construction site images. In this example, method 1200 may comprise: obtaining image data captured from a construction site (Step 710); obtaining electronic records associated with the construction site (Step 920); and generating financial assessments (Step 1230). In some implementations, method 1200 may comprise one or more additional steps, while some of the steps listed above may be modified or excluded. For example, Step 920 may be excluded from method 1200. In some implementations, one or more steps illustrated in FIG. 12 may be executed in a different order and/or one or more groups of steps may be executed simultaneously and vice versa. For example, Step 920 may be executed before and/or after and/or simultaneously with Step 710, Step 1230 may be executed after and/or simultaneously with Step 710 and/or Step 920, and so forth.

In some embodiments, Step 1230 may analyze image data (such as image data captured from the construction site using at least one image sensor and obtained by Step 710) and/or at least one electronic record (such as at least one electronic record associated with the construction site obtained by Step 920) to generate at least one financial assessment related to the construction site. In one example, the financial assessment generated by Step 1230 may be recorded in financial records 625. In another example, financial assessments in financial records 625 may be updated according to the financial assessment generated by Step 1230. In some examples, Step 1230 may analyze the image data and/or the at least one electronic record using a machine learning model trained using training examples to generate at least one financial assessment from image data and/or electronic records. In some examples, Step 1230 may analyze the image data and/or the at least one electronic record using an artificial neural network configured to generate at least one financial assessment from image data and/or electronic records.

In some examples, the image data may be analyzed to identify at least one discrepancy between the at least one electronic record and the construction site, for example by Step 930 as described above, and Step 1230 may use the identified at least one discrepancy to generate the at least one financial assessment. For example, Step 930 may analyze the image data to identify a delay with respect to a planned schedule according to a project schedule as described above, and in response to the identified delay Step 1230 may update a financial assessment of projected incomes associated with the construction site, Step 1230 may update a financial assessment of required capital associated with the construction site, and so forth. In another example, Step 930 may analyze the image data to identify a divergence from a construction plan as described above, and in response to the identified divergence Step 1230 may update a valuation of the construction project, Step 1230 may update an estimated risk associated with the construction site, and so forth. For example, a mathematical model of the projected incomes associated with the construction site and/or of the required capital associated with the construction site and/or of the valuation of a construction project and/or of estimated risks associated with the construction site may use a formula or an algorithm that takes delays and/or divergence from a construction plan as input, and Step 1230 may use the mathematical model to update the projected incomes associated with the construction site and/or the required capital associated with the construction site and/or the valuation of a construction project and/or estimated risks associated with the construction using the identified delays and/or the identified divergence from the construction plan.

In some examples, the image data may comprise at least a first image corresponding to a first point in time and a second image corresponding to a second point in time, the elapsed time between the first point in time and the second point in time may be at least a selected duration (for example, at least an hour, at least one day, at least two days, at least one week, etc.), and Step 1230 may generate at least one financial assessment based, at least in part, on a comparison of the first image and the second image. For example, the comparison may identify that a plurality of actions were performed in the construction site between the first point of time and the second point in time (some examples of such actions may include installation of objects, advancement in a process, damaging an element of the construction site, etc.), and a financial assessment associated with the first point in time may be updated according to the identified plurality of actions. In another example, the comparison may determine that fewer action than planned were performed in the construction site (for example, that no action was performed), a delay may be predicted as a response of the determination (or as described above), and the financial assessment may be updated according to the predicted delay.

In some examples, the at least one electronic record may comprise a construction plan associated with the construction site, and Step 1230 may use the construction plan to generate financial assessments. For example, an identified divergence from a construction plan may be used to generate financial assessments as described above. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of properties of the construction plan (such as constructed area, bill of materials generated using the construction plan, etc.) as input factors.

In some examples, the at least one electronic record may comprise a project schedule associated with the construction site, and Step 1230 may use the project schedule to generate financial assessments. For example, an identified delay with respect to a planned schedule according to a project schedule may be used to generate financial assessments as described above. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of properties of the project schedule (such as expected date of completion, amount of concurrent tasks, etc.) as input factors.

In some examples, the at least one electronic record may comprise a financial record associated with the construction site, and Step 1230 may use the financial record to generate financial assessments. For example, unplanned expenses and/or delayed expenses in the financial record may be used to generate financial assessments. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of details from the financial records (such as total expenses to date, planned expenses, late payments, bill of materials, etc.) as input factors.

In some examples, the at least one electronic record may comprise a progress record associated with the construction site, and Step 1230 may use the progress record to generate financial assessments. For example, at least one progress status from the progress records may be used to generate financial assessments. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of details from the progress records (such as delays, percent of completion of tasks, etc.) as input factors.

In some examples, Step 1230 may generate at least one financial assessment based, at least in part, on a position associated with at least part of the image data. For example, Step 1120 may detect an object in the image data and/or determine properties of an object in an image data captured at a particular location (such as a particular unit, a particular room, from a particular position within the room, from a particular angle, at a particular set of coordinates specifying a location, etc.) as described above, Step 1130 may update electronic records based on the detected object and/or the determined properties of the object together with the particular location as described above, and Step 1230 may use the updated electronic records to generate the at least one financial assessment as described above. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of information extracted from the image data (for example, as described above) together with the particular location as input factors.

In some examples, Step 1230 may generate at least one financial assessment based, at least in part, on a time associated with at least part of the image data (for example, capturing time of the at least part of the image data was captured, a time of processing of the at least part of the image data, and so forth). For example, the image data may comprise at least a first image corresponding to a first point in time and a second image corresponding to a second point in time, and Step 1230 may generate at least one financial assessment based, at least in part, on a comparison of the first image and the second image as described above. In another example, a mathematical model used for the financial assessment (such as a mathematical model of a risk related to a loan associated with the construction site, of a risk assessment related to an insurance policy associated with the construction site, of a valuation associated with the construction site, etc.) may use a function of information extracted from the image data (for example, as described above) together with the time associated with at least part of the image data as input factors.

In some examples, Step 1230 may generate at least one financial assessment comprising a risk assessment related to a loan associated with the construction site, for example as described above. In some examples, Step 1230 may generate at least one financial assessment comprising a risk assessment related to an insurance policy associated with the construction site, for example as described above. In some examples, Step 1230 may generate at least one financial assessment comprising a valuation associated with the construction site, for example as described above. For example, the valuation may comprise a valuation after a completion of construction in the construction site associated with at least part of a constructed building built in the construction site.

In some examples, image data (such as image data captured from the construction site using at least one image sensor and obtained by Step 710) and/or at least one electronic record (such as at least one electronic record associated with the construction site obtained by Step 920) may be analyzed to update at least one parameter of a loan associated with the construction site. For example, a risk assessment related to a loan associated with the construction site may be generated as described above, and the at least one parameter of the loan may be updated based, at least in part, on the generated risk assessment. In another example, a valuation associated with the construction site may be generated as described above, and the at least one parameter of the loan may be updated based, at least in part, on the generated valuation.

In some examples, image data (such as image data captured from the construction site using at least one image sensor and obtained by Step 710) and/or at least one electronic record (such as at least one electronic record associated with the construction site obtained by Step 920) may be analyzed to update at least one parameter of an insurance policy associated with the construction site. For example, a risk assessment related to an insurance policy associated with the construction site may be generated as described above, and at least one parameter of the insurance policy may be updated based, at least in part, on the generated risk assessment. In another example, a valuation associated with the construction site may be generated as described above, and the at least one parameter of an insurance policy associated with the construction site may be updated based, at least in part, on the generated valuation.

In some examples, Step 1120 may analyze the image data and/or the at least one electronic record to detect at least one object in the construction site, for example as described above. Further, Step 1120 may further analyze the image data and/or the at least one electronic record to identify at least one property of the at least one object, for example as described above. Step 1230 may generate at least one financial assessment based, at least in part, on the identified at least one property. For example, the image data may comprise one or more indoor images of the construction site, the at least one object may comprise a plurality of tiles paving an indoor floor, the at least one property may comprise a number of tiles, and the generated at least one financial assessment may be based, at least in part, on the number of tiles. In another example, the image data may comprise one or more indoor images of the construction site, the at least one object may comprise a wall, the at least one property may comprise area and/or percent of the wall covered by plaster, and the generated at least one financial assessment may be based, at least in part, on the area and/or percent of the wall covered by plaster.

Consistent with the present disclosure, at least one previous financial assessment related to the construction site may be accessed. Further, the at least one previous financial assessment may be compared with the at least one financial assessment generated by Step 1230 to determine a magnitude of change. The magnitude of change may be compared with a selected threshold. In some examples, in response to a determination that the magnitude of change is above the selected threshold, a notification may be provided to a user, while in response a determination that the magnitude of change is below the selected threshold, providing the notification to the user may be forgone. In some examples, in response to a determination that the magnitude of change is above the selected threshold, a first notification may be provided to a user, while in response a determination that the magnitude of change is below the selected threshold, a second notification different from the first notification may be provided to the user.

Figure 13:
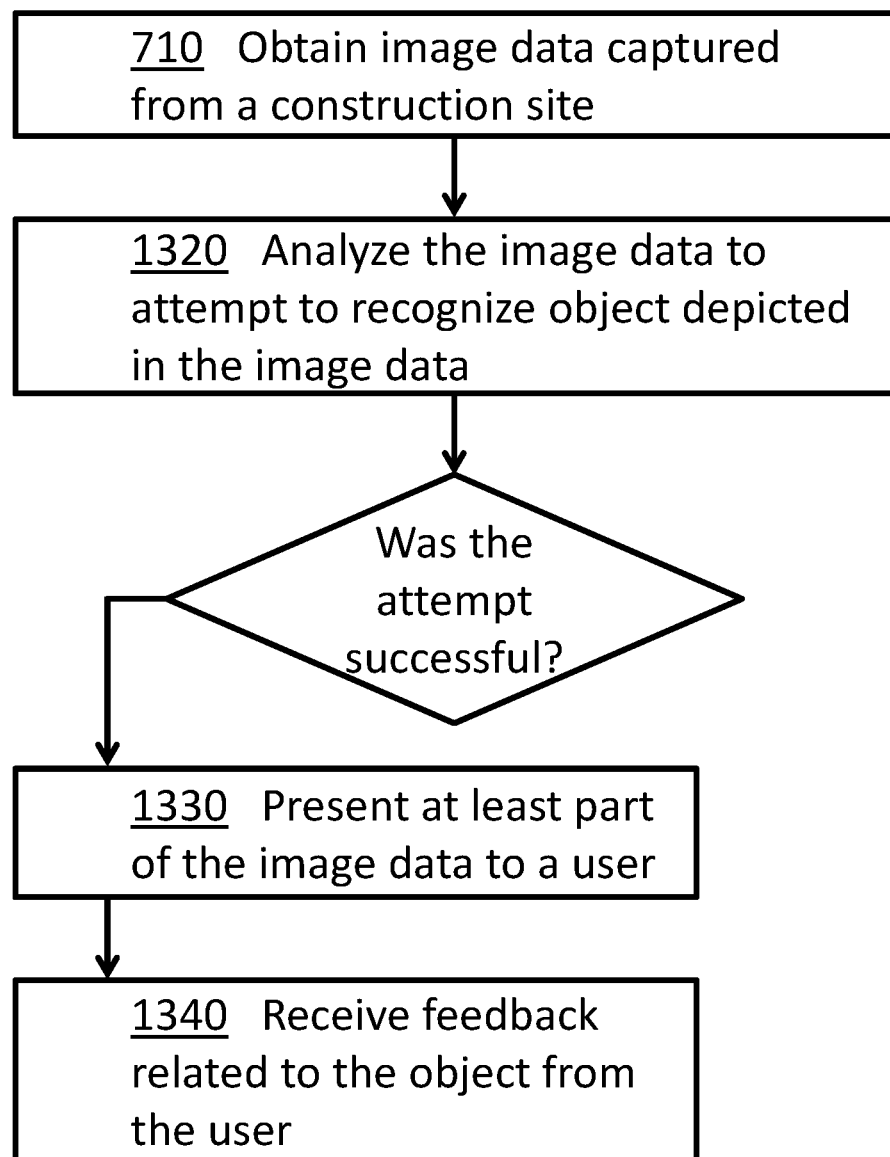
FIG. 13 illustrates an example of a method for hybrid processing of construction site images.

FIG. 13 illustrates an example of a method 1300 for hybrid processing of construction site images. In this example, method 1300 may comprise: obtaining image data captured from a construction site (Step 710), and analyzing the image data to attempt to recognize object depicted in the image data (Step 1320). In some examples, when the attempt to recognize the object fails, method 1300 may present at least part of the image data to a user (Step 1330), and receive feedback related to the object from the user (Step 1340). In some implementations, method 1300 may comprise one or more additional steps, while some of the steps listed above may be modified or excluded. For example, Step 1330 and/or Step 1340 may be excluded from method 1300. In some implementations, one or more steps illustrated in FIG. 13 may be executed in a different order and/or one or more groups of steps may be executed simultaneously and vice versa. For example, Step 1320 may be executed after and/or simultaneously with Step 710, Step 1330 may be executed after and/or simultaneously with Step 1320, and so forth.

In some embodiments, Step 1320 may analyze image data (such as image data captured from the construction site using at least one image sensor and obtained by Step 710) to attempt to recognize at least one object depicted in the image data and/or to attempt to determine properties of at least one object depicted in the image data. Some examples of such properties of objects may include type of object, position of object in the image data, position of object in the construction site, size of object, weight of object, shape of object, colors of object, orientation of object, state of object, and so forth. In some examples, Step 1320 may analyze the image data using a machine learning model trained using training examples to attempt to recognize objects and/or to attempt to determine properties of objects from images, for example as described above in relation to Step 1120. In one example, the machine learning model may provide an indication that the attempt to recognize objects and/or that the attempt to determine properties of objects failed. In another example, the machine learning model may provide a confidence level associated with recognition of an object and/or with a determination of properties of objects, the confidence level may be compared with a selected threshold, and the attempt may be considered as a failure when the confidence level is lower than a selected threshold. In some examples, Step 1120 may analyze the image data using an artificial neural network configured to attempt to recognize objects and/or to attempt to determine properties of objects from images, and to provide a failure indication in case of a failure to recognize objects and/or a failure to determine properties of objects.

In some examples, in response to a failure of Step 1320 to successfully recognize the at least one object and/or to successfully determine properties of the at least one object, Step 1330 may present at least part of the image data to a user (for example, using a display screen, an augmented reality display system, a printer, and so forth) and/or Step 1340 may receive a feedback related to the at least one object from the user (for example, through a user interface, using an input device, textually using a keyboard, through speech using a microphone and speech recognition, as a selection of one or more alternative of a plurality of alternatives presented to the user by Step 1330, and so forth). For example, the failure to successfully recognize the at least one object may comprise a recognition of the at least one object with a confidence level lower than a selected threshold. In some examples, the image data may be analyzed to select the at least part of the image data that Step 1330 presents to the user. For example, at least part of the image data that depicts at least part of the object that Step 1320 failed to recognize and/or failed to determine its properties may be selected. In another example, a construction plan associated with the construction site may be used to select at least part of the image data corresponding to an object in the construction plan that Step 1320 failed to successfully recognize or to successfully determine its properties.

In some examples, the failure of Step 1320 to successfully recognize the at least one object may comprise a successful recognition of a category of the at least one object and a failure to successfully recognize a specific type within the category. Further, in response to the failure of Step 1320 to successfully recognize the at least one object, Step 1330 may present information associated with the recognized category to a user alongside the at least part of the image data. For example, a category may include "electrical box", while specific type within the category may include "round electrical box", "square electrical box", "rectangular electrical box", "shallow electrical box", "weatherproof electrical box", "plastic electrical box", "metal electrical box", and so forth. In another example, a category may include "tile", while specific type within the category may include "marble tile", "ceramic tile", "terrazzo tile", "granite tile", "travertine tile", "limestone tile", and so forth. In yet another example, a category may include "pipe", while specific type within the category may include "PEX pipe", "PVC pipe", "rigid copper pipe", "ABS pipe", "flexible copper tubing", "galvanized steel pipe", "cast iron pipe", "water supply pipe", "drainage pipe", "electrical pipe", and so forth.

In some examples, the failure of Step 1320 to successfully determine properties of the at least one object may comprise a successful recognition of a type of the at least one object and a failure to successfully determine at least one other property of the at least one object. Further, in response to the failure of Step 1320 to successfully determine at least one other property of the at least one object, Step 1330 may present information associated with the recognized type to a user alongside the at least part of the image data. For example, the type may include "electrical box", and the at least one property may include at least one of size, color, position, orientation, state, material, and so forth. In another example, the type may include "pipe", and the at least one property may include at least one of end-point, size, length, color, position, state, material, and so forth. In yet another example, the type may include "electrical wiring", and the at least one property may include at least one of end-point, length, color, position, state, and so forth.

In some examples, in response to the failure of Step 1320 to successfully recognize the at least one object and/or to successfully determine properties of the at least one object, Step 1330 may present to the user information associated with the construction site alongside the at least part of the image data. For example, at least a part of a construction plan (for example, at least a part of a construction plan corresponding to the presented at least part of the image data) may be presented. In another example, at least a part of a progress record (for example, at least a part of a progress record corresponding to the area of the object) may be presented.

In some examples, in response to the failure of Step 1320 to successfully recognize the at least one object and/or to successfully determine properties of the at least one object, Step 1330 may present to the user information associated with the at least one object and determined by analyzing the image data alongside the at least part of the image data. For example, a size and/or a shape of the object may be determined from the image data and presented to the user. In some examples, in response to the failure of Step 1320 to successfully recognize the at least one object and/or to successfully determine properties of the at least one object, Step 1330 may present to the user information related to a position associated with the at least one object alongside the at least part of the image data. In some examples, in response to the failure of Step 1320 to successfully recognize the at least one object and/or to successfully determine properties of the at least one object, Step 1330 may present to the user information related to a position associated with at least a portion of the image data alongside the at least part of the image data (for example, position of the camera when capturing the portion of the image data, position of at least one item depicted in the portion of the image data, and so forth). In some examples, in response to the failure of Step 1320 to successfully recognize the at least one object and/or to successfully determine properties of the at least one object, Step 1330 may present to the user information related to a time associated with at least a portion of the image data alongside the at least part of the image data (for example, time the portion of the image data was captured, time the portion of the image data was recorded, and so forth).

In some examples, the attempt of Step 1320 to recognize the at least one object and/or to determine properties of the at least one object may be based, at least in part, on a construction plan associated with the construction site. For example, a position of the at least one object in the construction site (for example, as depicted in the image data) may be used to select candidate objects from a construction plan (for example, objects in proximity to a position in the construction plan corresponding to the position of the at least one object in the construction site), and the image data may be analyzed to try and select an object of the candidate objects fitting the depiction of the object in the image data (for example, selecting the most fitting object, selecting an object with a fitting score above a selected threshold, and so forth). In another example, a machine learning model trained using training examples to attempt to recognize objects and/or to attempt to determine properties of objects from images and construction plans may be used as described above. In yet another example, an artificial neural network configured to attempt to recognize objects and/or to attempt to determine properties of objects from images and construction plans may be used as described above. Further, in response to the failure to successfully recognize the at least one object, Step 1330 may present information based on the construction plan to the user alongside the at least part of the image data. For example, Step 1330 may present a portion of the construction plan corresponding to the location of the at least one object in the image data to the user alongside the at least part of the image data. In another example, Step 1330 may present to the user information from the construction plan related to objects matching a suggested object type from the attempt to recognize the object.

In some examples, a suggested object type may be obtained from the attempt of Step 1320 to recognize the at least one object, for example as described above. One or more objects may be selected from the construction plan based on the location of the at least one object in the image data, for example by selecting objects in proximity to a position in the construction plan corresponding to the location of the at least one object in the image data. One or more types of the selected one or more objects may be obtained, for example from the construction plan. Further, the failure to successfully recognize the at least one object may be identified based, at least in part, on a mismatch between the suggested object type and the one or more types of the selected one or more objects.

In some examples, a suggested object type may be obtained from the attempt of Step 1320 to recognize the at least one object, for example as described above. One or more objects matching the suggested object type in the construction plan may be selected. One or more positions specified in the construction plan for the one or more objects matching the suggested object type in the construction plan may be obtained. Further, the failure to successfully recognize the at least one object may be identified based, at least in part, on a mismatch between at least one position of the at least one object in the image data and the one or more positions specified in the construction plan.

In some examples, the attempt of Step 1320 to recognize the at least one object may be based, at least in part, on a project schedule associated with the construction site. For example, a machine learning model trained using training examples to attempt to recognize objects and/or to attempt to determine properties of objects from images and project schedule may be used as described above. In another example, an artificial neural network configured to attempt to recognize objects and/or to attempt to determine properties of objects from images and project schedule may be used as described above. In yet another example, the failure to successfully recognize the at least one object may comprise an identification of at least one discrepancy between a recognized at least one object according to the image data and the project schedule. Further, in response to the failure to successfully recognize the at least one object, information based, at least in part, on the project schedule may be presented to the user alongside the at least part of the image data. For example, Step 1330 may present a portion of the project schedule related to tasks corresponding to a position of the at least one object. In another example, Step 1330 may present a portion of the project schedule related to tasks corresponding to a suggested object type from the attempt to recognize the object.

In some examples, the attempt of Step 1320 to recognize the at least one object may be based, at least in part, on a financial record associated with the construction site. For example, a machine learning model trained using training examples to attempt to recognize objects and/or to attempt to determine properties of objects from images and financial records may be used as described above. In another example, an artificial neural network configured to attempt to recognize objects and/or to attempt to determine properties of objects from images and financial records may be used as described above. In yet another example, the failure to successfully recognize the at least one object may comprise an identification of at least one discrepancy between a recognized at least one object and the financial record. Further, in response to the failure to successfully recognize the at least one object, information based, at least in part, on the financial record may be presented to the user alongside the at least part of the image data. For example, Step 1330 may present a portion of the financial records related to the position of the at least one object. In another example, Step 1330 may present a portion of the financial records related to tasks corresponding to a suggested object type from the attempt to recognize the object.

In some examples, the attempt of Step 1320 to recognize the at least one object may be based, at least in part, on a progress record associated with the construction site. For example, a machine learning model trained using training examples to attempt to recognize objects and/or to attempt to determine properties of objects from images and progress records may be used as described above. In another example, an artificial neural network configured to attempt to recognize objects and/or to attempt to determine properties of objects from images and progress records may be used as described above. In another example, the failure to successfully recognize the at least one object may comprise an identification of at least one discrepancy between a recognized at least one object and the progress record. Further, in response to the failure to successfully recognize the at least one object, information based, at least in part, on the progress record may be presented to the user alongside the at least part of the image data. For example, Step 1330 may present a portion of the progress records related to the position of the at least one object. In another example, Step 1330 may present a portion of the progress records related to tasks corresponding to a suggested object type from the attempt to recognize the object.

Figure 14:
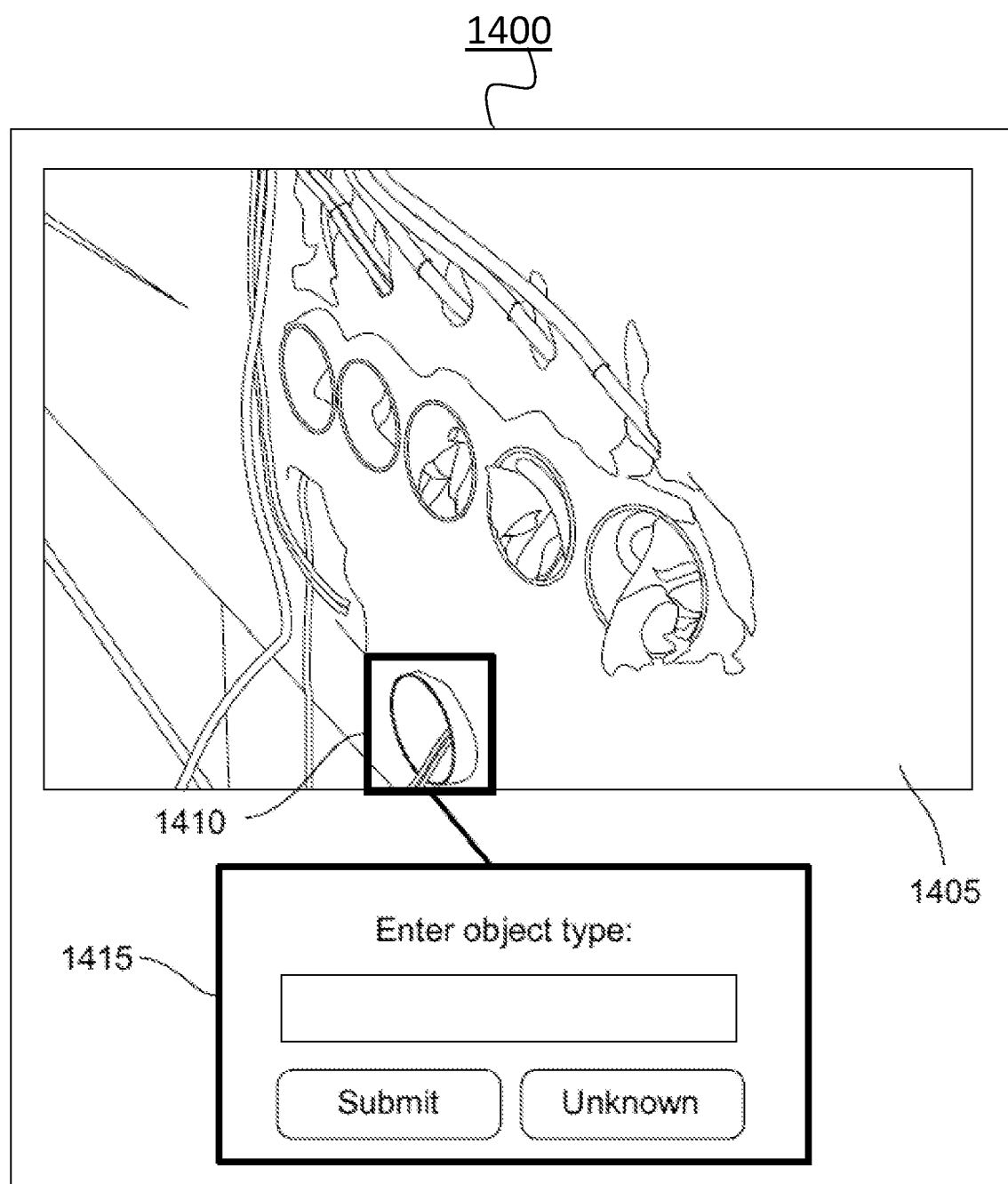
FIG. 14 is a schematic illustration of a user interface consistent with an embodiment of the present disclosure.

FIG. 14 is a schematic illustration of a user interface 1400 consistent with an embodiment of the present disclosure. In some examples, Step 1320 may analyze image 1050 captured by Step 710 in an attempt to recognize object 1065. Further, in response to a failure of Step 1320 to recognize object 1065, Step 1330 may present image 1405 to a user using user interface 1400. Image 1405 may comprise at least part of image 1050 depicting object 1065. Further, user interface 1400 may comprise an overlay over image 1405 emphasizing object 1065, such as emphasize box 1410. Further, user interface 1400 may comprise a presentation of query 1415 to the user requesting the user to identify object 1065. Step 1340 may receive from the user an identified object type for object 1065 through user interface 1400. In another example, user interface 1400 may comprise a presentation of query to the user requesting the user to provide a property of object 1065 (not shown), and Step 1340 may receive from the user a property of object 1065 through user interface 1400. In yet another example, Step 1340 may receive from the user through user interface 1400 an indication that the type of the object and/or the property of the object in unknown to the user.

Figure 15:
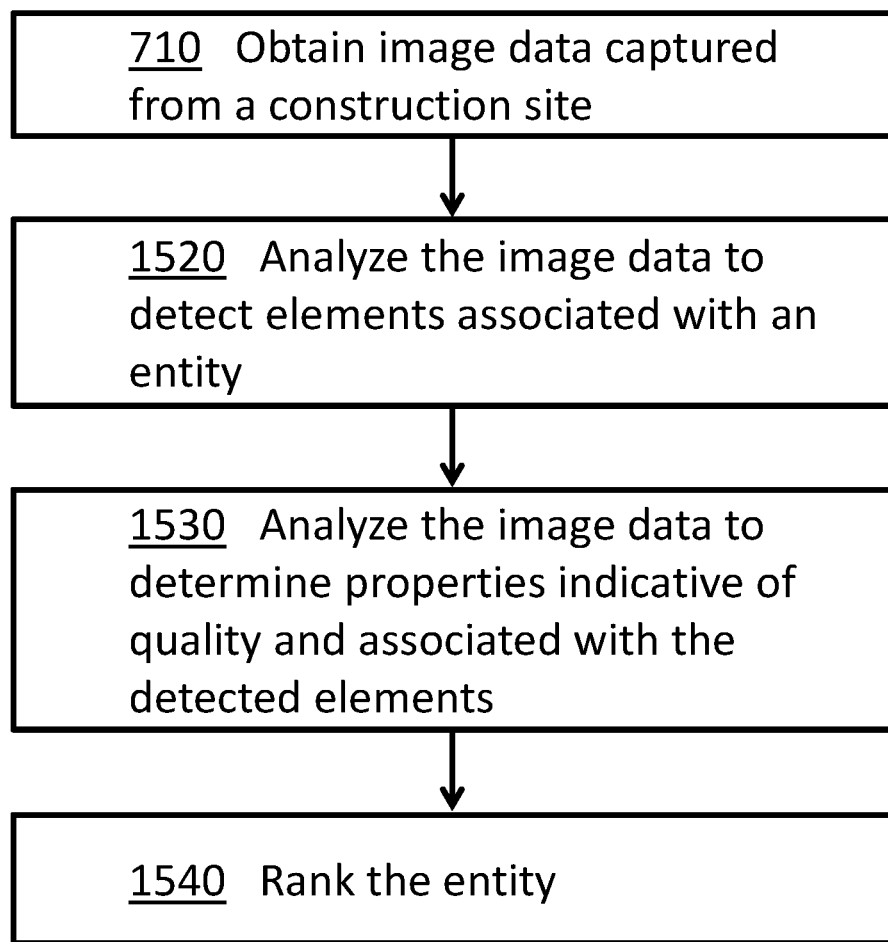
FIG. 15 illustrates an example of a method for ranking using construction site images.

FIG. 15 illustrates an example of a method 1500 for ranking using construction site images. In this example, method 1500 may comprise: obtaining image data captured from a construction site (Step 710); analyzing the image data to detect elements associated with an entity (Step 1520); analyzing the image data to determine properties indicative of quality and associated with the detected elements (Step 1530); and rank the entity (Step 1540). In some implementations, method 1500 may comprise one or more additional steps, while some of the steps listed above may be modified or excluded. For example, Step 1540 may be excluded from method 1500. In some implementations, one or more steps illustrated in FIG. 15 may be executed in a different order and/or one or more groups of steps may be executed simultaneously and vice versa. For example, Step 1520 may be executed after and/or simultaneously with Step 710, Step 1530 may be executed after and/or simultaneously with Step 1520, Step 1540 may be executed after and/or simultaneously with Step 1530, and so forth.

In some embodiments, Step 1520 may analyze image data (such as image data captured from the construction site using at least one image sensor and obtained by Step 710) to detect at least one element depicted in the image data and associated with an entity. In some examples, the at least one element may include an element built and/or manufactured and/or installed and/or supplied by the entity. For example, Step 1520 may analyze objects database 605 and/or project schedule 620 and/or financial records 625 and/or progress records 630 to identify elements built and/or manufactured and/or installed and/or supplied by the entity, and analyze the image data to detect the identified elements, for example as described above. In some examples, the at least one element detected by Step 1520 may include an element built and/or manufactured and/or installed and/or supplied by a second entity and affected by a task performed by the entity. For example, image data from before and after the performance of the task may be analyzed to identify elements that their state and/or condition changed, for example as described above. In some examples, the at least one element detected by Step 1520 may be selected of a plurality of alternative elements detected in the image data, for example based on the entity. For example, an analysis of the image data may detect a number of elements (for example, a number of electrical boxes, a number of walls, etc.), an analysis of the electronic records may indicate that the entity is related to a strict subset of the detected elements (for example, analysis of objects database 605 and/or project schedule 620 and/or financial records 625 and/or progress records 630 may indicate that only a strict subset of the detected elements were built and/or manufactured and/or installed and/or supplied by the entity), and the strict subset of elements may be selected of the detected elements.

In some embodiments, Step 1530 may analyze the image data to determine at least one property indicative of quality and associated with the at least one element. For example, a machine learning model may be trained using training examples to determine properties indicative of quality and associated with elements from image data, and Step 1530 may analyze the image data using the trained machine learning model to determine the at least one property indicative of quality and associated with the at least one element. In another example, an artificial neural network may be configured to determine properties indicative of quality and associated with elements from image data, and Step 1530 may analyze the image data using the artificial neural network to determine the at least one property indicative of quality and associated with the at least one element. In some examples, the image data may comprise at least a first image corresponding to a first point in time and a second image corresponding to a second point in time, the elapsed time between the first point in time and the second point in time may be at least a selected duration (for example, at least an hour, at least one day, at least two days, at least one week, etc.), and Step 1530 may determine the at least one property indicative of quality based, at least in part, on a comparison of the first image and the second image. For example, the first image and the second image may be compared to determine a property of the curing process of concrete as described above. In another example, the first image and the second image may be compared to determine a property of a pace of progression of a task, as described above. In yet another example, the first image and second image may be compared to determine a change in a state of an object, as described above, and the property may be determined based on the change of the state, for example determining a first value of the property when the state change from a first state to a second state and determining a second value of the property when the state change from a first state to a third state.

In some embodiments, Step 1540 may use the at least one property indicative of quality determined by Step 1530 to generate a ranking of the entity. In some example, Step 1540 may generate a ranking comprising one or more scores. Examples of such scores may include discrete score such as "excellent", "good", "average" and "poor"; a numerical score; and so forth. Some examples of such scores may include a score for work pace, a score for completion of tasks on time, a score for delays, a score for quality of work, a score for not harming unrelated elements in the construction site, a score for compatibility with other elements in the construction site, and so forth. For example, the at least one property may indicate a work pace when performing tasks related to the entity (for example, "fast", "average" and "slow"; a number of units handled within a selected time; etc.), and the calculated score may include a weighted average of the work pace for the different tasks, a mode of the work pace for the different tasks, and so forth. In another example, the at least one property may indicate that a first portion of the tasks related to the entity were completed on time, a second portion of the tasks related to the entity were minorly delayed, and a third portion of the tasks related to the entity were delayed significantly, and a score for completion of tasks on time and/or a score for delays may be computed as a function of the ratio of the first, second and third portions of the tasks of all the tasks related to the entity, as a function of the actual delay times, as a function of the actual delay time as a ratio of the planned time for each task, as a function of the actual delay time as a ratio of the entire length of performing each task, and so forth. Some examples of such function may include a weighted average of the delays or the ratio of the delays, a cumulative score that adds positive values for tasks completed on time and negative values for delayed tasks (for example, for delays beyond a selected threshold), and so forth. In yet another example, the at least one property may indicate a quality of work related to one or more objects and/or tasks related to the entity, and the calculated score may include a weighted average of the quality of work for the different objects and/or tasks, a cumulative score that adds positive values for objects and/or tasks with good quality of work and negative values for objects and/or tasks with poor quality of work, and so forth. In another example, the at least one property may indicate that an object and/or task related to the entity harmed another element at the construction site and/or was incompatible with another element and/or task in the construction site, and a score associated with the entity for not harming unrelated elements in the construction site and/or for compatibility with other elements in the construction site may be reduced due the indication that an object and/or task related to the entity harmed another element at the construction site and/or was incompatible with another element and/or task in the construction site. In some example, Step 1540 may generate a ranking of a first entity as better in at least one respect than a second entity. For example, Step 1540 may generate a first score for the first entity and a second score for the second entity as described above, and when the first score is higher than the second score rank the first entity as better than the second entity. In another example, a machine learning model may be trained using training examples to select a more compatible entity to a task of alternative entities using at least one property indicative of quality, and Step 1540 may use the trained machine learning model to generate a ranking of a first entity as better in at least one respect than a second entity, for example by selecting the more compatible entity according to the machine learning model as the better one.

In some examples, the image data may comprise one or more indoor images of the construction site, the at least one element of Step 1520 and/or Step 1530 may comprise at least one wall built by the entity, and the at least one property may comprise a quantity of plaster applied to the at least one wall. In some cases, the plaster may be applied by a different entity and still be indicative of the quality of the wall built by the entity, for example as more plaster may indicate a need to smooth depressions and/or indentations in the wall. In some examples, Step 1530 may analyze the image data to determine the quantity of plaster applied to the at least one wall. For example, the amount of plaster applied to the at least one wall may be estimated by comparing a depth image of the wall before applying the plaster to a depth image of the wall after applying the plaster, and a volume of the plaster may be estimated according to the changes between the depth images. In another example, the amount of plaster applied to the at least one wall may be estimated by a machine learning model trained using training examples to estimate amount of plaster from a 2D image of a wall before applying the plaster and a 2D image of the wall after applying the plaster. In some examples, Step 1540 may use the determined quantity of plaster applied to the at least one wall to generate the ranking of the entity. For example, the ranking of the entity may be lower when the amount of plaster applied to the at least one wall is greater, for example by reducing the ranking according to the amount of plaster, by calculating the ranking using a score function that is monotonically decreasing in the amount of plaster, and so forth.

In some examples, the at least one element Step 1520 and/or Step 1530 may comprise a room built by the entity. Further, Step 1530 may analyze the image data to determine one or more dimensions of the room, for example using a machine learning model trained using training examples to determine dimensions of a room from image data, using an artificial neural network configured to determine dimensions of a room from image data, by measuring the dimensions in 3D images of the room, and so forth. Further, Step 1540 may use the determined one or more dimensions of the room to generate the ranking of the entity. For example, the one or more dimensions may be compared with desired dimensions of the room (for example, according to a construction plan), and the ranking of the entity may be lower when the discrepancy between the determined dimensions of the room and the desired dimensions of the room is larger, for example by reducing the ranking according to the amount of discrepancy, by calculating the ranking using a score function that is monotonically decreasing in the discrepancy, and so forth.

In some examples, Step 1530 may analyze the image data to identify signs of water leaks associated with the at least one element (such as a water leak from a pipe, a water leak from an outside wall, a water leak from a ceiling, etc.), for example using a machine learning model trained using training examples to identify signs of water leaks from image data, using an artificial neural network configured to identify signs of water leaks from image data, and so forth. Further, Step 1540 may use the identified signs of water leaks to generate the ranking of the entity. For example, the ranking of the entity may be decreased when signs of water leaks are identified.

In some examples, Step 1530 may determine the at least one property based, at least in part, on at least one discrepancy between a construction plan associated with the construction site and the construction site, for example, based on at least one discrepancy identified by Step 930 between the construction plan and the construction site as described above. For example, Step 930 may identify an object in the construction plan that does not exist in the construction site as described above, and in response Step 1530 may determine the level of completeness of a task and/or the compliance to guidelines (for example, guidelines specified in the construction plan) when performing the task. In another example, Step 930 may identify an object that has a specified location according to the construction plan and is located at a different location in the construction site as described above, and in response Step 1530 may determine the compliance to the construction plan related to the installation of the object. In yet another example, Step 930 may identify an object that should have a specified property according to the construction plan but has a different property in the construction site as described above, such as a different manufacturer, and in response Step 1530 may determine that the quality of materials used is below the specified quality specified in the construction plan.

In some examples, Step 1530 may determine the at least one property based, at least in part, on at least one discrepancy between a project schedule associated with the construction site and the construction site, for example, based on at least one discrepancy identified by Step 930 between the project schedule and the construction site as described above. For example, Step 930 may identify a discrepancy between a desired state of the construction site at a selected time according to the project schedule and the state of the actual construction site at the selected time as depicted in the image data as described above, and in response Step 1530 may determine an insufficient pace of work.

In some examples, Step 1530 may determine the at least one property based, at least in part, on at least one discrepancy between a financial record associated with the construction site and the construction site, for example, based on at least one discrepancy identified by Step 930 between the financial record and the construction site as described above. For example, Step 930 may identify an object in the construction site that has a first property while the object should have a different property according to the financial records (for example, different model, different manufacturer, different size, etc.), and in response Step 1530 may determine the supply to be inadequate.

In some examples, Step 1530 may determine the at least one property based, at least in part, on at least one discrepancy between a progress record associated with the construction site and the construction site, for example, based on at least one discrepancy identified by Step 930 between the progress record and the construction site as described above. For example, Step 930 may identify an action that is not reflected in the image data but that is reported as completed in the progress record, and in response Step 1530 may determine that supervision level is inadequate. In another example, Step 930 may identify an action that is reflected in the image data but that is not reported in the progress record, and in response Step 1530 may determine that the reporting level is inadequate.

In some examples, Step 1540 may generate the ranking using information based, at least in part, on at least one image captured from at least one additional construction site. For example, information from one construction site may be compared with information from other construction sites, and the ranking may include a ranking relative to other construction sites (for example, "above average", "average", "below average", "1.6 standard deviations above mean", and so forth). In another example, an entity may be associated with a plurality of construction sites (such as a manufacturer producing products used at a plurality of construction sites, a supplier supplying products to a plurality of construction sites, a subcontractor building and/or installing elements at a plurality of construction sites, and so forth), and the ranking of the entity may be based on elements associated with the entity from the plurality of construction sites.

Consistent with the present disclosure, the at least one element detected by Step 1520 may be further associated with a first technique (such as installation technique, building technique, drying technique, and so forth), and the ranking generated by Step 1540 may be associated with the entity and the first technique. For example, the technique associated with an element may be specified in a database. In another example, the image data may be analyzed to determine the technique associated with the element, for example using a machine learning model trained using training examples to determine the technique associated with an element. In yet another example, Step 1520 may select elements associated with a selected technique of a plurality of alternative elements. Further, Step 1520 may analyze the image data to detect an additional group of at least one element depicted in the image data and associated with the entity and a second technique, for example as described above. Step 1530 may further analyze the image data to determine an additional group of at least one property indicative of quality and associated with the additional group of at least one element. Further, Step 1540 may use the additional group of at least one property to generate a second ranking of the entity related to the second technique, for example as described above.

Consistent with the present disclosure, the at least one element detected by Step 1520 may be associated with a first group of one or more additional elements, and the ranking generated by Step 1540 may be associated with the entity and the first group. For example, in image 1050, electrical box 1055D may be associated with electrical wire 1060C and vice versa, for example due to connected functionality. In another example, in image 1700, doorway 1755 may be associated with electrical box 1760 and vice versa, for example due to proximity between the two. Further, Step 1520 may analyze the image data to detect an additional group of at least one element depicted in the image data and associated with the entity and a second group of one or more additional elements, for example as described above. Step 1530 may further analyze the image data to determine an additional group of at least one property indicative of quality and associated with the additional group of at least one element, for example as described above. Further, Step 1540 may use the additional group of at least one property to generate a second ranking of the entity related to the second group of one or more additional elements, for example as described above. In yet another example, an element (such as a pipe, a wire, a box, a tile, etc.) may be positioned adjunct and/or within to a surface (such as a wall, a floor, etc.), and therefore may be associated with the surface. Further, a first ranking may be based on elements associated with a wall and therefore the first ranking may be associated with walls, while a second ranking may be based on elements associated with a floor and therefore the second ranking may be associated with floors.

Consistent with the present disclosure, the at least one element detected by Step 1520 may be further associated with a second entity, and the ranking generated by Step 1540 may be associated with the entity and the second entity. For example, the first entity may include a manufacturer of an element and the second entity may include a subcontractor installing the element. In another example, the first entity may include a person building a wall and the second entity may include a person plastering the wall. Further, Step 1520 may analyze the image data to detect an additional group of at least one element depicted in the image data and associated with the entity and a third entity, for example as described above. Step 1530 may further analyze the image data to determine an additional group of at least one property indicative of quality and associated with the additional group of at least one element, for example as described above. Further, Step 1540 may use the additional group of at least one property to generate a second ranking of the entity related to the third entity, for example as described above.

Figure 16:
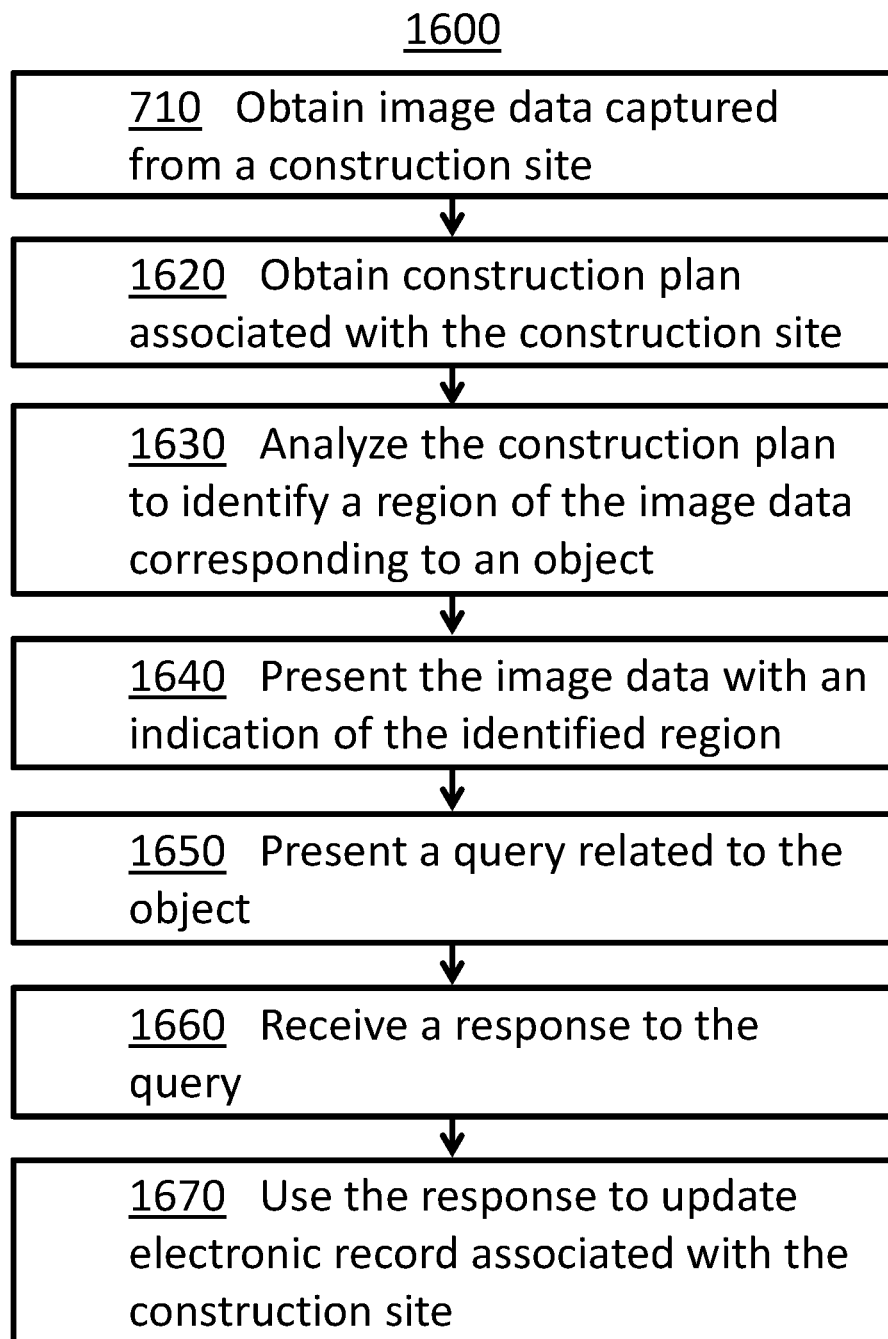
FIG. 16 illustrates an example of a method for annotation of construction site images.

FIG. 16 illustrates an example of a method 1600 for annotation of construction site images. In this example, method 1600 may comprise: obtaining image data captured from a construction site (Step 710); obtaining construction plan associated with the construction site (Step 1620); analyzing the construction plan to identify a region of the image data corresponding to an object (Step 1630); presenting the image data with an indication of the identified region (Step 1640); presenting a query related to the object (Step 1650); receiving a response to the query (Step 1660); and using the response to update electronic record associated with the construction site (Step 1670). In some implementations, method 1600 may comprise one or more additional steps, while some of the steps listed above may be modified or excluded. For example, Step 1650 and/or Step 1660 and/or Step 1670 may be excluded from method 1600. In some implementations, one or more steps illustrated in FIG. 16 may be executed in a different order and/or one or more groups of steps may be executed simultaneously and vice versa. For example, Step 1620 and/or Step 1630 may be executed before and/or after and/or simultaneously with Step 710, and so forth.

Consistent with the present disclosure, image data associated with a construction site, such as image data captured from the construction site using at least one image sensor, may be obtained, for example by using Step 710 as described above. Further, Step 1620 may obtain at least one construction plan associated with the construction site (such as construction plan 610) and including information related to an object, for example by using Step 920 as described above. In some embodiments, Step 1630 may analyze the at least one construction plan obtained by Step 1620 to identify a first region of the image data corresponding to the object. For example, the at least one construction plan may include a specified position for the object, such as a unit, a room, a surface (such as a wall, a ceiling, a floor, etc.), a region within the surface, position within the surface, a set of coordinates, and so forth. Further, Step 1630 may identify a first region of the image data corresponding to the specified position for the object in the construction plan. For example, portions of the image data may be associated with different positions, such as units, rooms, surfaces (such as a wall, a ceiling, a floor, etc.), regions within the surfaces, positions within the surfaces, range of coordinates, coordinates, and so forth, and Step 1630 may identify a first region of the image data including the specified position for the object in the construction plan and/or in proximity to that specified position. In another example, the image data captured by Step 710 may be correlated with the construction plan using an image registration algorithm, and Step 1630 may identify a first region of the image data correlated to an area including the object in the construction plan. In some examples, the information related to the object in the construction plan obtained by Step 1620 may include a planned location for the object, and Step 1630 may identify a first region of the image data that may include a region of the image data corresponding to the planned location for the object, for example as described above.

In some examples, Step 1630 may analyze the image data (for example, in addition to the at least one construction plan) to identify the first region of the image data corresponding to the object. In some examples, the construction plan may specific a general position of the object. Further, an analysis of the image data may identify one or more candidate regions within the general position, and one of the one or more candidate regions may be selected as the first region of the image data corresponding to the object. For example, the construction plan may specific the general position of the object as a particular wall, an analysis of the depiction of the particular wall in the image data may identify one of the one or more candidate regions corresponding to irregularities in the pixel data depicting the walls (for example, different colors, different texture, etc.), and at least one of the candidate regions may be selected as the first region of the image data, for example based on a height, based on size, based on shape, etc. In another example, the construction plan may specific the general position of the object as a particular room, an analysis of the depiction of the particular room may detect a floor and a wall, for example as described above, and based on the type of object (for example, "floor drainage") the candidate region may be selected to be the region depicting the floor in the image data. In some examples, an image analysis of the image data (for example using Step 1320 as described above) may identify a region of the image data that depicts the object with some probability (for example, a probability higher than a first selected threshold and/or lower than a second selected threshold), and the identified region may be selected as the first region (for example, in response to the probability being higher than the first selected threshold and/or lower than the second selected threshold).

In some examples, Step 1630 may use information based on an analysis of second image data captured from the construction site before the capturing of the image data from the construction site (for example, at least an hour before, at least one day before, at least a week before, at least a month before), for example in addition to the at least one construction plan, to identify the first region of the image data corresponding to the object. In some examples, an image analysis of the second image data (for example using Step 1120 as described above) may identify a region of the second image data that depicts the object, and a region of the image data corresponding to that region of the second image data (for example, based on image registration results) may be selected as the first region.

Step 1640 may present at least part of the image data to a user with an indication of the first region of the image data identified by Step 1630 as corresponding to the object, for example using a display screen, an augmented reality display system, a printer, and so forth. In some examples, the indication of the first region may include an overlay over the presented image data. Such overlay may include an arrow pointing to the first region, a bounding shape (such as a bounding circle, bounding rectangular box, bounding polygon, bounding free line, etc.), markings of boundaries around the first region, marking of the center of the first region, marking of an interior point or area within the first region, and so forth. In some examples, the indication of the first region may include a mask of the first region. The mask may be presented next to the image data, over the image data, and so forth. In some examples, the indication of the first region may include a presentation of the first region of the image data using first display parameters (such as color scheme, intensity, etc.) while displaying other parts of the image data with different display parameters.

In some embodiments, Step 1650 may present a query related to the object to the user, for example together with the presentation of Step 1640, for example visually, audibly, textually, using a display screen, using an augmented reality display system, a printer, audio speakers, and so forth. In some examples, the query may be related to the object and/or the image data and/or the identified first region. For example, Step 1650 may present a query about the type of the object, possibly together with a text box allowing the user to type in the type of object and/or with a presentation of plurality of alternative object types that the user may select from. In another example, Step 1650 may present a query about a property of the object (such as state, position, orientation, shape, color, dimensions, manufacturer, type of installation, etc.), possibly together with a text box allowing the user to type in the value of the property and/or with a presentation of plurality of alternative values for the property that the user may select from. In some examples, several indications of several regions and/or several queries may be presented together.

In some embodiments, Step 1660 may receive a response to the query of Step 1660 from the user and/or inputs from the user. For example, the received response and/or inputs may be related to the object and/or the image data and/or the identified first region. For example, the received response and/or inputs may be received through a user interface, using an input device, textually using a keyboard, through speech using a microphone and speech recognition, as a selection of one or more alternatives (for example, of a plurality of alternatives presented to the user by Step 1650), and so forth. Some examples of such received response and/or inputs are described below.

In some embodiments, Step 1670 may use the response and/or the inputs received from the user by Step 1660 to update information associated with the object in at least one electronic record associated with the construction site. For example, the response and/or the inputs received from the user may indicate that the object is not in the region identified by Step 1630, and in response Step 1670 may remove the object from objects database 605 and/or record an indication that the object is not in the region identified by Step 1630 in region identified by Step 1630, may update as-built model 615 by removing the object from an area of as-built model 615 corresponding to the region identified by Step 1630, may update project schedule 620 to reflect a delay deduced from the absent of the object as described above, may update financial records 625 based on the absent of the object as described above, update progress record 630 to reflect that a task associated with the object is not completed, may update construction error 640 to reflect a construction error related to an absent of the object and/or to an incorrect location of the object, and so forth. In another example, the response and/or the inputs received from the user may indicate that the object is in the region identified by Step 1630, and in response Step 1670 may add a record of the object to objects database 605 (for example, with an indication of the position of the object as a position in the region identified by Step 1630), may update as-built model 615 by adding the object to an area of as-built model 615 corresponding to the region identified by Step 1630, may update project schedule 620 and/or update progress record 630 to reflect a task completion deduced from the present of the object as described above, may update financial records 625 based on the present of the object as described above, may update construction error 640 to reflect a construction error related to the present of the object, and so forth. In yet another example, the response and/or the inputs received from the user may indicate that the object is at a particular state and/or has a specified property, and in response Step 1670 may record the particular state and/or the specified property of the object in objects database 605, may update as-built model 615 by modifying a representation of the object in the as-built model 615 according to the particular state and/or the specified property, may update project schedule 620 and/or update progress record 630 to reflect a task progression deduced from the particular state and/or the specified property, may update financial records 625 based on the particular state and/or the specified property, may update construction error 640 to reflect a construction error related to the particular state and/or the specified property, and so forth.

In some examples, the at least one construction plan associated with the construction site and obtained by Step 1620 may include information related to a plurality of alternative objects, and at least one electronic project schedule associated with the construction site may be analyzed to select the object of Step 1630 of the plurality of alternative objects. In some examples, the project schedule may indicate expected installation dates for the plurality of alternative objects, and object corresponding to a selected time range may be selected. For example, the selected time range may be selected based on a first capturing time of the image data and/or second capturing time of image data of a previously processed past image data, for example by selecting a time range approximately starting with the second capturing time and/or approximately ending at the first capturing date, by selecting a time range including a selected time duration before the first capturing time, by selecting a time range including a selected time duration after the first capturing time, and so forth. In another example, the selected time range may be selected based on a current time, for example by selecting a time range including a selected time duration before the current time, by selecting a time range including a selected time duration after the current time, and so forth. Further, any combination of the above time ranges may be selected. In some examples, the project schedule may include an indication of active tasks at the capturing time of the image data and/or the current time, and objects related to the active tasks may be selected of the plurality of alternative objects.

Consistent with the present disclosure, Step 1650 may present a query of whether the object is depicted in the identified first region of the image data, for example as described above. Step 1660 may receive an indication of whether the object is depicted in the identified first region of the image data from the user, for example in response to the query, for example as described above. Further, Step 1670 may use the received indication of whether the object is depicted in the identified first region of the image data to update at least one electronic record associated with the construction site. For example, Step 1670 may use the received indication of whether the object is depicted in the identified first region of the image data to update at least one electronic as-built model associated with the construction site, for example as described above.

Consistent with the present disclosure, Step 1660 may receive an indication of at least one location corresponding to the object within the identified first region of the image data from the user. Further, Step 1670 may use the received indication of at least one location corresponding to the object to update at least one electronic record associated with the construction site. For example, the received indication of at least one location corresponding to the object may be used to update at least one electronic as-built model associated with the construction site, for example by adding the object to a location of the as-built model corresponding to the indicated at least one location, by setting a location of an object that already exists in the as-built model to the indicated at least one location, and so forth.

Consistent with the present disclosure, Step 1650 may present a query of a construction stage associated with the object to a user. Step 1660 may receive an indication of the construction stage associated with the object from a user, for example in response to the query. Step 1670 may use the received indication of the construction stage associated with the object to update at least one electronic record associated with the construction site. For example, Step 1670 may use the received indication of the construction stage associated with the object to update at least one electronic progress record associated with the construction site, for example by updating a status of a task associated with the object according to the received indication of the construction stage. In another example, Step 1670 may use the received indication of the construction stage associated with the object to update at least one time indication associated with a future task in at least one electronic project schedule associated with the construction site, for example when the received indication of the construction stage represent a delay in a task with respect to a plan according to the project schedule, and the delay to that task may suggest delays to future tasks due to inner-tasks relationships.

Consistent with the present disclosure, Step 1650 may present a query of a quantity associated with the object to the user. Step 1660 may receive an indication of quantity associated with the object from the user, for example in response to the query. Step 1670 may use the received indication of quantity associated with the object to update at least one electronic record associated with the construction site. For example, Step 1670 may use the received indication of quantity associated with the object to update at least one electronic financial record associated with the construction site. For example, the object may include tiles, the quantity may include number of tiles, and the number of tiles may be used to update the financial record as described above. In another example, the object may include a wall, the quantity may include area of the wall covered with plaster and/or amount of plaster used, and the area of the wall covered with plaster and/or amount of plaster used may be used to update the financial record, for example by updating information based on a bill of materials and/or by updating a completion percent of a task.

Consistent with the present disclosure, Step 1650 may present a query of a state associated with the object to the user. Step 1660 may receive an indication of the state associated with the object from the user, for example in response to the query. In some examples, Step 1670 may use the received indication of the state associated with the object to update at least one electronic record associated with the construction site. For example, the received indication of the state associated with the object may be used to identify at least one construction error associated with the object, for example as described above, and the identified at least one construction error associated with the object may be used to update the at least one electronic record associated with the construction site, such as records of construction errors 640 in a database. In some examples, the received indication of the state associated with the object may be used to identify at least one safety issue associated with the object (for example, a "loosely connected" state may indicate a safety issue, as described above, and so forth). Further, the identified at least one safety issue associated with the object may be used to update the at least one electronic record associated with the construction site, such as records of safety records 635 in a database.

Consistent with the present disclosure, the at least one construction plan associated with the construction site and obtained by Step 1620 may further include information related to a second object. Step 1630 may further analyze the at least one construction plan to identify a second region of the image data corresponding to the second object. Step 1640 may present at least part of the image data to a user with an indication of the identified second region of the image data corresponding to the second object. For example, the presentation of the indication of the identified region of the image data corresponding to the object and the presentation of the indication of the identified second region of the image data corresponding to the second object may be at least partially concurrent (for example, the indications of the two regions may be presented on the same image, two different images each with one of the two indications of the regions may be presented next to each other, and so forth). In another example, the presentation of the indication of the identified region of the image data corresponding to the object and the presentation of the indication of the identified second region of the image data corresponding to the second object may be nonconcurrent.

Consistent with the present disclosure, in response to an indication received from the user by Step 1660 that the object is depicted in the identified first region of the image data, Step 1670 may make a first update to the at least one electronic record associated with the construction site, for example as described above. Consistent with the present disclosure, Step 1630 may analyze the at least one construction plan to identify a second region of the image data corresponding to the object. For example, the identified second region may include at least part of the identified first region. In another example, the identified second region may include the identified first region entirely. In yet another example, the identified second region may include no part of the identified first region. For example, in response to an indication received from the user that the object is not depicted in the identified first region of the image data, Step 1630 may select a second region of the image data corresponding to the object, for example by extending the region of the image data originally selected by Step 1630, by selecting another region from a plurality of alternative regions originally considered by Step 1630, and so forth. In response to an indication received from the user that the object is not depicted in the identified first region of the image data, Step 1640 may present at least part of the image data to a user with an indication of the identified second region of the image data corresponding to the object, for example as described above. Further, Step 1650 may present a second query of whether the object is depicted in the identified second region of the image data to the user, for example as described above. Step 1660 may receive an indication that the object is depicted in the identified second region of the image data from the user, for example in response to the second query. In response to the indication that the object is not depicted in the identified first region of the image data and to the indication that the object is depicted in the identified second region of the image data, Step 1670 may make a second update to the at least one electronic record associated with the construction site, for example as described above, and the second update may differ from the first update. For example, any update made by Step 1670 that is made according to the first region in response to an indication received from the user by Step 1660 that the object is depicted in the identified first region of the image data (as described above), may be made according to the second region in response to an indication that the object is not depicted in the identified first region of the image data and to the indication that the object is depicted in the identified second region of the image data.

Consistent with the present disclosure, in response to an indication received from the user by Step 1660 that the object is not depicted in the identified first region of the image data, method 1600 may cause capturing of additional image data from the construction site. For example, method 1600 may create a task in project schedule 620 for the capturing of the additional image data from the construction site. In another example, method 1600 may transmit a signal configured to cause at least one image sensor to capture the additional image data from the construction site. In yet another example, the additional image data may include the region identified by Step 1630. In another example, the additional image data may include an alternative location of the object. In yet another example, the additional image data may be captured at least selected time duration after the capturing of the image data presented by Step 1650. In another example, the additional image data may be obtained and/or captured using Step 710. In yet another example, the method 1600 may be repeated with the additional image data.

Figure 17:
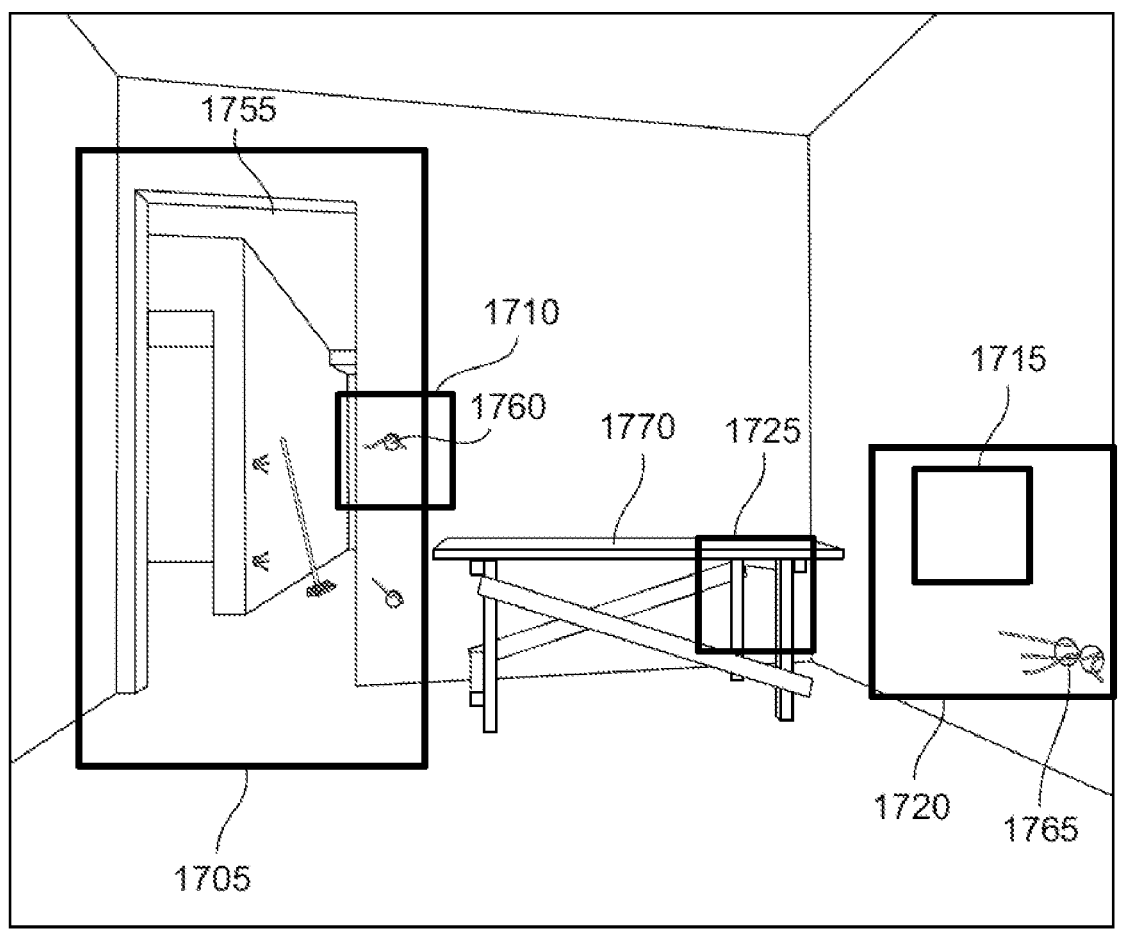
FIG. 17 is a schematic illustration of an example image captured by an apparatus consistent with an embodiment of the present disclosure.

FIG. 17 is a schematic illustration of an example image 1700 captured by an apparatus consistent with an embodiment of the present disclosure. For example, image 1700 may depicts objects in a construction site, such as doorway 1755, electrical box 1760, a pair of electrical boxes 1765, table 1770, and so forth. As described above, Step 1630 may analyze a construction plan and/or image 1700 to identify one or more regions of the image 1700 corresponding to any of the above objects. For example, Step 1630 may identify region 1705 as corresponding to doorway 1755, may identify region 1710 as corresponding to electrical box 1760, may identify regions 1715 and 1720 as corresponding to the pair of electrical boxes 1765, may identify region 1725 as corresponding to an object occluded by table 1770 (the occluded object is not shown), and so forth. For any of the above objects and corresponding identified regions, Step 1640 may present image 1700 and/or a part of image 1700 including the corresponding identified region, together with an indication of the identified region as described above. Further, Step 1650 may present a query related to the object and/or to the corresponding identified region, as described above. Some examples of such queries may include a query of whether the object is within the region, such as "is there a doorway in region 1705", "is there an electrical box in region 1710", "is there an electrical box in region 1715", "is there an electrical box in region 1720", "is there an electrical box in region 1725", and so forth. Some possible responses that Step 1660 may receive in return to such queries may include an indication of whether the object is with the region (for example, entirely, partially, or not at all, such as "the object is entirely within the region", "the object is partly within the region", "the object is not in the region", etc.), an indication that the object is not within the region but near the region (for example, "the object is near the region"), an indication that such determination cannot be made possibly together with an indication of the reason that such determination cannot be made (for example, "impossible to determine if the object is within the region", "impossible to determine if the object is within the region due to poor image quality", "impossible to determine if the object is within the region due to occlusions", etc.), and so forth. Some other examples of queries that Step 1650 may present may include queries about the location of the object within the region, such as "what is the location of an object with a region", "what is the location of the doorway in region 1705", "what is the location of the electrical box in region 1710", "what is the location of the electrical boxes in region 1720", and so forth. In response to such queries, the user may provide an indication of the location of the object (for example, marking a pixel within the object, marking an area within the object, for example using scribbles, marking the boundaries of the object, for example by using a bounding box, by using a bounding shape, by marking corners of the boundaries, etc., drawing a mask of the object, and so forth), may indicate that the object is not in the region, and so forth. Some other examples of queries that Step 1650 may present may include queries about a quantity related to the objects in the region, such as dimensions, surface area, number of items, volume, weight, "how many electrical boxes are in region 1705", "how many electrical boxes are in region 1720", and so forth. In response to such queries, the user may provide an indication of quantity (such as number of items, "no electrical box", "one electrical box", "two electrical boxes", etc., dimensions, estimation of distance, "about two meters", estimation of surface area, "about one square", estimated volume, "between 10 and 15 cc", estimated weight, "about 140 grams", and so forth. Some other examples of queries that Step 1650 may present may include a query about a properties (such as dimensions, shape, color, state, type, etc.) of an object in the region, such as "is there a door in doorway 1755", "what is the construction stage of electrical box 1760", "is the wall in region 1720 plastered", and so forth. In some examples, after receiving an indication that electrical boxes 1765 are not in region 1715, Step 1640 may present region 1720 to the user and Step 1650 may present a query of whether electrical boxes 1765 are in region 1720.

FIG. 18 illustrates an example of a method 1800 for visual presentation of construction errors. In this example, method 1800 may comprise: receiving at least part of an image captured from a construction site using an image sensor (Step 1810); receiving an indication of a construction error associated with the construction site (Step 1820); receiving an indication of a type of the construction error (Step 1830); and presenting the at least part of the image captured from the construction site with an overlay over the at least part of the image (Step 1840), for example wherein the overlay may include a visual indication of the construction error, and the visual indication may be based on the type of the construction error. In some implementations, method 1800 may comprise one or more additional steps, while some of the steps listed above may be modified or excluded. For example, Step 1830 may be excluded from method 1800. In some implementations, one or more steps illustrated in FIG. 18 may be executed in a different order and/or one or more groups of steps may be executed simultaneously and vice versa. For example, Step 1810 may be executed before and/or after and/or simultaneously with Step 1820 and/or Step 1830, Step 1820 may be executed before and/or after and/or simultaneously with Step 1810 and/or Step 1830, Step 1830 may be executed before and/or after and/or simultaneously with Step 1810 and/or Step 1820, and so forth.

In some embodiments, Step 1810 may comprise receiving at least part of an image captured from a construction site using an image sensor, such as at least part of an image obtained using Step 710. In some examples, the at least part of the image obtained by Step 1810 may comprise an entire image captured from a construction site, a part of a single image captured from a construction site, a plurality of images captured from a construction site, parts from a plurality of images captured from a construction site, and so forth. Consistent with the present disclosure, the at least part of an image received by Step 1810 may include at least part of an image that went through image correction procedures.

In some examples, a plurality of images captured from the construction site using at least one image sensor may be received (for example using Step 710 described above), and Step 1810 may select the at least part of the image from the plurality of images based on the construction error indicated by the indication received by Step 1820 (for example based on properties of the construction error received by Step 1820). For example, in response to a first construction error, Step 1810 may select a first at least part of the image from the plurality of images, and in response to a second construction error, Step 1810 may select a second at least part of the image from the plurality of images, the second at least part of the image from the plurality of images may differ from the first at least part of the image from the plurality of images. In some examples, Step 1810 may select the at least part of the image from the plurality of images based on a location associated with the construction error in the construction site and a plurality of locations associated with the plurality of images, for example by selecting an image of the plurality of images that corresponds to the location associated with the construction error. For example, when the construction error is associated with a wall, Step 1810 may select an image or a portion of an image depicting the wall from the plurality of images. In another example, when the construction error is associated with an object, Step 1810 may select an image or a portion of an image corresponding to a location associated with the object from the plurality of images. In some examples, Step 1810 may select the at least part of the image from the plurality of images based on an object associated with the construction error in the construction site and a plurality of objects associated with the plurality of images, for example by selecting an image of the plurality of images that corresponds to the object associated with the construction error. In some examples, Step 1810 may select the at least part of the image from the plurality of images based on a time associated with the construction error and a plurality of times associated with the plurality of images (such as capturing time of the images), for example by selecting an image of the plurality of images that corresponds to the time associated with the construction error. For example, a group of images of the plurality of images may correspond to the location of the construction error, and Step 1810 may select the image corresponding to the time of the construction error from the group of images.

In some embodiments, Step 1820 may comprise receiving an indication of a construction error associated with the construction site, for example of a construction error occurred and/or detected in the construction site. In some examples, Step 1820 may further comprise receiving information related to the construction error associated with the construction site, such as properties of the construction error. Some examples of such properties of the construction error may include type of the construction error, one or more locations associated with the construction error, time associated with the construction error, and so forth. For example, Step 1820 may receive information related to the construction error from construction errors 640. In another example, Step 1820 may receive an indication of a construction error and/or information related to a construction error identified by Step 1120 and/or method 1100 as described above. In yet another example, Step 1820 may receive an indication of a construction error and/or information related to a construction error identified by Step 1670 and/or method 1600 as described above. In some examples, a plurality of images captured from the construction site using at least one image sensor may be received (for example using Step 710 described above), and Step 1820 may analyze the plurality of images to identify the construction error. The plurality of images may or may not include the at least part of the image received by Step 1810. In one example, a machine learning model may be trained using training examples to identify construction errors (and/or properties of the construction errors) from images, and Step 1830 may use the trained machine learning model to analyze the plurality of images and identify the construction error and/or properties of the construction error. An example of such training example may include images (for example, images depicting a construction error) together with a label indicating a construction error, possibly together with properties of the construction error. In another example an artificial neural network (such as a convolutional neural network, a deep neural network, etc.) may be configured to identify construction errors (and/or properties of the construction errors) from images, and Step 1830 may use the artificial neural network to analyze the plurality of images and identify the construction error and/or properties of the construction error.

In some embodiments, Step 1830 may comprise receiving an indication of a type of the construction error of Step 1820. For example, Step 1820 may receive information related to the type of the construction error from construction errors 640. In some examples, a plurality of images captured from the construction site using at least one image sensor may be received (for example using Step 710 described above), and Step 1830 may analyze the plurality of images to identify the type of the construction error. The plurality of images may or may not include the at least part of the image received by Step 1810. In one example, a machine learning model may be trained using training examples to determine types of construction errors from images, and Step 1830 may use the trained machine learning model to analyze the plurality of images and identify the type of the construction error. An example of such training example may include images (for example, images depicting a construction error) together with a label indicating a type of a construction error. In another example an artificial neural network (such as a convolutional neural network, a deep neural network, etc.) may be configured to determine types of construction errors from images, and Step 1830 may use the artificial neural network to analyze the plurality of images and identify the type of the construction error.

In some embodiments, Step 1840 may comprise presenting the at least part of the image captured from the construction site received by Step 1810 with an overlay over the at least part of the image. For example, the overlay may include a visual indication of the construction error (for example, of the construction error indicated by the indication received by Step 1820), and in some examples the visual indication may be based on the type of the construction error (for example, based on the type of the construction error indicated by the indication received by Step 1830).

In some examples, the type of the construction error of Step 1830 may be a construction error of incorrect locations of objects, such construction error may include an object at an incorrect location in the construction site, and the overlay presented by Step 1840 may include a visual indication of the incorrect location of the object and/or a visual indication of a correct location for the object. In one example, the visual indication of the incorrect location of the object and/or the visual indication of the correct location for the object may include a visual marking of the location, for example with a mark on the location, with an arrow pointing on the location, with a polygon around the location, and so forth. In another example, the overlay presented by Step 1840 may include an arrow pointing from the incorrect location of the object to the correct location for the object. In some examples, at least one image captured from the construction site using at least one image sensor may be received (for example using Step 710 described above), and the at least one image may be analyzed to identify the incorrect location (for example, using an object detection algorithm to identify the current location of the object in the at least one image, and comparing the identified current location of the object with a desired location for the object, for example based on construction plan 610, to determine whether the current location of the object is an incorrect location).

In some examples, the type of the construction error of Step 1830 may be a construction error of incorrect types of installed objects, such construction error may include an installed object of an incorrect type in the construction site, and the overlay presented by Step 1840 may include a visual indication of the installed object. In one example, the visual indication of the installed object may include a visual marking of the installed object, for example with a mark on the installed object, with an arrow pointing on the installed object, with a polygon around the installed object, by using a different color scheme for the depiction of the installed object, and so forth. Further, in some examples, the Step 1840 may also present a depiction of an object of a correct type in conjunction with the presentation of the at least part of the image captured from the construction site. For example, objects database 605 may be accessed to obtain a picture of an object of the correct type, and the picture may be presented next and/or over the presentation of the at least part of the image captured from the construction site.

In some examples, the type of the construction error of Step 1830 may be a construction error of incorrect ratings of installed objects, such construction error may include an installed object of an incorrect rating in the construction site, such as an incorrect fire rating, an incorrect soundproofing rating, and so forth. For example, the installed object may be an insulation element and the incorrect rating may be an incorrect fire rating for the insulation element. In another example, the installed object may be an insulation element and the incorrect rating may be an incorrect soundproofing rating for the insulation element. In some examples, the overlay presented by Step 1840 may include a visual indication of the installed object of an incorrect rating. In one example, the visual indication of the installed object may include a visual marking of the installed object, for example with a mark on the installed object, with an arrow pointing on the installed object, with a polygon around the installed object, by using a different color scheme for the depiction of the installed object, and so forth. Further, in some examples, the Step 1840 may also present a desired rating for the installed object and/or a depiction of an object of a correct rating in conjunction with the presentation of the at least part of the image captured from the construction site. For example, objects database 605 may be accessed to obtain a picture of an object of the correct rating, and the picture may be presented next and/or over the presentation of the at least part of the image captured from the construction site. In some examples, at least one image captured from the construction site using at least one image sensor may be received (for example using Step 710 described above), and the at least one image may be analyzed to identify the incorrect rating of the installed object. The at least one image may or may not include the at least part of the image received by Step 1810. In one example, a machine learning model may be trained using training examples to determine ratings of objects from images (such as fire rating, soundproofing rating, etc.), and the trained machine learning model may be used to analyze the at least one image and identify the rating of the installed object. An example of such training example may include images (for example, images depicting an object) together with a label indicating a rating of an object (such as fire rating, soundproofing rating, and so forth). In another example an artificial neural network (such as a convolutional neural network, a deep neural network, etc.) may be configured to determine ratings of objects from images (such as fire rating, soundproofing rating, etc.), and the artificial neural network may be used to analyze the at least one image and identify the rating of the installed object. Further, the identified rating of the installed object may be compared with a desired rating for the installed object (for example, based on construction plan 610) to determine whether the rating of the installed object is an object of incorrect rating.

In some examples, the type of the construction error of Step 1830 may be a construction error of incorrect quantities of elements, such construction error may include an incorrect quantity of an element in the construction site, and the overlay presented by Step 1840. For example, the incorrect quantity may be less than the desired quantity, more than the desired quantity, and so forth. In one example, the element may include objects (such as tiles, electrical boxes, etc.) installed in the construction site, and the quantity may include the number of objects installed in a selected part of the construction site. In another example, the element may include plaster (such as applied to selected walls in the construction site), and the quantity may include at least one of an area of selected walls covered by plaster, a volume of plaster applied to the selected walls, an estimated weight of the plaster applied to the selected walls, and so forth. In yet another example, the element may include pipes installed in selected area of the construction site (or pipes of a particular type or particular diameter installed in selected area of the construction site), and the quantity may include a total length of the installed pipes. In an additional example, the element may include wires installed in selected area of the construction site (or wires of a particular type installed in selected area of the construction site), and the quantity may include a total length of the installed wires. In some examples, the overlay presented by Step 1840 may include at least one of a visual indication of the element, a visual indication of the incorrect quantity, a visual indication of the correct quantity, and so forth. In one example, the visual indication of the element may include a visual marking of the element, for example with a mark on the element, with an arrow pointing on the element, with a polygon around the element, and so forth. In some examples, at least one image captured from the construction site using at least one image sensor may be received (for example using Step 710 described above), and the at least one image may be analyzed to identify the incorrect quantity. The at least one image may or may not include the at least part of the image received by Step 1810. In one example, a machine learning model may be trained using training examples to determine quantities of elements from images, and the trained machine learning model may be used to analyze the at least one image and identify the quantity of the element. An example of such training example may include images (for example, images depicting an element) together with a label indicating a quantity of an element. In another example an artificial neural network (such as a convolutional neural network, a deep neural network, etc.) may be configured to determine quantities of elements from images, and the artificial neural network may be used to analyze the at least one image and identify the quantity of the element. Further, the identified quantity of the element may be compared with a desired quantity for the element (for example, based on construction plan 610) to determine whether the quantity of the element is an incorrect quantity.

In some examples, the type of the construction error of Step 1830 may be a construction error of incorrect orientations of installed objects, such construction error may include an object at an incorrect orientation in the construction site, and the overlay presented by Step 1840 may include a visual indication of a correct orientation for the object (for example, based on a desired orientation for the object based on construction plan 610). In some examples, the overlay presented by Step 1840 may include a visual indication of the object installed at an incorrect orientation. In one example, the visual indication of the installed object may include a visual marking of the installed object, for example with a mark on the installed object, with an arrow pointing on the installed object, with a polygon around the installed object, by using a different color scheme for the depiction of the installed object, and so forth. In some examples, at least one image captured from the construction site using at least one image sensor may be received (for example using Step 710 described above), and the at least one image may be analyzed to identify the incorrect orientation of the installed object. The at least one image may or may not include the at least part of the image received by Step 1810. In one example, a machine learning model may be trained using training examples to determine orientations of objects from images, and the trained machine learning model may be used to analyze the at least one image and identify the orientation of the installed object. An example of such training example may include images (for example, images depicting an object) together with a label indicating an orientation of an object. In another example an artificial neural network (such as a convolutional neural network, a deep neural network, etc.) may be configured to determine orientations of objects from images, and the artificial neural network may be used to analyze the at least one image and identify the orientation of the installed object. Further, the identified orientation of the installed object may be compared with a desired orientation for the installed object (for example, based on construction plan 610) to determine whether the orientation of the installed object is in an incorrect orientation.

In some examples, the type of the construction error of Step 1830 may be a construction error of incorrect dimensions of installed objects, such construction error may include an object of incorrect dimensions in the construction site (such as incorrect length, width, height, depth, size, etc.), and the overlay presented by Step 1840 may include a visual indication of correct dimensions for the object (for example, based on a desired dimensions for the object based on construction plan 610) and/or a visual indication of the incorrect dimensions of the object. In some examples, the overlay presented by Step 1840 may include a visual indication of the object that has the incorrect dimensions. In one example, the visual indication of the object may include a visual marking of the object, for example with a mark on the object, with an arrow pointing on the object, with a polygon around the object, by using a different color scheme for the depiction of the object, and so forth. In some examples, at least one image captured from the construction site using at least one image sensor may be received (for example using Step 710 described above), and the at least one image may be analyzed to identify the incorrect dimensions of the installed object. The at least one image may or may not include the at least part of the image received by Step 1810. In one example, a machine learning model may be trained using training examples to determine dimensions of objects from images, and the trained machine learning model may be used to analyze the at least one image and identify the dimensions of the installed object. An example of such training example may include images (for example, images depicting an object) together with a label indicating dimensions of an object. In another example an artificial neural network (such as a convolutional neural network, a deep neural network, etc.) may be configured to determine dimensions of objects from images, and the artificial neural network may be used to analyze the at least one image and identify the dimensions of the installed object. Further, the identified dimensions of the installed object may be compared with a desired dimensions for the installed object (for example, based on construction plan 610) to determine whether the dimensions of the installed object has incorrect dimensions.

In some examples, the type of the construction error of Step 1830 may be a construction error of missing objects, such construction error may include an object missing in the construction site, and the overlay presented by Step 1840 may include a visual indication of an intended location for the missing object (for example, based on a desired location for the object based on construction plan 610) and/or a visual depiction of the missing object (for example at the intended location) and/or information about the missing object (for example, textual information and/or numerical information).

In some examples, Step 1840 may further present a depiction of the missing object in conjunction with the presentation of the at least part of the image captured from the construction site. For example, a missing that is specified in the construction plan and does not exist in the construction site may be identified by Step 930 as described above.

In some examples, the type of the construction error of Step 1830 may be a construction error of unnecessary installed objects, such construction error may include an object installed in the construction site that is unnecessary according to a construction plan associated with the construction site, and the overlay presented by Step 1840 may include a visual indication of the installed object that is unnecessary. In some examples, the overlay presented by Step 1840 may include a visual indication of the installed object. In one example, the visual indication of the installed object may include a visual marking of the installed object, for example with a mark on the installed object, with an arrow pointing on the installed object, with a polygon around the installed object, by using a different color scheme for the depiction of the installed object, and so forth. For example, an object installed in the construction site that is unnecessary and does not exist in the construction plan may be identified by Step 930 as described above.

In some examples, the type of the construction error of Step 1830 may be a construction error of an incorrect performance order of actions, such construction error may include a performance of a first action in the construction site before a performance of a second action (which may or may not been performed after the performance of the first action). In some examples, the overlay presented by Step 1840 may include at least one of a visual indication of the first action, a visual indication of the second action, a visual indication of an object associated with the first action, a visual indication of an object associated with the second action, and so forth. For example, the first action may comprise an installation of an object, and the overlay may include a visual indication of the installed object. In another example, the second action may comprise an installation of an object, and the overlay may include a visual indication of the missing object (in case the second action was not performed) or a visual indication of the object (in case the second action was performed after the performance of the first action). In some examples, In some examples, at least one image captured from the construction site (for example over a period of time) using at least one image sensor may be received (for example using Step 710 described above), and the at least one image may be analyzed to identify the incorrect performance order of actions, for example to identify that a first action was performed in the construction site before a performance of a second action. The at least one image may or may not include the at least part of the image received by Step 1810. In one example, a machine learning model may be trained using training examples to determine whether actions were performed before selected times from images, and the trained machine learning model may be used to analyze the at least one image and identify which actions were performed before a particular time. An example of such training example may include images (for example, images captured at a particular time) together with a label indicating which actions were performed before the particular time and which action were not performed before the particular time. In another example an artificial neural network (such as a convolutional neural network, a deep neural network, etc.) may be configured to determine whether actions were performed before selected times from images, and the artificial neural network may be used to analyze the at least one image and identify which actions were performed before a particular time. Further, in response to an identification that the first action was performed before the particular time while the second action was not performed before the particular time, and to the second action being a prerequisite of the first action (for example, according to a project schedule 620), a construction error including the performance of the first action in the construction site before the performance of the second action may be identified.

In some examples, the type of the construction error of Step 1830 may be a construction error of incorrect spacing between objects, such construction error may include an incorrect spacing between objects installed in the construction site, and the overlay presented by Step 1840 may include a visual indication of a correct spacing between the objects (for example, based on a desired spacing between the objects based on construction plan 610) and/or a visual indication of the incorrect spacing between the objects. In some examples, the overlay presented by Step 1840 may include a visual indication of the installed objects. In one example, the visual indication of the objects may include a visual marking of the objects, for example with a mark on one or more objects, with an arrow pointing on the objects, with a polygon around the objects, by using a different color scheme for the depiction of the objects, and so forth. In some examples, at least one image captured from the construction site using at least one image sensor may be received (for example using Step 710 described above), and the at least one image may be analyzed to identify the incorrect spacing between the objects. The at least one image may or may not include the at least part of the image received by Step 1810. In one example, a machine learning model may be trained using training examples to determine spacing between objects from images, and the trained machine learning model may be used to analyze the at least one image and identify the spacing between the installed objects. An example of such training example may include images (for example, images depicting objects) together with a label indicating spacing between the objects. In another example an artificial neural network (such as a convolutional neural network, a deep neural network, etc.) may be configured to determine spacing between objects from images, and the artificial neural network may be used to analyze the at least one image and identify the spacing between the installed objects. Further, the identified spacing between the installed objects may be compared with a desired spacing between the installed objects (for example, based on construction plan 610, based on a construction code, etc.) to determine whether the spacing between the installed objects is incorrect.

In some examples, the type of the construction error of Step 1830 may be a construction error of incorrect ratios between measurable extents, such construction error may include an incorrect ratio between at least two measurable extents in the construction site, and the overlay presented by Step 1840 may include a visual indication of at least one of the measurable extents. In some examples, Step 1840 may further present a suggestion to correct the incorrect ratio, for example by changing a select measurable extent. The suggestion may be presented in conjunction with the presentation of the at least part of the image captured from the construction site, as part of the overlay, and so forth. In one example, the ratio may include a ratio between an area of a room and an area of windows in the room. In another example, the ratio may include a ratio between two or more dimensions of a stair and/or between two or more dimensions of a staircase. In some examples, at least one image captured from the construction site using at least one image sensor may be received (for example using Step 710 described above), and the at least one image may be analyzed to determine dimensions of the measurable extents, for example as described above. Further, in some examples, the ratio may be calculated based on the determined dimensions, and the calculated ratio may be compared with a desired ratio (for example, based on construction plan 610, based on a construction code, etc.) to determine whether the ratio is incorrect.

In some examples, the construction error of method 1800 may be associated with an opening in the construction site (such as an opening for a door, an opening for a window, etc.), and the overlay presented by Step 1840 may include a visual indication of the opening, for example with a mark on the opening, with an arrow pointing on the opening, with a polygon around the opening, by using a different color scheme for the depiction of the opening, and so forth. In some examples, at least one image captured from the construction site using at least one image sensor may be received (for example using Step 710 described above), and the at least one image may be analyzed to detect the opening. The at least one image may or may not include the at least part of the image received by Step 1810. In one example, a machine learning model may be trained using training examples to openings in images, and the trained machine learning model may be used to analyze the at least one image and detect the opening. An example of such training example may include images (for example, images depicting an opening) together with a label indicating the opening. In another example an artificial neural network (such as a convolutional neural network, a deep neural network, etc.) may be configured to detect openings from images, and the artificial neural network may be used to analyze the at least one image and detect the opening.

In some examples, the construction error of method 1800 may be associated with an object in the construction site, and the overlay presented by Step 1840 may include a visual indication of the object, for example as described above. In some examples, the construction error of method 1800 may be associated with a location in the construction site, and the overlay presented by Step 1840 may include a visual indication of the location, for example as described above.

In some examples, the construction error of method 1800 may be associated with an entity, and the visual indication may be based on the entity. For example, the entity may be an entity that the at least part of the image captured from the construction site with the overlay over the at least part of the image is presented to, or a different entity. In another example, the entity may be an intended buyer and/or user of a unit of the construction site associated with the construction error. In yet another example, the entity may be an entity that performed an action associated with the construction error in the construction site. In an additional example, the entity may be an entity projected to perform a future action in the construction site that is affected by the construction error. In yet another example, the entity may be an entity assigned with correcting the construction error. In some examples, in response to a first entity, the overlay presented by Step 1840 may include a first visual indication, and in response to a second entity, the overlay presented by Step 1840 may include a second visual indication, the second visual indication may differ from the first visual indication.

Figure 19:
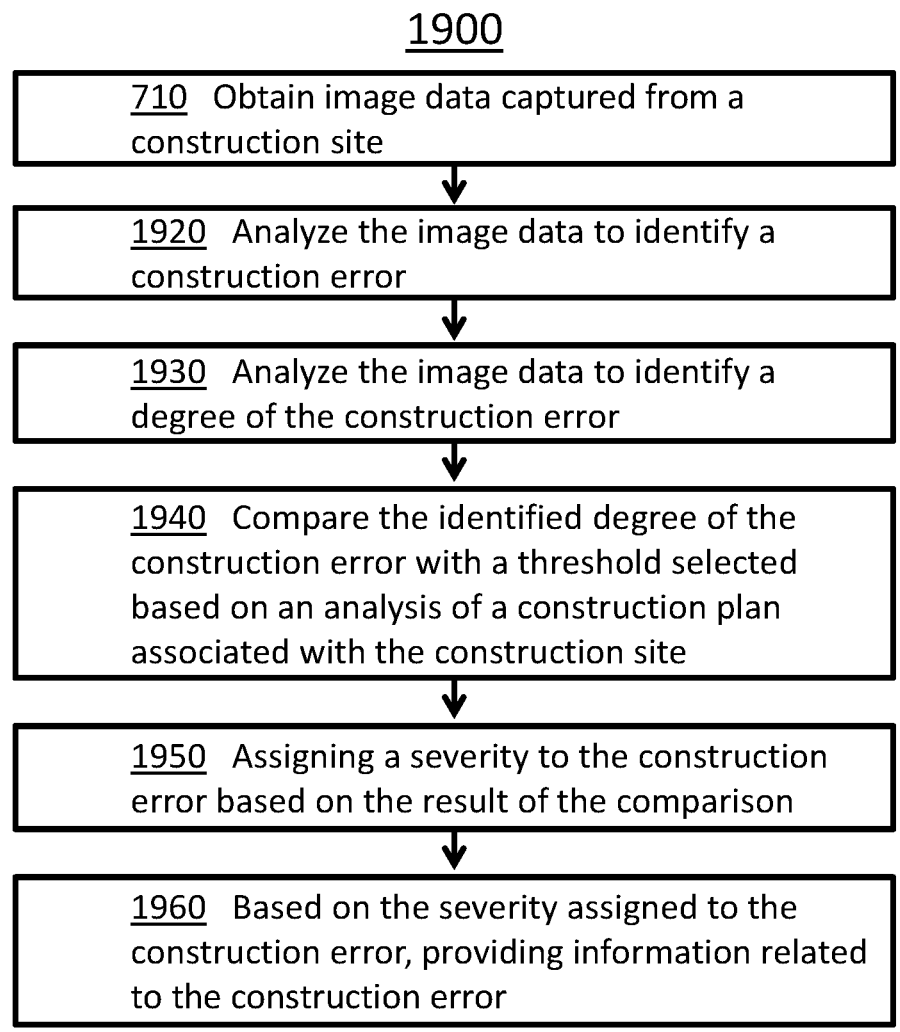
FIG. 19 illustrates an example of a method for selective reporting of construction errors.

FIG. 19 illustrates an example of a method 1900 for selective reporting of construction errors. In this example, method 1900 may comprise: obtaining image data captured from a construction site (Step 710); analyzing the image data to identify a construction error (Step 1920); analyzing the image data to identify a degree of the construction error (Step 1930); comparing the identified degree of the construction error with a threshold selected based on an analysis of a construction plan associated with the construction site (Step 1940); assigning a severity to the construction error based on the result of the comparison (Step 1950); and based on the severity assigned to the construction error, providing information related to the construction error (Step 1960). In some implementations, method 1900 may comprise one or more additional steps, while some of the steps listed above may be modified or excluded. For example, Step 1940 and/or Step 1950 and/or Step 1960 may be excluded from method 1900. In some implementations, one or more steps illustrated in FIG. 19 may be executed in a different order and/or one or more groups of steps may be executed simultaneously and vice versa.

In some embodiments, Step 1920 may comprise analyzing image data (such as image data captured from the construction site using at least one image sensor and obtained by Step 710) to identify a construction error. In one example, a machine learning model may be trained using training examples to identify construction errors (and/or properties of the construction errors) from images and/or videos, and Step 1920 may use the trained machine learning model to analyze the image data obtained by Step 710 and identify the construction error and/or properties of the construction error. An example of such training example may include an image (for example, an image depicting a construction error) together with a label indicating a construction error, possibly together with properties of the construction error. In another example an artificial neural network (such as a convolutional neural network, a deep neural network, etc.) may be configured to identify construction errors (and/or properties of the construction errors) from images and/or videos, and Step 1920 may use the artificial neural network to analyze the image data obtained by Step 710 and identify the construction error and/or properties of the construction error. Other non-limiting examples of techniques for identifying construction errors by analyzing images are described above.

In some embodiments, Step 1930 may comprise analyzing image data (such as image data captured from the construction site using at least one image sensor and obtained by Step 710) to identify a degree of a construction error (for example, of the construction error identified by Step 1920). In one example, a machine learning model may be trained using training examples to identify degrees of construction errors from images and/or videos, and Step 1930 may use the trained machine learning model to analyze the image data obtained by Step 710 and identify the degree of the construction error identified by Step 1920. An example of such training example may include an image (for example, an image depicting a construction error) together with a label indicating a degree of the construction error. In another example an artificial neural network (such as a convolutional neural network, a deep neural network, etc.) may be configured to identify degrees of construction errors from images and/or videos, and Step 1930 may use the artificial neural network to analyze the image data obtained by Step 710 and identify the degree of the construction error identified by Step 1920. In one non-limiting example, the construction error identified by Step 1920 may include a usage of a material of an incorrect elasticity, and the degree of the construction error identified by Step 1930 may be based on a difference in elasticity between the incorrect elasticity and a desired elasticity. In another non-limiting example, the construction error identified by Step 1920 may include placing a first element at an incorrect distance from a second element, and the degree of the construction error identified by Step 1930 may be based on a difference between the incorrect distance and a desired distance.

In some examples, a construction plan associated with the construction site may be analyzed to estimate a cost of the construction error identified by Step 1920, for example as described below, and Step 1930 may base the degree of the construction error on the estimated cost of the construction error. In some examples, the construction error identified by Step 1920 may include an object at an incorrect location in the construction site, and Step 1930 may base the degree of the construction error on a distance of the object from an element in the construction site (for example, a planned distance based on a construction plan, an actual distance in the construction site, and so forth). In some examples, a construction plan associated with the construction site may be analyzed to estimate a decline in usability due to the construction error identified by Step 1920, for example as described below, and Step 1930 may base the degree of the construction error on the estimated decline in usability due to the construction error.

In some embodiments, Step 1940 may comprise comparing the degree of the construction error identified by Step 1930 with a threshold selected based on an analysis of a construction plan associated with the construction site. In one example, a machine learning model may be trained using training examples to select thresholds based on construction plans and/or the construction error, and Step 1940 may use the trained machine learning model to analyze the construction plan and/or the construction error and select the threshold. An example of such training example may include a construction plan and/or a construction error together with a label indicating a desired selection of a threshold. In another example an artificial neural network (such as a convolutional neural network, a deep neural network, etc.) may be configured to select thresholds based on construction plans and/or the construction error, and Step 1940 may use the artificial neural network to analyze the construction plan and/or the construction error and select the threshold.

In some examples, the degree of the construction error identified by Step 1930 is one of a positive degree or a negative degree, and the threshold selected by Step 1940 may have a first magnitude for positive degrees and a second magnitude for negative degrees, the first magnitude may differ from the second magnitude.

In some examples, the construction plan may be analyzed to estimate costs of possible construction errors, and Step 1940 may select the threshold based on the estimated costs of the possible construction errors. For example, the threshold for the degree may be selected so that all possible construction errors with an estimated cost above a selected minimal cost are on one side of the threshold. In one example, a machine learning model may be trained using training examples to estimate costs of possible construction errors from construction plans, and the trained machine learning model may be used to analyze the construction plan and estimate the costs of the possible construction errors. An example of such training example may include a construction plan and a particular construction error, together with a label indicating the estimated cost of the particular construction error. In another example, manually programmed rules may be used to analyze the construction plan and estimate the costs of the possible construction errors.

In some examples, the construction plan may be analyzed to estimate decline of usability due to possible construction errors, and Step 1940 may select the threshold based on the estimated declines of usability due to the possible construction errors. For example, the threshold for the degree may be selected so that all possible construction errors with an estimated decline of usability above a selected minimal decline of usability are on one side of the threshold. In one example, a machine learning model may be trained using training examples to estimate declines of usability due to possible construction errors from construction plans, and the trained machine learning model may be used to analyze the construction plan and estimate the declines of usability due to the possible construction errors. An example of such training example may include a construction plan and a particular construction error, together with a label indicating the estimated decline of usability due to the particular construction error. In another example, manually programmed rules may be used to analyze the construction plan and estimate the declines of usability due to of the possible construction errors.

In some examples, Step 1940 may select the threshold based on a dependency of a subsequent construction operation in the construction site on an element associated with the construction error. For example, in response to a first subsequent construction operation in the construction site being dependent on an element associated with the construction error, Step 1940 may select a first threshold, and in response to a second subsequent construction operation in the construction site being dependent on the element associated with the construction error, Step 1940 may select a second threshold, the second threshold may differ from the first threshold. In another example, in response to a first subsequent construction operation in the construction site being dependent on an element associated with the construction error, Step 1940 may select a first threshold, and in response to the first subsequent construction operation in the construction site being independent of the element associated with the construction error, Step 1940 may select a second threshold, the second threshold may differ from the first threshold. In yet another example, in response to at least one subsequent construction operation in the construction site being dependent on an element associated with the construction error, Step 1940 may select first threshold, and in response to no subsequent construction operation in the construction site being dependent of the element associated with the construction error, Step 1940 may select a second threshold, the second threshold may differ from the first threshold. In some examples, the subsequent construction operation may include an installation of a system in the construction site. For example, the system may include woodwork with a design compatible for the element and affected by the construction error. In another example, the system may include an AVAC element. In yet another example, the system includes an elevator, and the element may include an opening for an elevator door. In an additional example, the system may include an electrical blind, and the element may include an opening for a window. In yet another example, the system may include a door, and the element may include an opening for a door.

In some examples, the construction error identified by Step 1920 may include an object at an incorrect location in the construction site, and Step 1940 may select the threshold based on a height associated with the object (such as a height associated with the object in the construction plan, an actual height of the object in the construction site, and so forth). For example, in response to a first height associated with the object, Step 1940 may select a first threshold, and in response to a second height associated with the object, Step 1940 may select a second threshold, the second threshold may differ from the first threshold. In some examples, Step 1940 may select the threshold based on a relation between the height associated with the object and a dimension of an element in the construction site. For example, the element may be a wall that includes the object. In another example, the element may be a room that includes the object.

In some examples, the construction error identified by Step 1920 may include an object at an incorrect location in the construction site, and Step 1940 may select the threshold based on a distance of the object from an element. In one example, the distance of the object from the element may be a distance of the object from the element according to the construction plan. In another example, the distance of the object from the element may be an actual distance of the object from the element in the construction site. In some examples, in response to a first distance, Step 1940 may select a first threshold, and in response to a second distance, Step 1940 may select a second threshold, the second threshold may differ from the first threshold. Some non-limiting examples of such element may include a ceiling, a floor, a wall, a wall adjunct to a wall that includes the object, a second object, In some examples, the construction site may comprise a plurality of apartments based on an identical construction plan, the construction error identified by Step 1920 may be associated with a particular apartment of the plurality of apartments (for example, involving elements in the particular apartment), and Step 1940 may select the threshold based on the particular apartment. For example, in response to a first particular apartment, Step 1940 may select a first threshold, and in response to a second particular apartment, Step 1940 may select a second threshold, the second threshold may differ from the first threshold. In one example, the particular apartment may have an addendum to the identical construction plan, and Step 1940 may select the threshold based on the existence of the addendum and/or based on details of the addendum. In one example, Step 1940 may select the threshold based on a location of the particular apartment within a building (such as floor, place in floor, and so forth). In one example, the particular apartment may be associated with an entity, and Step 1940 may select the threshold based on the entity (for example as described below). In one example, Step 1940 may select the threshold based on contractual obligations related to the particular apartment.

In some examples, Step 1940 may select the threshold based on a construction code. For example, the construction plan may be analyzed to determine a relevant construction code requirement, and Step 1940 may use the relevant construction code requirement to select the threshold. In another example, a geographical location of the construction site may be used to determine the relevant construction code, and Step 1940 may use the relevant construction code requirement to select the threshold.

In some examples, the construction error identified by Step 1920 may be associated with a door, and Step 1940 may select the threshold based on a dimension (such as width, height, etc.) of the door (for example, based on a desired width of the door in the construction plan, based on an actual width of the door in the construction site, based on a desired height of the door in the construction plan, based on an actual height of the door in the construction site, and so forth). In some examples, the construction error identified by Step 1920 may be associated with a window, and Step 1940 may select the threshold based on a dimension (such as width, height, etc.) of the window (for example, based on a desired width of the window in the construction plan, based on an actual width of the window in the construction site, based on a desired height of the window in the construction plan, based on an actual height of the window in the construction site, and so forth).

In some examples, the image data obtained by Step 710 may be analyzed to determine a construction stage. For example, the image data obtained by Step 710 may be analyzed using method 1600 to determine a construction stage as described above. In another example, a machine learning model may be trained using training examples to determine construction stages from images and/or videos, and the trained machine learning model may be used to analyze the image data obtained by Step 710 and determine the construction stage. An example of such training example may include an image together with a label indicating a construction stage. In another example, an artificial neural network (such as a convolutional neural network, a deep neural network, etc.) may be configured to determine construction stages from images and/or videos, and the artificial neural network may be used to analyze the image data obtained by Step 710 and determine the construction stage. Further, in some examples, Step 1940 may select the threshold based on the determined construction stage. For example, in response to a first construction stage, Step 1940 may select a first threshold, and in response to a second construction stage, Step 1940 may select a second threshold, the second threshold may differ from the first threshold.

In some examples, Step 1940 may select the threshold based on a time, such as a current time, a detection time of the construction error identified by Step 1920, occurrence time of the construction error identified by Step 1920, and so forth. For example, in response to a first time, Step 1940 may select a first threshold, and in response to a second time, Step 1940 may select a second threshold, the second threshold may differ from the first threshold. In another example, Step 1940 may use the time (such as the current time, the detection time of the construction error identified by Step 1920, the occurrence time of the construction error identified by Step 1920, and so forth) to analyze a project schedule associated with the construction site (such as project schedule 620) to select the threshold.

In some examples, the construction error identified by Step 1920 may be associated with an entity, and Step 1940 may select the threshold based on the entity. For example, the entity may be an entity that the information related to the construction error is intended to be presented to that entity, or a different entity. In another example, the entity may be an intended buyer and/or user of a unit of the construction site associated with the construction error. In yet another example, the entity may be an entity that performed an action associated with the construction error in the construction site. In an additional example, the entity may be an entity projected to perform a future action in the construction site that is affected by the construction error. In yet another example, the entity may be an entity assigned with correcting the construction error. In some examples, in response to a first entity, Step 1940 may select a first threshold, and in response to a second entity, Step 1940 may select a second threshold, the second threshold may differ from the first threshold.

In some embodiments, Step 1950 may comprise assigning a severity to the construction error identified by Step 1920 based on the result of the comparison of Step 1940. In some examples, in response to a first result of the comparison of Step 1940, Step 1950 may assign a first severity to the construction error identified by Step 1920, and in response to a second result of the comparison of Step 1940, Step 1960 may assign a second severity to the construction error identified by Step 1920, the second severity may differ from the first severity. Additionally or alternatively, Step 1950 may comprise assigning a severity to the construction error identified by Step 1920 based on the degree of the construction error identified by Step 1930. For example, the degree of the construction error identified by Step 1930 may be numerical, and the severity to the construction error assigned by Step 1950 may be a mathematical function of the numerical degree. Some non-limiting examples of such mathematical function of the numerical degree x may include f(x), x, -x, 1/x, -1/x, exp(x), exp(-x), exp(1/x), exp(-1/x), a polynomial function of x, any combination of the above, and so forth.

In some embodiments, Step 1960 may comprise providing information related to the construction error identified by Step 1920 based on the severity assigned to the construction error by Step 1950. In one example, the provided information may include an indication of the severity assigned to the construction error. In one example, the information related to the construction error identified by Step 1920 provided by Step 1960 may include an indication of a location associated with the construction error, an indication of an object in the construction site associated with the construction error, an indication of a time associated with the construction error, an indication of a construction task associated with the construction error, an indication of an entity associated with the construction error, and so forth. For example, Step 1960 may provide the information related to the construction error identified by Step 1920 using method 1800 and/or Step 1840. In another example, Step 1960 may provide the information related to the construction error as a visual output, audio output, tactile output, any combination of the above, and so forth. For example, Step 1960 may provide the information to the user: by the apparatus analyzing the information (for example, an apparatus performing at least one other step of method 1900), through another apparatus (such as a mobile device associated with the user, mobile phone 111, tablet 112, and personal computer 113, etc.), and so forth. For example, the amount of information provided by Step 1960, the events triggering the providence of information by Step 1960, the content of the information provided by Step 1960, and the nature of the information provided by Step 1960 may be configurable.

In some examples, in response to the first result of the comparison of Step 1940, Step 1960 may provide the information related to the construction error to a first entity, and in response to the second result of the comparison of Step 1940, Step 1960 may forgo providing the information related to the construction error to the first entity. In some examples, in response to the first result of the comparison of Step 1940, Step 1960 may provide the information related to the construction error to a first entity, and in response to the second result of the comparison of Step 1940, Step 1960 may provide the information related to the construction error to a second entity, the second entity may differ from the first entity. Some non-limiting examples of such entities may include entities responsible for correcting the construction error, entities that caused the construction error, entities affected by the construction error, entities that should react to the construction error, computerized entities, human entities, business entities, and so forth. In some examples, in response to the first result of the comparison of Step 1940, Step 1960 may provide the information related to the construction error, and in response to the second result of the comparison of Step 1940, Step 1960 may forgo providing the information related to the construction error.

In some examples, the construction error identified by Step 1920 may be included in a plurality of construction errors, such as a plurality of construction errors from construction errors 640, plurality of construction errors identified in the construction site using Step 1920, and so forth. Further, in some examples, the plurality of construction errors may be sorted based on the severity assigned by Step 1950 to the construction error identified by Step 1920. For example, each of the plurality of construction errors may be assigned a severity (for example, based on information from construction errors 640, using Step 1950, etc.), and the plurality of construction errors may be sorted according to the corresponding severities, for example in an order of increasing severity, in an order of decreasing severity, and so forth. Further, in some examples, Step 1960 may providing the sorted plurality of construction errors. For example, the sorted plurality of construction errors may be provided to a user, to another process, to an external device, and so forth. In another example, the sorted plurality of construction errors may be presented visually, for example through a user interface.

What is claimed is:

1. A non-transitory computer readable medium storing data and computer implementable instructions for carrying out a method for selective reporting of construction errors, the method comprising:
   obtaining image data captured from a construction site using at least one image sensor;
   analyzing the image data to identify a construction error;
   analyzing the image data to identify a degree of the construction error;
   analyzing a construction plan associated with the construction site to determine a relevant construction code requirement;
   analyzing the construction plan to estimate costs of hypothetical construction errors different from the identified construction error;
   selecting a threshold based on the determined construction code requirement and on the estimated costs of the hypothetical construction errors;
   comparing the identified degree of the construction error with the threshold;
   based on a result of the comparison, assigning a severity to the construction error; and
   based on the severity assigned to the construction error, providing information related to the construction error.

2. The non-transitory computer readable medium of claim 1, wherein the method further comprises:
   in response to the first result of the comparison, providing the information related to the construction error to a first entity; and
   in response to the second result of the comparison, providing the information related to the construction error to a second entity, the second entity differs from the first entity.

3. The non-transitory computer readable medium of claim 1, wherein the method further comprises:
   in response to the first result of the comparison, providing the information related to the construction error; and
   in response to the second result of the comparison, forgoing providing the information related to the construction error.

4. The non-transitory computer readable medium of claim 1, wherein the provided information includes an indication of the severity assigned to the construction error.

5. The non-transitory computer readable medium of claim 1, wherein the construction error is included in a plurality of construction errors, and the method further comprises:
   sorting the plurality of construction errors based on the severity assigned to the construction error; and
   providing the sorted plurality of construction errors.

6. The non-transitory computer readable medium of claim 1, wherein the selection of the threshold is further based on a dependency of a subsequent construction operation in the construction site on an opening for an elevator door associated with the construction error, the subsequent construction operation includes an installation of an elevator.

7. The non-transitory computer readable medium of claim 1, wherein the construction error includes an object at an incorrect location in the construction site, and the selection of the threshold is further based on a relation between a height associated with the object and a dimension of a wall that includes the object.

8. The non-transitory computer readable medium of claim 1, wherein the construction error includes an object at an incorrect location in the construction site, and the selection of the threshold is further based on a distance of the object from a floor.

9. The non-transitory computer readable medium of claim 1, wherein the construction site comprises a plurality of apartments based on an identical construction plan, the construction error is associated with a particular apartment of the plurality of apartments, and the selection of the threshold is further based on a location of the particular apartment within the building.

10. The non-transitory computer readable medium of claim 1, wherein the construction code is determined using a geographical location of the construction site.

11. The non-transitory computer readable medium of claim 1, wherein the construction error is associated with a door, and the selection of the threshold is further based on a width of the door in the construction plan.

12. The non-transitory computer readable medium of claim 1, wherein the method further comprises:
   analyzing the image data to determine a construction stage; and
   further basing the selection of the threshold on the determined construction stage.

13. The non-transitory computer readable medium of claim 1, wherein the selection of the threshold is further based on an analysis of a project schedule associated with the construction site based on a current time.

14. The non-transitory computer readable medium of claim 1, wherein the construction error includes a usage of a material of an incorrect elasticity.

15. The non-transitory computer readable medium of claim 1, wherein the construction error is associated with an entity, the entity is an intended user of a unit of the construction site, and the selection of the threshold is further based on the entity.

16. A system for selective reporting of construction errors, the system comprising:
   at least one processor configured to:
      obtain image data captured from a construction site using at least one image sensor;
      analyze the image data to identify a construction error;
      analyze the image data to identify a degree of the construction error;
      analyze a construction plan associated with the construction site to determine a relevant construction code requirement;

analyze the construction plan to estimate costs of hypothetical construction errors different from the identified construction error;

select a threshold based on the determined construction code requirement and on the estimated costs of the hypothetical construction errors;

compare the identified degree of the construction error with the threshold;

based on a result of the comparison, assign a severity to the construction error; and based on the severity assigned to the construction error, provide information related to the construction error.

17. A method for selective reporting of construction errors, the method comprising:

obtaining image data captured from a construction site using at least one image sensor;

analyzing the image data to identify a construction error;

analyzing the image data to identify a degree of the construction error;

analyzing a construction plan associated with the construction site to determine a relevant construction code requirement;

analyzing the construction plan to estimate costs of hypothetical construction errors different from the identified construction error;

selecting a threshold based on the determined construction code requirement and on the estimated costs of the hypothetical construction errors;

comparing the identified degree of the construction error with the threshold;

based on a result of the comparison, assigning a severity to the construction error; and based on the seventy assigned to the construction error, providing information related to the construction error.

* * * * *